United States Patent
Schwab et al.

(10) Patent No.: US 10,878,620 B2
(45) Date of Patent: Dec. 29, 2020

(54) DISPLAY SYSTEMS AND METHODS FOR CLIPPING CONTENT TO INCREASE VIEWING COMFORT

(71) Applicant: Magic Leap, Inc., Plantation, FL (US)

(72) Inventors: Brian David Schwab, Sunrise, FL (US); Randall E. Hand, Parkland, FL (US); Björn Nicolaas Servatius Vlaskamp, Plantation, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 16/353,989

(22) Filed: Mar. 14, 2019

(65) Prior Publication Data
US 2019/0311527 A1 Oct. 10, 2019

Related U.S. Application Data

(60) Provisional application No. 62/642,761, filed on Mar. 14, 2018.

(51) Int. Cl.
*G06T 15/30* (2011.01)
*G06T 15/20* (2011.01)

(52) U.S. Cl.
CPC .............. *G06T 15/30* (2013.01); *G06T 15/20* (2013.01)

(58) Field of Classification Search
CPC ................................ G06T 15/30; G06T 15/20
See application file for complete search history.

(56) References Cited

U.S. PATENT DOCUMENTS 6,850,221 B1 2/2005 Tickle
9,081,426 B2 7/2015 Armstrong
(Continued)

FOREIGN PATENT DOCUMENTS

WO WO 2019/178409 9/2019

OTHER PUBLICATIONS

International Search Report and Written Opinion for PCT Application No. PCT/US2019/022349, dated Jul. 3, 2019.
(Continued)

*Primary Examiner* — Haixia Du
(74) *Attorney, Agent, or Firm* — Knobbe, Martens, Olson & Bear, LLP

(57) ABSTRACT

Augmented and virtual reality display systems increase viewer comfort by reducing viewer exposure to virtual content that causes undesirable accommodation-vergence mismatches (AVM). The display systems limit displaying content that exceeds an accommodation-vergence mismatch threshold, which may define a volume around the viewer. The volume may be subdivided into two or more zones, including an innermost loss-of-fusion zone (LoF) in which no content is displayed, and one or more outer AVM zones in which the displaying of content may be stopped, or clipped, under certain conditions. For example, content may be clipped if the viewer is verging within an AVM zone and if the content is displayed within the AVM zone for more than a threshold duration. A further possible condition for clipping content is that the user is verging on that content. In addition, the boundaries of the AVM zone and/or the acceptable amount of time that the content is displayed may vary depending upon the type of content being displayed, e.g., whether the content is user-locked content or in-world content.

20 Claims, 29 Drawing Sheets

(56) References Cited

U.S. PATENT DOCUMENTS

| | | |
|---|---|---|
| 9,215,293 B2 | 12/2015 | Miller |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 2010/0103077 A1* | 4/2010 | Sugiyama ........... G02B 27/0172 345/8 |
| 2011/0109720 A1 | 5/2011 | Smolic et al. |
| 2012/0069002 A1* | 3/2012 | Kuribayashi ........... G06T 19/00 345/419 |
| 2012/0069296 A1 | 3/2012 | Li et al. |
| 2012/0127062 A1 | 5/2012 | Bar-Zeev et al. |
| 2013/0082922 A1 | 4/2013 | Miller |
| 2013/0117377 A1 | 5/2013 | Miller |
| 2013/0125027 A1 | 5/2013 | Abovitz |
| 2013/0286004 A1 | 10/2013 | McCulloch et al. |
| 2013/0335301 A1 | 12/2013 | Wong et al. |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0285641 A1* | 9/2014 | Kato ...................... G06F 3/013 348/54 |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0152184 A1* | 6/2016 | Ogawa ...................... B60R 1/00 345/589 |

OTHER PUBLICATIONS

Willemsen, et al., "Effects of Stereo Viewing Conditions on Distance Perception in Virtual Environment," Teleoperators and Virtual Environments, Feb. 15, 2005.

\* cited by examiner

DISPLAY SYSTEMS AND METHODS FOR CLIPPING CONTENT TO INCREASE VIEWING COMFORT

PRIORITY CLAIM

This application claims the benefit of priority of U.S. Provisional Application No. 62/642,761, filed on Mar. 14, 2018, the entirety of which is incorporated herein by reference.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

The application also incorporates by reference the entirety of each of the following patent applications and publications: U.S. application Ser. No. 15/469,369 filed on Mar. 24, 2017, published on Sep. 20, 2017 as U.S. Publication No. 2017/0276,948; U.S. Application No. 62/618,559, entitled DEPTH PLANE SELECTION AND RENDER CAMERA POSITIONING IN AUGMENTED REALITY DISPLAY SYSTEMS, filed Jan. 17, 2018 and U.S. application Ser. No. 16/250,931, entitled DEPTH PLANE SELECTION AND RENDER CAMERA POSITIONING IN AUGMENTED REALITY DISPLAY SYSTEMS, filed Jan. 17, 2019; and U.S. Publication No. 2018/0039,083, published on Feb. 8, 2018.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In some embodiments, a display system is provided for displaying a virtual object. The display system comprises one or more processors; and one or more computer storage media storing instructions that, when executed by the one or more processors, cause the one or more processors to perform various operations. The operations include determining whether the virtual object is located within a loss-of-fusion zone; determining whether the user is verging at a point within the loss-of-fusion zone; and refraining from displaying the virtual object within the loss-of-fusion zone if the virtual object is determined to be located within the loss-of-fusion zone and the user is verging at the point within the loss-of-fusion zone.

In some embodiments, a method is provided for operating a display device configured to display a virtual object. The method comprises determining that the virtual object is located within a loss-of-fusion zone of a user of the display system; and refraining from displaying the virtual object within the loss-of-fusion zone.

In some other embodiments, a display system is provided for displaying a virtual object. The display system comprises one or more processors; and one or more computer storage media storing instructions that, when executed by the one or more processors, cause the one or more processors to perform various operations. The operations include determining whether the virtual object is user-locked content or in-world content; setting an accommodation-vergence mismatch threshold based upon whether the virtual object is user-locked content or in-world content; determining whether a location of the virtual object has an accommodation-vergence mismatch that exceeds the accommodation-vergence mismatch threshold for the virtual object; and limiting displaying of the virtual object to the user if the accommodation-vergence mismatch of the location of the virtual object exceeds the accommodation-vergence mismatch threshold for the virtual object.

In yet other embodiments, a method is provided for operating a display device configured to display a virtual object. The method comprises determining whether the virtual object is user-locked content or in-world content; setting an accommodation-vergence mismatch threshold based upon whether the virtual object is user-locked content or in-world content; determining whether a location of the virtual object has an accommodation-vergence mismatch that exceeds the accommodation-vergence mismatch threshold for the virtual object; and limiting displaying of the virtual object to the user if the accommodation-vergence mismatch of the location of the virtual object exceeds the accommodation-vergence mismatch threshold for the virtual object.

In some other embodiments, a display system is provided for displaying a virtual object. The display system comprises one or more processors; and one or more computer storage media storing instructions that, when executed by the one or more processors, cause the one or more processors to perform various operations. The operations comprise determining whether the virtual object has crossed a boundary between different zones of a binocular field of view (FOV) of a user; and in response to determining that the virtual object has crossed the boundary between different zones of the binocular FOV of the user, switching between: (i) a binocular presentation mode in which the virtual object is displayed to both eyes of the user, and (ii) a monocular presentation mode in which the virtual object is only displayed to one eye of the user.

In some other embodiments, a method is provided for operating a head-mounted display device configured to display a virtual object. The method comprises obtaining a first estimate of a location at which the virtual object is to be perceived by a user and a later, second estimate of the location at which the virtual object is to be perceived by the user; determining, based at least on the first estimate of the location at which the virtual object is to be perceived by the user and the second estimate of the location at which the virtual object is to be perceived by the user, that the virtual object has crossed a boundary between different zones of a binocular field of view (FOV) of the user; and in response to determining that the virtual object has crossed the boundary between different zones of the binocular FOV of the user, switching between (i) a binocular presentation mode in which the virtual object is displayed to both eyes of the user, and (ii) a monocular presentation mode in which the virtual object is only displayed to one eye of the user.

In some other embodiments, a display system is provided for displaying a virtual object. The display system comprises one or more processors; and one or more computer storage media storing instructions that, when executed by the one or more processors, cause the one or more processors to perform various operations. The operations include determining whether a location within a binocular field of view (FOV) of a user at which the virtual object is to be perceived falls outside of a comfort zone of the binocular FOV of the user; determining whether a vergence point of the user has crossed a distance threshold defined relative to the virtual object; and in response to determining that the location within the binocular FOV of the user at which the virtual object is to be perceived falls outside of the comfort zone of the user's binocular FOV and determining that the vergence point of the user has crossed the distance threshold defined relative to the virtual object, switching between two different modes of presenting the virtual object to the user.

In some other embodiments, a method is provided for operating a head-mounted display device configured to display a virtual object. The method comprises determining that a location within a binocular field of view (FOV) of a user at which the virtual object is to be perceived falls outside of a comfort zone of the binocular FOV of the user; obtaining a first estimate of a vergence point of the user and a later, second estimate of the vergence point of the user; determining, based at least on the first estimate of the vergence point of the user and the second estimate of the vergence point of the user, that the vergence point of the user has crossed a distance threshold defined relative to the virtual object; and in response to determining that the location within the binocular FOV of the user at which the virtual object is to be perceived falls outside of the comfort zone of the user's binocular FOV and determining that the vergence point of the user has crossed the distance threshold defined relative to the virtual object, switching between two different modes of presenting the virtual object to the user.

In some other embodiments, a display system is provided for displaying a virtual object. The display system comprises one or more processors; and one or more computer storage media storing instructions that, when executed by the one or more processors, cause the one or more processors to perform various operations. The operations include determining whether a location within a binocular field of view (FOV) of a user at which the virtual object is to be perceived falls outside of a comfort zone of the binocular FOV of the user; determining whether a vergence point of the user has crossed a distance threshold defined relative to the virtual object; and in response to determining that the location within the binocular FOV of the user at which the virtual object is to be perceived falls outside of the comfort zone of the user's binocular FOV and determining that the vergence point of the user has crossed the distance threshold defined relative to the virtual object, switching between two different modes of presenting the virtual object to the user.

In some other embodiments, a method is provided for operating a head-mounted display device configured to display a virtual object. The method comprises determining that a location within a binocular field of view (FOV) of a user at which the virtual object is to be perceived falls outside of a comfort zone of the binocular FOV of the user; obtaining a first estimate of a vergence point of the user and a later, second estimate of the vergence point of the user; determining, based at least on the first estimate of the vergence point of the user and the second estimate of the vergence point of the user, that the vergence point of the user has crossed a distance threshold defined relative to the virtual object; and in response to determining that the location within the binocular FOV of the user at which the virtual object is to be perceived falls outside of the comfort zone of the user's binocular FOV and determining that the vergence point of the user has crossed the distance threshold defined relative to the virtual object, switching between two different modes of presenting the virtual object to the user.

Additional examples of embodiments are provided below.

1. A display system for displaying a virtual object, the display system comprising:
   one or more processors; and
   one or more computer storage media storing instructions that, when executed by the one or more processors, cause the one or more processors to perform operations comprising:
      determining whether the virtual object is located within a loss-of-fusion zone;
      determining whether the user is verging at a point within the loss-of-fusion zone; and
      refraining from displaying the virtual object within the loss-of-fusion zone if the virtual object is determined to be located within the loss-of-fusion zone and the user is verging at the point within the loss-of-fusion zone.

2. The display system of example 1, wherein determining whether the virtual object is located within a loss-of-fusion zone comprises determining whether the virtual object is located at less than a loss-of-fusion threshold distance from a user of the display system.

3. The display system of example 1, wherein determining whether the user is verging at a point within the loss-of-fusion zone comprises determining whether the user is verging at a distance less than a loss-of-fusion threshold distance.

4. The display system of example 1, wherein determining whether the user is verging at a point within the loss-of-fusion zone comprises determining whether the user is verging at a point corresponding to a vergence angle less than a loss-of-fusion threshold vergence angle.

5. The display system of example 1, wherein the operations further comprise:
determining whether the virtual object is located within an accommodation-vergence mismatch discomfort zone;
determining whether a vergence point of the user is within the accommodation-vergence mismatch discomfort zone; and
limiting displaying of the virtual object to the user if:
the virtual object is located at within the accommodation-vergence mismatch discomfort zone; and
the vergence point of the user is within the accommodation-vergence mismatch discomfort zone.

6. The display system of example 5, wherein determining whether the virtual object is located within the accommodation-vergence mismatch discomfort zone comprises determining whether the virtual object is located, from the user, at less than an accommodation-vergence mismatch threshold distance of a near accommodation-vergence mismatch discomfort zone.

7. The display system of example 6, wherein the accommodation-vergence mismatch threshold distance is 15 cm.

8. The display system of example 5, wherein determining whether the virtual object is located within the accommodation-vergence mismatch discomfort zone comprises determining whether the virtual object is located, from the user, at more than an accommodation-vergence mismatch threshold distance of a far accommodation-vergence mismatch discomfort zone.

9. The display system of example 8, wherein determining whether the virtual object is located within the accommodation-vergence mismatch discomfort zone further comprises determining whether the virtual object is located, from the user, at less than an accommodation-vergence mismatch threshold distance of a near accommodation-vergence mismatch discomfort zone.

10. The display system of example 5, wherein determining whether the vergence point of the user is within the accommodation-vergence mismatch discomfort zone comprises determining whether a vergence distance of the user is less than the accommodation-vergence mismatch threshold distance of a near accommodation-vergence mismatch discomfort zone.

11. The display system of example 10, wherein the loss-of-fusion threshold distance is 10 cm.

12. The display system of example 5, wherein determining whether the vergence point of the user is within the accommodation-vergence mismatch discomfort zone comprises determining whether a vergence distance of the user is more than the accommodation-vergence mismatch threshold distance of a far accommodation-vergence mismatch discomfort zone.

13. The display system of example 12, wherein determining whether the vergence point of the user is within the accommodation-vergence mismatch discomfort zone further comprises determining whether a vergence distance of the user is less than the accommodation-vergence mismatch threshold distance of a near accommodation-vergence mismatch discomfort zone.

14. The display system of example 5, wherein determining whether the vergence point of the user is within the accommodation-vergence mismatch discomfort zone comprises:
determining whether the user is verging on the virtual object.

15. The display system of example 5, wherein determining whether the user is verging at a point within the accommodation-vergence mismatch discomfort zone comprises determining whether the user is verging at a point corresponding to a vergence angle within a predetermined range of accommodation-vergence mismatch comfort angles.

16. The display system of example 15, wherein determining whether the user is verging at a point corresponding to a vergence angle outside of a predetermined range of accommodation-vergence mismatch comfort angles comprises determining whether the user is verging at a point corresponding to a vergence angle less than a minimum accommodation-vergence mismatch comfort angle.

17. The display system of example 15, wherein determining whether the user is verging at a point corresponding to a vergence angle outside of a predetermined range of accommodation-vergence mismatch comfort angles comprises determining whether the user is verging at a point corresponding to a vergence angle greater than a maximum accommodation-vergence mismatch comfort angle.

18. The display system of example 5, wherein determining whether the user is verging at a point within the accommodation-vergence mismatch discomfort zone comprises determining whether a vergence distance of the user is within a predetermined range of accommodation-vergence mismatch comfort distances.

19. The display system of example 18, wherein determining whether the user is verging at a point within the accommodation-vergence mismatch discomfort zone comprises determining whether a vergence distance of the user is less than a minimum accommodation-vergence mismatch comfort distance.

20. The display system of example 18, wherein determining whether the user is verging at a point within the accommodation-vergence mismatch discomfort zone comprises determining whether a vergence distance of the user is greater than a maximum accommodation-vergence mismatch comfort distance.

21. The display system of example 5, further comprising redisplaying the virtual content after ceasing to display the virtual content for a cool-down period, where redisplaying the virtual content comprises displaying virtual content at a location outside of the loss-of-fusion zone.

22. The display system of example 5, wherein the operations further comprise:
determining whether the virtual object is user-locked content or in-world content; and
setting a size of the accommodation-vergence mismatch discomfort zone based upon whether the virtual object is user-locked content or in-world content, wherein a size of an associated accommodation-vergence mismatch discomfort zone for in-world content exceeds a size of an associated accommodation-vergence mismatch discomfort zone for user-locked content.

23. The display system of example 5, wherein limiting displaying comprises:
determining an exposure time of the user to the virtual object, wherein the exposure time is a duration of exposure of the user to the virtual content while the virtual content is continuously located within the accommodation-vergence mismatch discomfort zone; and refraining from displaying the virtual object within the accommodation-vergence mismatch discomfort zone after an exposure time threshold is exceeded.

24. The display system of example 23, wherein refraining from displaying the virtual object within the accommodation-vergence mismatch discomfort zone comprises stopping display of the virtual object to one eye of the viewer, while continuing to display the virtual object to an other eye of the viewer.

25. The display system of example 23, wherein refraining from displaying the virtual object within the accommodation-vergence mismatch threshold distance comprises intermittently stopping display of the virtual object to each eye of the viewer by alternating displaying the virtual object between the eyes of the viewer.

26. The display system of example 23, wherein the operations further comprise:
determining whether the virtual object is user-locked content or in-world content; and
setting the exposure time threshold based upon whether the virtual object is user-locked content or in-world content, wherein an associated exposure time threshold for in-world content exceeds an associated exposure time threshold for user-locked content.

27. The display system of example 1, further comprising optics configured to output light forming the virtual object with varying amounts of wavefront divergence.

28. The display system of example 27, wherein the optics comprises a stack of waveguides, wherein different ones of the waveguides output light with different amounts of wavefront divergence.

29. The display system of example 27, further comprising a projection system for directing light comprising image information into the optics for output to the viewer.

30. The display system of example 27, wherein the projection system comprises a light source and a spatial light modulator configured to modulate light from the light source.

31. The display system of example 1, further comprising sensors to determine an orientation of the eyes of the viewer, wherein the display system is configured to determine the fixation point based upon information from the sensors.

32. The display system of example 31, wherein the sensors comprise inwardly-facing cameras configured to image the eyes of the viewer.

33. The display system of example 1, wherein refraining from displaying the virtual object within the loss-of-fusion zone comprises stopping display of the virtual object to one eye of the viewer, while continuing to display the virtual object to an other eye of the viewer.

34. The display system of example 1, wherein refraining from displaying the virtual object within the loss-of-fusion zone comprises intermittently stopping display of the virtual object to each eye of the viewer by alternating displaying the virtual object between the eyes of the viewer.

35. A method for operating a display device configured to display a virtual object, the method comprising:
determining that the virtual object is located within a loss-of-fusion zone of a user of the display system; and
refraining from displaying the virtual object within the loss-of-fusion zone.

36. The method of example 35, wherein determining that the virtual object is located at within the loss-of-fusion zone comprises determining that the virtual object is located at less than a loss-of-fusion threshold distance from the user.

37. The method of example 35, further comprising:
determining that the virtual object is located within an accommodation-vergence mismatch discomfort zone of the user;
determining that a vergence point of the user is within the accommodation-vergence mismatch discomfort zone; and
limiting displaying of the virtual object to the user.

38. The method of example 37, wherein determining that the virtual object is located within the accommodation-vergence mismatch discomfort zone comprises determining that the virtual object is located, from the user, at less than an accommodation-vergence mismatch threshold distance of a near accommodation-vergence mismatch discomfort zone.

39. The method of example 37, wherein determining that the virtual object is located within the accommodation-vergence mismatch discomfort zone comprises determining that the virtual object is located, from the user, at more than an accommodation-vergence mismatch threshold distance of a far accommodation-vergence mismatch discomfort zone.

40. The method of example 39, wherein determining that the virtual object is located within the accommodation-vergence mismatch discomfort zone further comprises determining that the virtual object is located, from the user, at less than an accommodation-vergence mismatch threshold distance of a near accommodation-vergence mismatch discomfort zone.

41. The method of example 37, wherein determining that the vergence point of the user is within the accommodation-vergence mismatch discomfort zone comprises determining that the vergence distance of the user is less than the accommodation-vergence mismatch threshold distance of a near accommodation-vergence mismatch discomfort zone.

42. The method of example 37, wherein determining that the vergence point of the user is within the accommodation-vergence mismatch discomfort zone comprises determining that a vergence distance of the user is more than the accommodation-vergence mismatch threshold distance of a far accommodation-vergence mismatch discomfort zone.

43. The method of example 42, wherein determining that the vergence point of the user is within the accommodation-vergence mismatch discomfort zone further comprises determining that a vergence distance of the user is less than the accommodation-vergence mismatch threshold distance of a near accommodation-vergence mismatch discomfort zone.

44. The method of example 37, wherein determining that the vergence point of the user is within the accommodation-vergence mismatch discomfort zone comprises:
determining that the user is verging on the virtual object.

45. The method of example 37, further comprising redisplaying the virtual content after ceasing to display the virtual content for a cool-down period, where redisplaying the virtual content comprises displaying virtual content at a location outside the loss-of-fusion zone.

46. The method of example 37, further comprising:
determining whether the virtual object is user-locked content or in-world content; and
setting a size of the accommodation-vergence mismatch discomfort zone based upon whether the virtual object is user-locked content or in-world content, wherein a size of an associated accommodation-vergence mismatch discomfort zone for in-world content exceeds a size of an associated accommodation-vergence mismatch discomfort zone for user-locked content.

47. The method of example 37, wherein limiting displaying comprises:
   determining an exposure time of the user to the virtual object, wherein the exposure time is a duration of exposure of the user to the virtual content while the virtual content is continuously located within the accommodation-vergence mismatch discomfort zone; and
   refraining from displaying the virtual object within the accommodation-vergence mismatch discomfort zone after an exposure time threshold is exceeded.

48. The method of example 47, wherein the operations further comprise:
   determining whether the virtual object is user-locked content or in-world content; and
   setting the exposure time threshold based upon whether the virtual object is user-locked content or in-world content, wherein an associated exposure time threshold for in-world content exceeds an associated exposure time threshold for user-locked content.

49. The method of example 47, wherein refraining from displaying the virtual object within the accommodation-vergence mismatch discomfort zone comprises stopping display of the virtual object to one eye of the viewer, while continuing to display the virtual object to an other eye of the viewer.

50. The method of example 47, wherein refraining from displaying the virtual object within the accommodation-vergence mismatch discomfort zone comprises intermittently stopping display of the virtual object to each eye of the viewer by alternating displaying the virtual object between the eyes of the viewer.

51. The method of example 35, wherein refraining from displaying the virtual object within the loss-of-fusion zone comprises stopping display of the virtual object to one eye of the viewer, while continuing to display the virtual object to an other eye of the viewer.

52. The method of example 35, wherein refraining from displaying the virtual object within the accommodation-vergence mismatch discomfort zone comprises intermittently stopping display of the virtual object to each eye of the viewer by alternating displaying the virtual object between the eyes of the viewer.

53. A display system for displaying a virtual object, the display system comprising:
   one or more processors; and
   one or more computer storage media storing instructions that, when executed by the one or more processors, cause the one or more processors to perform operations comprising:
     determining whether the virtual object is user-locked content or in-world content;
     setting an accommodation-vergence mismatch threshold based upon whether the virtual object is user-locked content or in-world content;
     determining whether a location of the virtual object has an accommodation-vergence mismatch that exceeds the accommodation-vergence mismatch threshold for the virtual object; and
     limiting displaying of the virtual object to the user if the accommodation-vergence mismatch of the location of the virtual object exceeds the accommodation-vergence mismatch threshold for the virtual object.

54. The display system of example 53, wherein the accommodation-vergence mismatch threshold is a distance from the user, wherein an accommodation-vergence mismatch threshold for in-world content is larger than an accommodation-vergence mismatch threshold for user-locked content, wherein the accommodation-vergence mismatch of the location of the virtual object exceeds the accommodation-vergence mismatch threshold for the virtual object when the location is closer to a user of the display system than the accommodation-vergence mismatch threshold distance.

55. The display system of example 53, wherein the operations further comprise:
   setting an exposure time threshold for the virtual object based upon whether the virtual object is user-locked content or in-world content, wherein an associated exposure time threshold for in-world content exceeds an associated exposure time threshold for user-locked content,
   wherein limiting displaying of the virtual object comprises:
     determining an exposure time of the user to the virtual object, wherein the exposure time is a duration of exposure of the user to the virtual content while the virtual content is continuously located within an accommodation-vergence mismatch zone having a boundary defined by the accommodation-vergence mismatch threshold distance; and
     refraining from displaying the virtual object after the exposure time threshold is exceeded.

56. A method for operating a display device configured to display a virtual object, the method comprising:
   determining whether the virtual object is user-locked content or in-world content;
   setting an accommodation-vergence mismatch threshold based upon whether the virtual object is user-locked content or in-world content;
   determining that a location of the virtual object has an accommodation-vergence mismatch that exceeds the accommodation-vergence mismatch threshold for the virtual object; and
   limiting displaying of the virtual object to the user.

57. The method of example 56, wherein the accommodation-vergence mismatch threshold is a distance from the user, wherein an accommodation-vergence mismatch threshold for in-world content is larger than an accommodation-vergence mismatch threshold for user-locked content, wherein the accommodation-vergence mismatch of the location of the virtual object exceeds the accommodation-vergence mismatch threshold for the virtual object when the location is closer to a user of the display system than the accommodation-vergence mismatch threshold distance.

58. The method of example 56, further comprising:
   setting an exposure time threshold for the virtual object based upon whether the virtual object is user-locked content or in-world content, wherein an associated exposure time threshold for in-world content exceeds an associated exposure time threshold for user-locked content,
   wherein limiting displaying of the virtual object comprises:
     determining an exposure time of the user to the virtual object, wherein the exposure time is a duration of exposure of the user to the virtual content while the virtual content is continuously located within an accommodation-vergence mismatch zone having a boundary defined by the accommodation-vergence mismatch threshold distance; and
     refraining from displaying the virtual object after the exposure time threshold is exceeded.

59. A display system for displaying a virtual object, the display system comprising:
one or more processors; and
one or more computer storage media storing instructions that, when executed by the one or more processors, cause the one or more processors to perform operations comprising:
determining whether the virtual object has crossed a boundary between different zones of a binocular field of view (FOV) of a user; and
in response to determining that the virtual object has crossed the boundary between different zones of the binocular FOV of the user, switching between (i) a binocular presentation mode in which the virtual object is displayed to both eyes of the user, and (ii) a monocular presentation mode in which the virtual object is only displayed to one eye of the user.

60. The display system of example 59, wherein the operations further comprise:
identifying a type of content corresponding to the virtual object; and
determining a particular boundary between different zones of the binocular FOV of the user based at least in part on the identified type of content corresponding to the virtual object, wherein determining whether the virtual object has crossed a boundary between different zones of the binocular FOV of the user comprises determining whether the virtual object has crossed the particular boundary between different zones of the binocular FOV of the user.

61. The display system of example 59, wherein the operations further comprise:
selecting, from among both eyes of the user, a particular eye of the user, wherein the virtual object is only displayed to the particular eye of the user in the monocular presentation mode.

62. The display system of example 61, wherein the operations further comprise:
determining which eye of the user is the user's dominant eye, wherein selecting, from among both eyes of the user, the particular eye of the user comprises selecting, from among both eyes of the user, a particular eye of the user based at least in part on determining which eye of the user is the user's dominant eye.

63. The display system of example 61, wherein the operations further comprise:
determining whether the virtual object is located within a left portion of the user's binocular FOV or a right portion of the user's binocular FOV, wherein selecting, from among both eyes of the user, the particular eye of the user comprises selecting, from among both eyes of the user, the particular eye of the user based at least in part on determining whether the virtual object is located within the left portion of the user's binocular FOV or the right portion of the user's binocular FOV.

64. The display system of example 61, wherein the operations further comprise:
determining a distance between the virtual object and one or more other virtual objects in a same virtual scene, wherein selecting, from among both eyes of the user, the particular eye of the user comprises selecting, from among both eyes of the user, the particular eye of the user based at least in part on determining the distance between the virtual object and one or more other virtual objects in the same virtual scene.

65. The display system of example 61, wherein the operations further comprise:
determining whether a duplicate version of the virtual object exists in a same virtual scene, wherein selecting, from among both eyes of the user, the particular eye of the user comprises selecting, from among both eyes of the user, the particular eye of the user based at least in part on determining whether a duplicate version of the virtual object exists in a same virtual scene.

66. The display system of example 59, wherein switching between (i) the binocular presentation mode in which the virtual object is displayed to both eyes of the user, and (ii) the monocular presentation mode in which the virtual object is only displayed to one eye of the user comprises:
switching between (i) a binocular presentation mode in which the virtual object is displayed at a first level of brightness to each eye of the user, and (ii) a monocular presentation mode in which the virtual object is only displayed at a second level of brightness to one eye of the user, the second level of brightness being greater than the first level of brightness.

67. The display system of example 59, wherein the operations further comprise:
determining whether a distance between the virtual object and another virtual object in a same virtual scene is less than a threshold distance; and
in response to determining that the virtual object has crossed the boundary between different zones of the binocular FOV of the user and determining that the distance between the virtual object and the other virtual object in the same virtual scene is less than the threshold distance, switching between (i) a binocular presentation mode in which the other virtual object is displayed to both eyes of the user, and (ii) a monocular presentation mode in which the other virtual object is only displayed to one eye of the user.

68. The display system of example 59, wherein the operations further comprise:
determining whether another virtual object has crossed the boundary between different zones of the binocular FOV of the user; and
in response to determining that the other virtual object has crossed the boundary between different zones of the binocular FOV of the user and independent from determining that the virtual object has crossed the boundary between different zones of the binocular FOV of the user:
switching between (i) a binocular presentation mode in which the other virtual object is displayed to both eyes of the user, and (ii) a monocular presentation mode in which the other virtual object is only displayed to one eye of the user.

69. The display system of example 59, wherein determining whether the virtual object has crossed the boundary between different zones of the binocular FOV of the user comprises determining whether the virtual object has crossed the boundary between an accommodation-vergence mismatch discomfort zone and an accommodation-vergence mismatch comfort zone.

70. A method for operating a head-mounted display device configured to display a virtual object, the method comprising:
obtaining a first estimate of a location at which the virtual object is to be perceived by a user and a later, second estimate of the location at which the virtual object is to be perceived by the user;

determining, based at least on the first estimate of the location at which the virtual object is to be perceived by the user and the second estimate of the location at which the virtual object is to be perceived by the user, that the virtual object has crossed a boundary between different zones of a binocular field of view (FOV) of the user; and in response to determining that the virtual object has crossed the boundary between different zones of the binocular FOV of the user, switching between (i) a binocular presentation mode in which the virtual object is displayed to both eyes of the user, and (ii) a monocular presentation mode in which the virtual object is only displayed to one eye of the user.

71. A display system for displaying a virtual object, the display system comprising:

one or more processors; and one or more computer storage media storing instructions that, when executed by the one or more processors, cause the one or more processors to perform operations comprising:

determining whether a location within a binocular field of view (FOV) of a user at which the virtual object is to be perceived falls outside of a comfort zone of the binocular FOV of the user;

determining whether a vergence point of the user has crossed a distance threshold defined relative to the virtual object; and in response to determining that the location within the binocular FOV of the user at which the virtual object is to be perceived falls outside of the comfort zone of the user's binocular FOV and determining that the vergence point of the user has crossed the distance threshold defined relative to the virtual object, switching between two different modes of presenting the virtual object to the user.

72. A method for operating a head-mounted display device configured to display a virtual object, the method comprising:

determining that a location within a binocular field of view (FOV) of a user at which the virtual object is to be perceived falls outside of a comfort zone of the binocular FOV of the user;

obtaining a first estimate of a vergence point of the user and a later, second estimate of the vergence point of the user;

determining, based at least on the first estimate of the vergence point of the user and the second estimate of the vergence point of the user, that the vergence point of the user has crossed a distance threshold defined relative to the virtual object; and in response to determining that the location within the binocular FOV of the user at which the virtual object is to be perceived falls outside of the comfort zone of the user's binocular FOV and determining that the vergence point of the user has crossed the distance threshold defined relative to the virtual object, switching between two different modes of presenting the virtual object to the user.

73. A display system for displaying a virtual object, the display system comprising:

one or more processors; and one or more computer storage media storing instructions that, when executed by the one or more processors, cause the one or more processors to perform operations comprising:

identifying a type of content corresponding to the virtual object;

determining a boundary between different zones of a binocular field of view (FOV) of a user based at least in part on the identified type of content corresponding to the virtual object;

determining whether a vergence point of the user has crossed a distance threshold defined relative to the virtual object;

in response to determining that the virtual object has crossed the determined boundary between zones of the binocular FOV of the user, switching between starting and resetting a timer associated with the identified type of content;

determining whether the timer associated with the identified type of content has expired; and in response to determining that the timer associated with the identified type of content has expired, modifying the virtual object in accordance with the identified type of content.

74. A method for operating a head-mounted display device configured to display a virtual object, the method comprising:

identifying a type of content corresponding to the virtual object;

determining a boundary between different zones of a binocular field of view (FOV) of a user based at least in part on the identified type of content corresponding to the virtual object;

obtaining a first estimate of a location at which a virtual object is to be perceived by a user and a later, second estimate of the location at which the virtual object is to be perceived by the user;

determining, based at least on the first estimate of the location at which the virtual object is to be perceived by the user and the second estimate of the location at which the virtual object is to be perceived by the user, that the virtual object has crossed the determined boundary between different zones of the binocular FOV of the user; and in response to determining that the virtual object has crossed the determined boundary between zones of the binocular FOV of the user, switching between starting and resetting a timer associated with the identified type of content.

DETAILED DESCRIPTION

Figure 1:
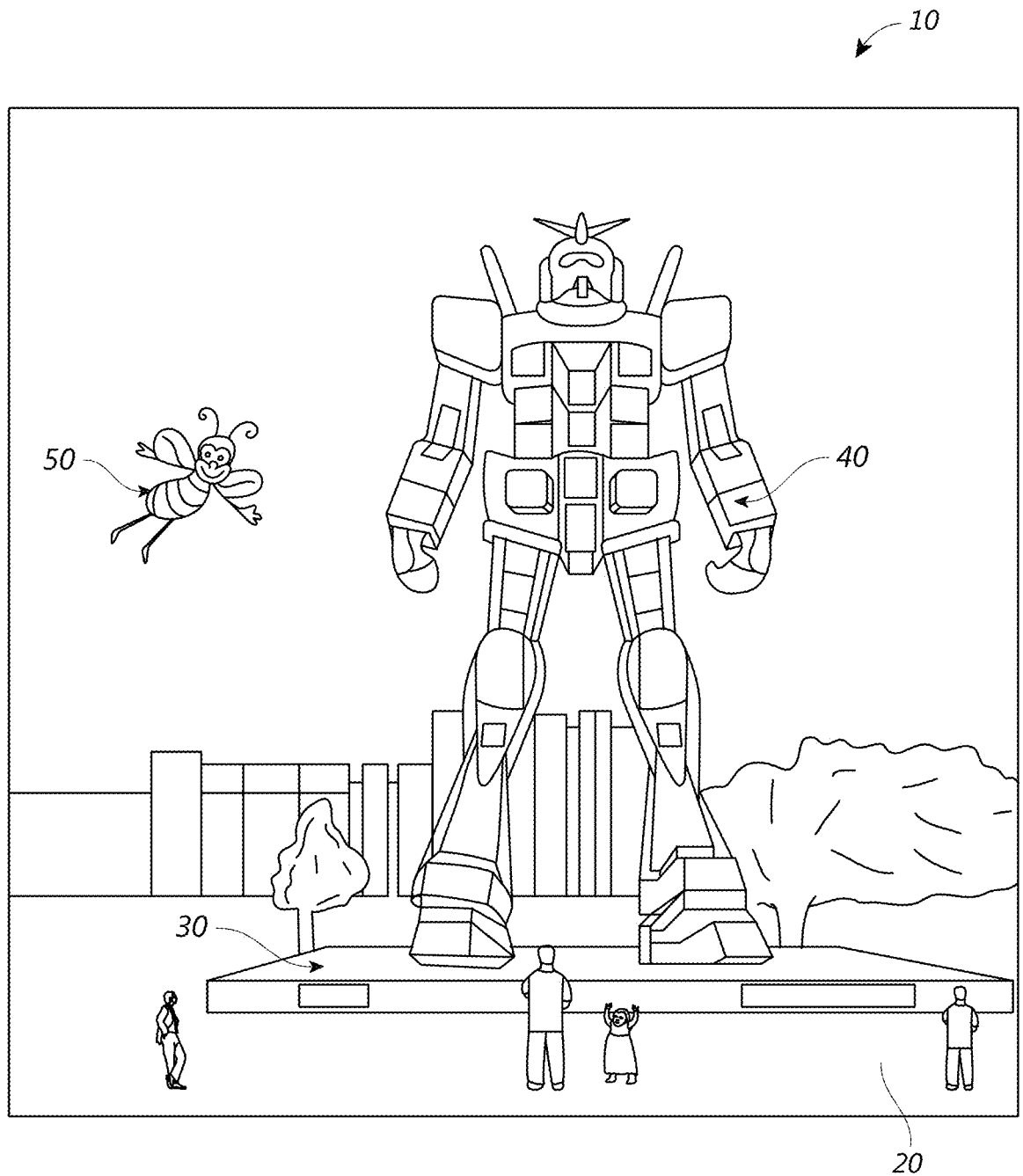
FIG. 1 illustrates a user's view of augmented reality (AR) through an AR device.

Virtual and augmented display systems may provide a variety of image content, the richness of which may increase with the user's ability to view content presented by the systems for an extended duration. For example, augmented reality display systems offer the potential to replace conventional displays (e.g. computer monitors, smart phone displays, etc.) with a single device, and may also augment the user's perceptions of the world by providing content not otherwise available.

As described herein, a display system may utilize both vergence cues and accommodation cues to present displayed virtual content with a sense of depth. The vergence cues may be generated by presenting slightly different views of a virtual object to each eye of the user. The accommodation cues may be derived from the wavefront divergence of the light that forms those slightly different views. The vergence cues cause the eyes to rotate to assume a particular vergence state in which, e.g., the eyes converge on the virtual object. The accommodation cues may cause the lenses of the eyes to assume particular shapes that provide a focused image of the virtual object on the retinas of the eyes. Thus, particular vergence cues may cause the eyes to assume particular vergence states (e.g., by rotating in particular directions to converge on an object) and particular accommodation cues may cause the eyes to assume particular accommodative states (e.g., by changing the shapes of the lenses of the eyes). The point in space at which the eyes converge may also be referred to as the vergence point or fixation point.

It will be appreciated that real objects in space provide matched vergence and accommodation cues that vary based on their distance along an optical or z-axis from a viewer, such that particular vergence cues may be correlated with particular vergence distances, and particular accommodation cues may likewise be correlated with particular accommodation distances away from the viewer. Because accommodative states and vergence states may be caused by different stimuli, it is possible to have an accommodation-vergence mismatch (AVM) in which vergence cues may indicate that a particular object is at a particular distance from the viewer while accommodation cues may indicate that this object is located at a different position, that is, at a different distance. An accommodation-vergence mismatch when displaying a virtual object may be defined as the difference in diopters between the vergence and accommodation distances for the virtual object.

It has been found that the human visual system tolerates some levels of accommodation-vergence mismatches. As a result, within a mismatch tolerance, in one example, accommodation cues may remain the same, while vergence cues may vary a limited amount, thereby varying the perceived depth of a virtual object. In some embodiments, the vergence cues may vary continuously, while the accommodation cues vary in discrete steps, with the mismatch between accommodation and vergence maintained below a mismatch tolerance level. Examples of accommodation-vergence mismatch tolerances include 0.75 dpt or less, 0.66 dpt or less, 0.5 dpt or less, 0.33 dpt or less, or 0.25 dpt or less. It will be appreciated that the mismatch tolerance may be programmed for a display system as a default value and/or may vary for different viewers (e.g. may be selectable by a viewer and/or selected for a viewer based on a calibration).

Regarding accommodation cues, particular amounts of wavefront divergence are associated with particular depth planes; that is, the wavefront divergence of light outputted by the display system corresponds to the wavefront divergence of light coming from a real object at a particular depth along the z-axis. As a result, changing wavefront divergence and, thus accommodation cues, may be understood to involve switching the depth plane on which the display system presents a virtual object. In some embodiments, the depth plane may be switched to maintain the accommodation-vergence mismatch below an acceptable tolerance level. Each depth plane may have a nominal focal depth, with a corresponding wavefront divergence for light appearing to come from that depth plane. However, due to the accommodation-vergence mismatch tolerance, content may be displayed "on" that depth plane (i.e., with wavefront divergence corresponding to that depth plane) even as vergence cues may be utilized to provide the perception that a virtual object is closer or farther away from the viewer than the depth plane. The outer bounds of the distances where a particular depth plane may be utilized is determined by the accommodation-vergence mismatch, which may be measured in units of diopters as disclosed herein. In some embodiments, a farthest depth plane may be within an accommodation-vergence mismatch tolerance of optical infinity, and a next farthest depth plane may be within an accommodation-vergence mismatch tolerance of a volume made out by the accommodation-vergence mismatch tolerance of the farthest depth plane, and so on. In some other embodiments, a reference depth plane (e.g., the closest depth plane) may be a selected distance from the viewer and the positions of one or more other depth planes on the Z-axis may be selected to be within an accommodation-vergence mismatch tolerance of that reference depth plane. In some embodiments, a single depth plane (e.g. only the reference depth plane) may be utilized.

It will be appreciated that, due to practical and/or technical constraints, display systems may be limited in their abilities to vary wavefront divergence and/or present some amounts of wavefront divergence, particularly the relatively large amounts of wavefront divergence associated with objects at distances close to a viewer, or the low amounts of wavefront divergence associated with objects proximate to or at optical infinity in systems in which the farthest depth plane is close to the viewer and the system is thus configured to provide large amounts of wavefront divergence. As a result, the ability of the display system to present different accommodative cues may exceed its ability to present different vergence cues. At certain distances from the viewer, the accommodation-vergence mismatch may exceed acceptable tolerance, or threshold, levels and, thus, cause viewer discomfort. It will be appreciated that these distances may be understood to define the boundaries of a volume, or zone, around the viewer. For example, the zone may be understood to be an AVM discomfort zone within which the accommodation-vergence mismatch of an object in any position within the zone exceeds an AVM threshold, or an accommodation-vergence mismatch tolerance of the viewer. In some embodiments, the accommodation-vergence mismatch at any point outside the AVM discomfort zone remains within the accommodation-vergence mismatch tolerance. In some embodiments, the boundary of the AVM discomfort zone may be defined by a surface having a constant distance from the viewer. In some other embodiments, the surface may have a variable distance from the viewer, depending upon the direction of the gaze of the viewer.

In some embodiments, for scenarios in which the display system does not provide sufficiently high levels of wavefront divergence for virtual objects at close distances, a near AVM discomfort zone may be present as a volume proximate the viewer. In some other examples, for scenarios in which the display system does not provide sufficiently low levels of wavefront divergence for virtual objects at far distances, a far AVM discomfort zone may be present as a volume proximate to and encompassing optical infinity. In some embodiments, the display system may have both near and far AVM discomfort zones, one AVM discomfort zone proximate to the viewer in another encompassing optical infinity.

In addition, without being limited by theory, while it is believed that the human visual system can tolerate accommodation-vergence mismatches that exceed threshold levels for limited amounts of time, it has been found that this tolerance may not extend to distances within the loss-of-fusion zone of the viewer. It will be appreciated that the loss-of-fusion zone (LoF) includes distances close to the viewer at which the human visual system does not combine images seen by each eye (or at which the viewer must strain their eyes in order to enable the human visual system to combine images seen by each eye), such that the viewer typically sees doubles of an object within those distances (that is, within the loss-of-fusion zone) unless they consciously strain their eyes. Indeed, viewer discomfort caused by relatively high accommodation-vergence mismatches may be amplified when coupled with loss-of-fusion (i.e., double vision). As described in further detail below, the loss-of-fusion zone can also be defined in terms of vergence angle, such that the LoF zone includes points in three-dimensional space associated with viewer vergence angles that are not conducive to image fusion. Given the trigonometric relationship between viewing distance and viewer vergence angle, relatively wide viewer vergence angles can be seen as hindrances to binocular image fusion in much the same way as relatively close viewing distances. In either case, each point in three-dimensional space along the outer boundary of the LoF zone can, in at least some examples, be seen as representing a "near point of convergence" (NPC) (i.e., the closest point of binocular, fused, single vision) for a respective viewing position and orientation. For example, human visual system may not combine images seen by each eye within the outer boundary, while it does combine images seen by each eye outside the outer boundary. The outer boundary may be at a fixed distance from the viewer, or may be at a variable distance depending upon the direction of the gaze of the viewer.

Also, it will be appreciated that virtual content displayed to the viewer may include user-locked content and in-world content in some embodiments. The user-locked content includes virtual content that is locked within the viewer's field of view, such that the viewer cannot avoid the content by moving their head or looking away. For example, user-locked content may include notifications (e.g., advertisements, user-interface objects, etc.) that follow the viewer and stay in a viewer's field of view; they are not anchored in position to the external environment and may not be avoided when utilizing the display system. On the other hand, in-world content is virtual content that is anchored to the ambient environment, some object in the ambient environment, or content otherwise not rigidly anchored to the viewer within the viewer's field of view. Consequently, the viewer may change their view of and/or avoid seeing the in-world content by moving, turning their head, etc. Without being limited by theory, it is believed that viewers may be more sensitive to accommodation-vergence mismatches for user-locked than in-world content. It will be appreciated that virtual content may also be referred to as virtual objects, and both terms are used interchangeably herein.

In some embodiments, the display systems may be configured to modify the display of a virtual object (that is, to "clip" the virtual object) using an analysis that includes determining whether the viewer is verging on a point within an AVM discomfort zone (e.g., at less than an AVM threshold distance in instances where the AVM discomfort zone is proximate the viewer, or at more than an AVM threshold distance when the AVM discomfort zone encompasses optical infinity) and/or whether that object is positioned within the AVM discomfort zone (e.g., at less than an accommodation-vergence mismatch (AVM) threshold distance where the AVM discomfort zone is proximate the viewer, or at more than an AVM threshold distance when the AVM discomfort zone encompasses optical infinity). Modifying the display of the virtual object may include, e.g., stopping display of the virtual object (in one or both eyes), changing the position of the object (e.g., by moving the object away from the viewer), etc., as described herein. In addition or alternatively, the display system may be configured to determine whether the virtual object is positioned within the LoF zone (e.g., at less than a loss-of-fusion (LoF) threshold distance from the viewer). If the virtual object is within the LoF zone, then the system may be configured to clip display of that object. If the virtual object is within an AVM discomfort zone, but outside the LoF zone, the system may be configured to take a predetermined action with respect to limiting display of that object. For example, the predetermined action may include limiting the amount of time in which the object is displayed within an AVM discomfort zone and then stopping or fading out display of that object and/or causing an object to move outside of the AVM discomfort zone. In some embodiments, after a predetermined cool-down period, the display system may be configured to again display a virtual object that has been clipped. It will be appreciated that the virtual object and its position may be analyzed again as disclosed herein to determine whether it should be clipped again.

In some embodiments, the amount of time that an object may be displayed within an AVM discomfort zone is limited to, e.g., 1 second or less, 10 seconds or less, 30 seconds or less, 3 minutes or less, and/or a variable user or system-selected amount of time. It will be appreciated that the amount of time that the viewer is exposed to content within an AVM discomfort zone may be referred to as the exposure time. In some embodiments, the exposure time may be utilized to determine the cool-down period. For example, the duration of the cool-down period may increase with the duration of the exposure time. In some embodiments, the cool-down period may be 3 seconds or more, 5 seconds or more, or 10 seconds or more.

In some embodiments, the size of an AVM discomfort zone may vary depending on the type of content being displayed. For example, user-locked content may have a smaller AVM discomfort zone than in-world content. Consequently, the display system may be configured to determine the type of content that is being displayed and, thus, determine the appropriate AVM discomfort zone boundary, before performing the analysis for clipping noted above and further discussed below. In some embodiments, in addition to or as an alternative to varying an AVM threshold distance depending upon whether the virtual object constitutes user-locked content or in-world content, the time limit for exposure to the object may be varied based upon the content type. For example, user-locked content may have a shorter exposure time limit (e.g., one second or less) than in-world content (e.g., 10 seconds or less).

In some embodiments, the display system may be further configured to determine whether the viewer is in fact verging on the virtual object (e.g., whether the vergence point corresponds to the location of the virtual object). If the system determines that the viewer is not verging on the virtual object, then the object is not clipped. In some embodiments, the display system may be configured to determine whether the virtual object is within a field of view of the user and to not address display of that object if it is outside of the field of view. Advantageously, by limiting clipping of objects to circumstances in which the viewer is actually verging within an AVM discomfort zone (e.g., at less than the AVM threshold distance for AVM discomfort zones proximate the viewer, or at more than the AVM threshold distance for AVM discomfort zones encompassing optical infinity), rather than clipping all content within the AVM discomfort zone, a more realistic experience and greater functionality may be provided. For example, objects relatively close to the viewer may be presented without increasing viewer discomfort.

It will be appreciated that the clipping analysis may be conducted sequentially or in parallel for various virtual objects displayed to a user, e.g., virtual objects that are within the user's field of view.

Reference will now be made to the drawings, in which like reference numerals refer to like parts throughout. Unless specifically indicated otherwise, the drawings are schematic not necessarily drawn to scale.

Example Display Systems

Figure 2:
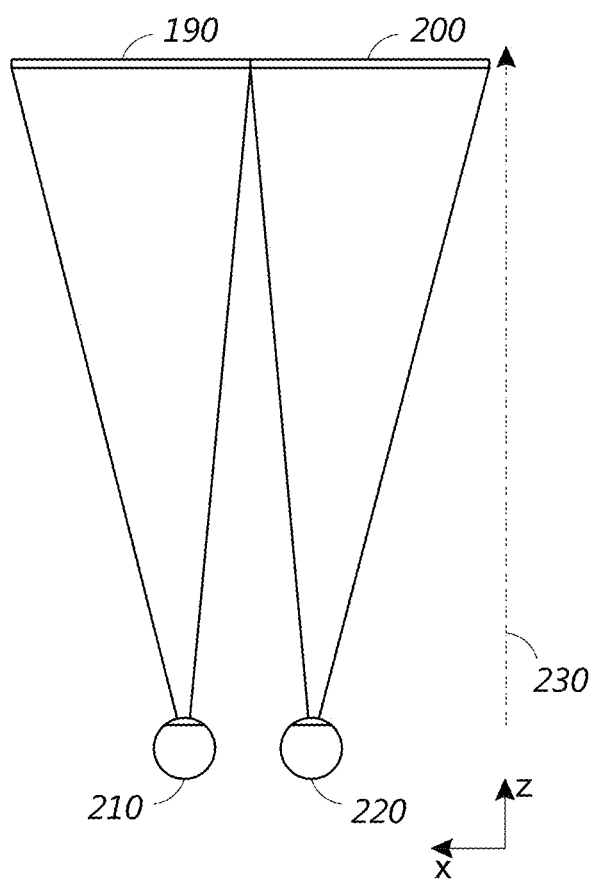
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
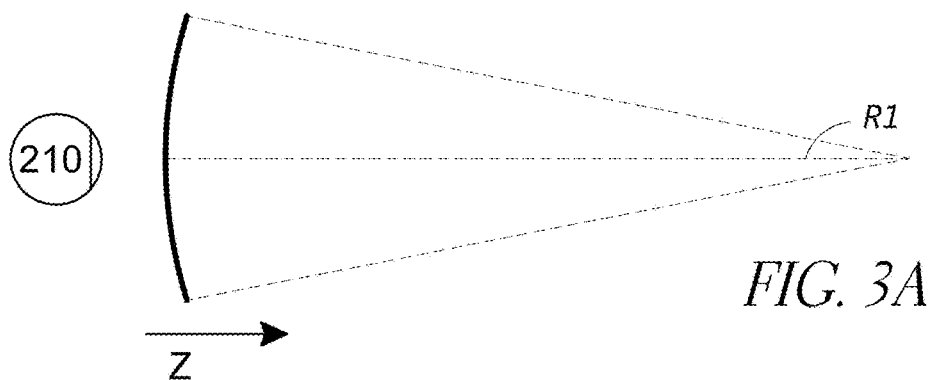
FIGS. 3A-3C illustrate relationships between radius of curvature and focal radius.
Figure 3B:
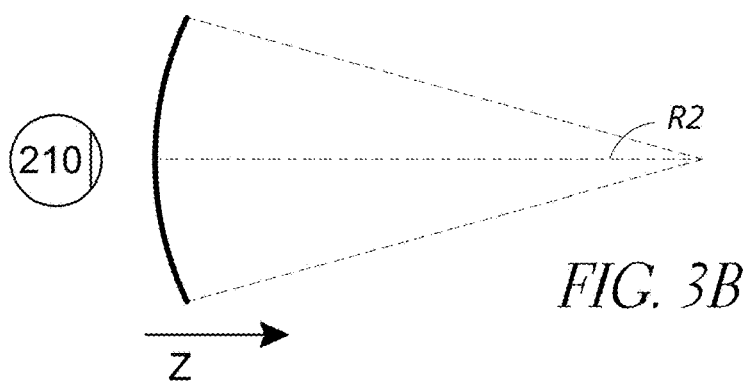
Figure 3C:
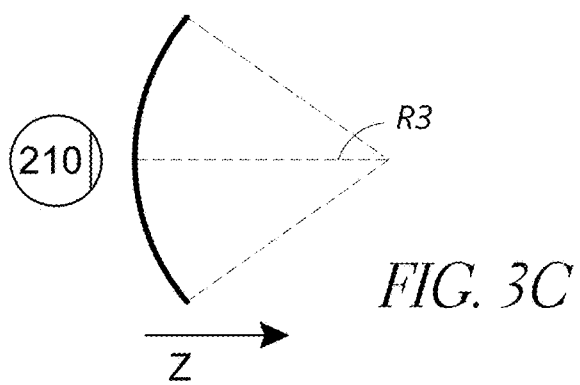

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
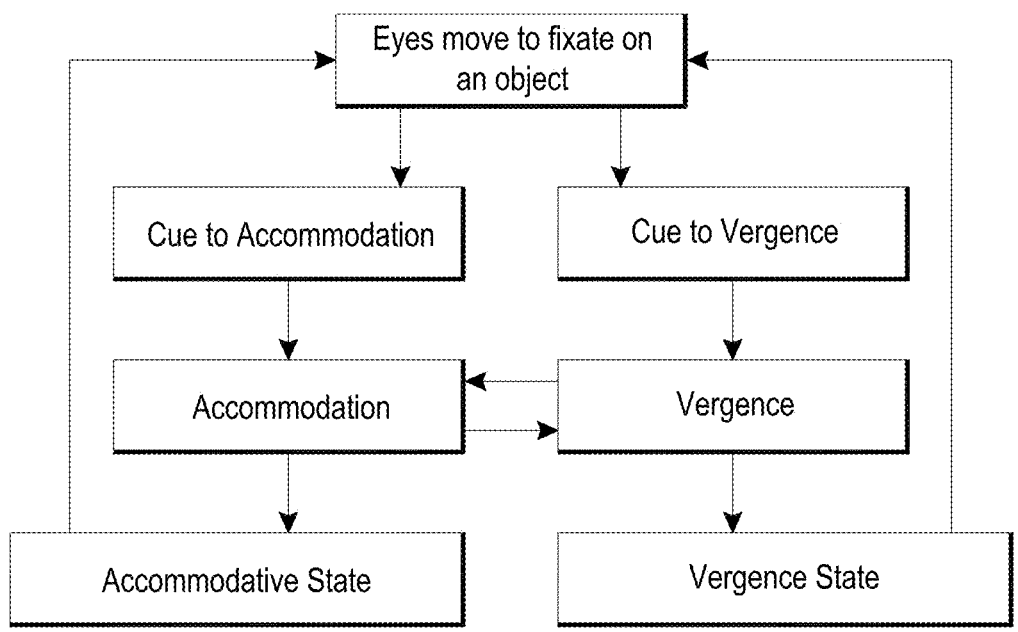
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
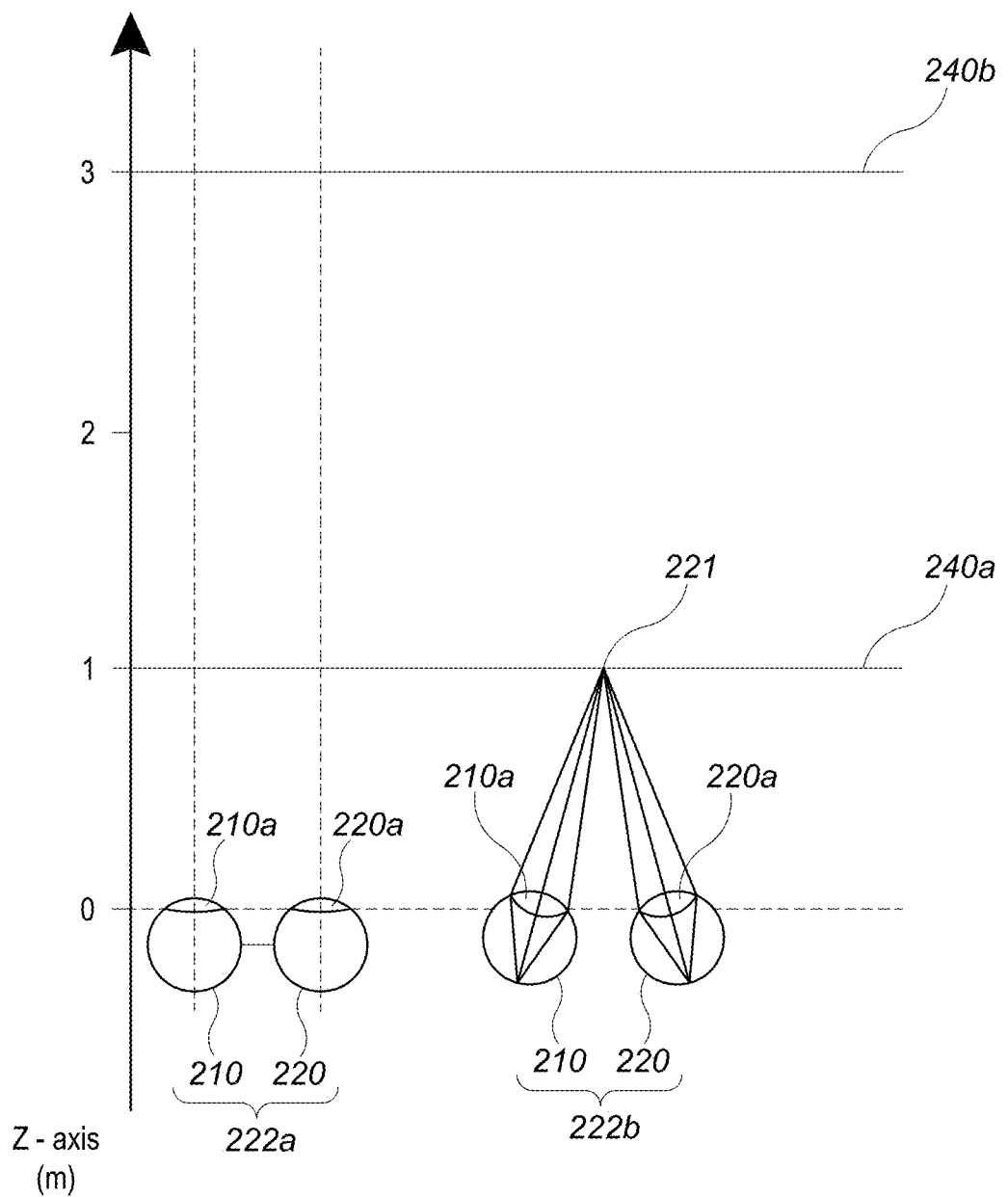
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically acceptable accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the pupils of the user's eyes. Thus, a depth plane 240 located at a depth of 1 m corresponds to a distance of 1 m away from the pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the pupils of the user's eyes. That value may be called the eye relief and corresponds to the distance between the pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
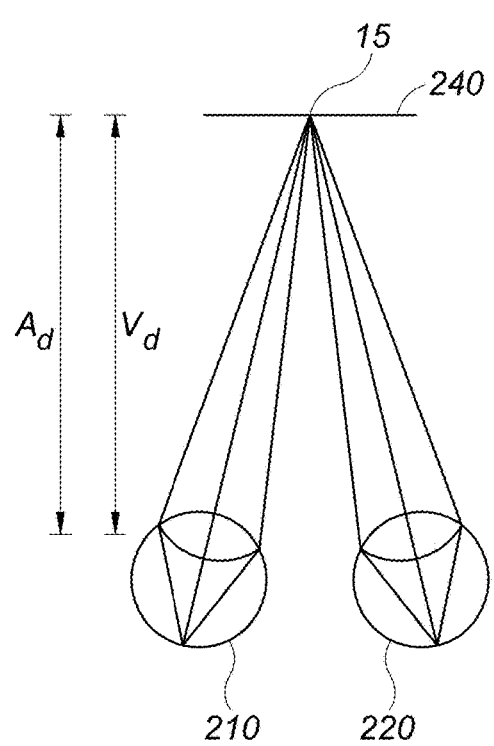
FIG. 4C illustrates an example of a representation of a top-down view of a user viewing content via a display system.
Figure 4D:
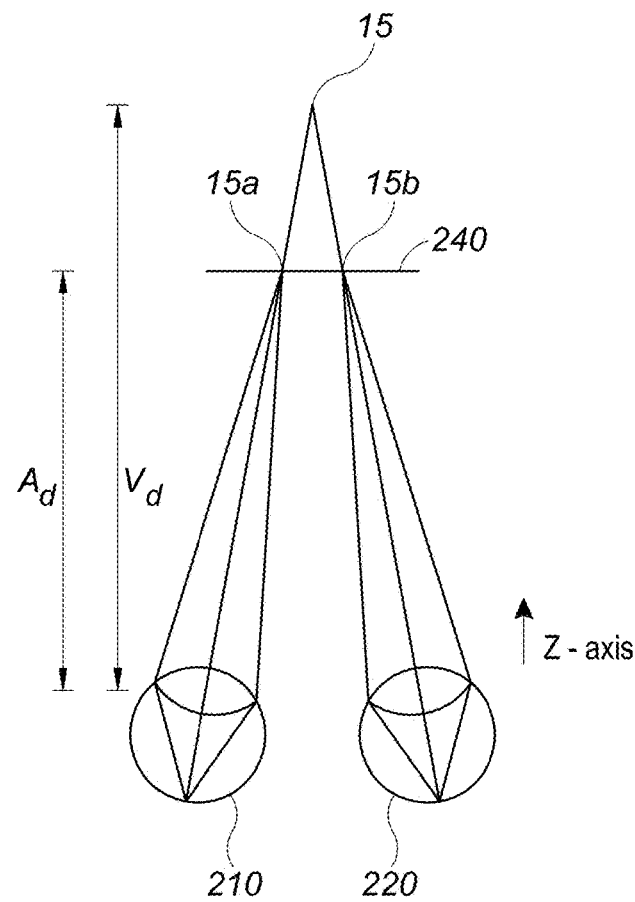
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically acceptable. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the pupils of the eyes 210, 220 to the depth plane 240, while the vergence distance corresponds to the larger distance from the pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$–$A_d$) and may be characterized using diopters.

In some embodiments, it will be appreciated that a reference point other than pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, up to about 0.5 diopter, up to about 0.66 diopter, and up to about 0.75 diopter as being physiologically acceptable, without the mismatch itself causing significant discomfort. In some embodiments, display systems disclosed herein (e.g., the display system 250, FIG. 6) present images to the viewer having accommodation-vergence mismatch of about 0.75 diopter or less. In some other embodiments, the accommodation-vergence mismatch of the images provided by the display system is about 0.66 diopter or less. In yet other embodiments, the accommodation-vergence mismatch of the images provided by the display system is about 0.50 diopter or less. In other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
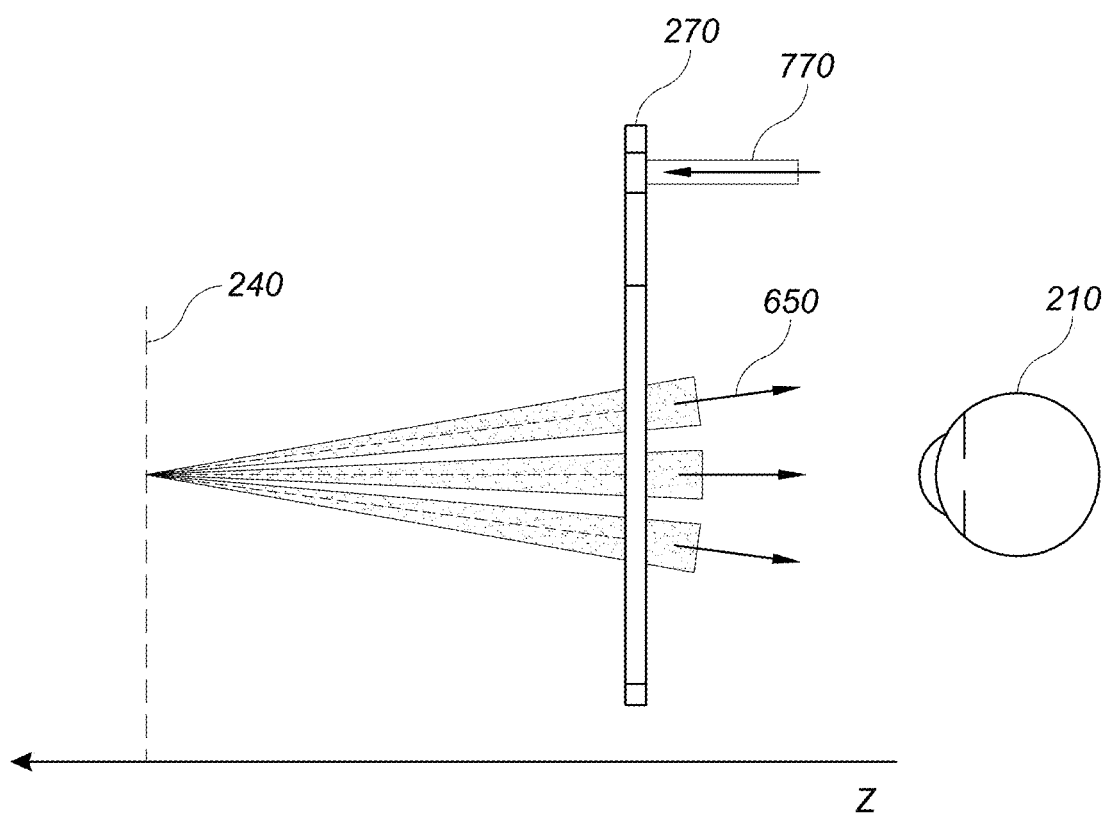
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 6:
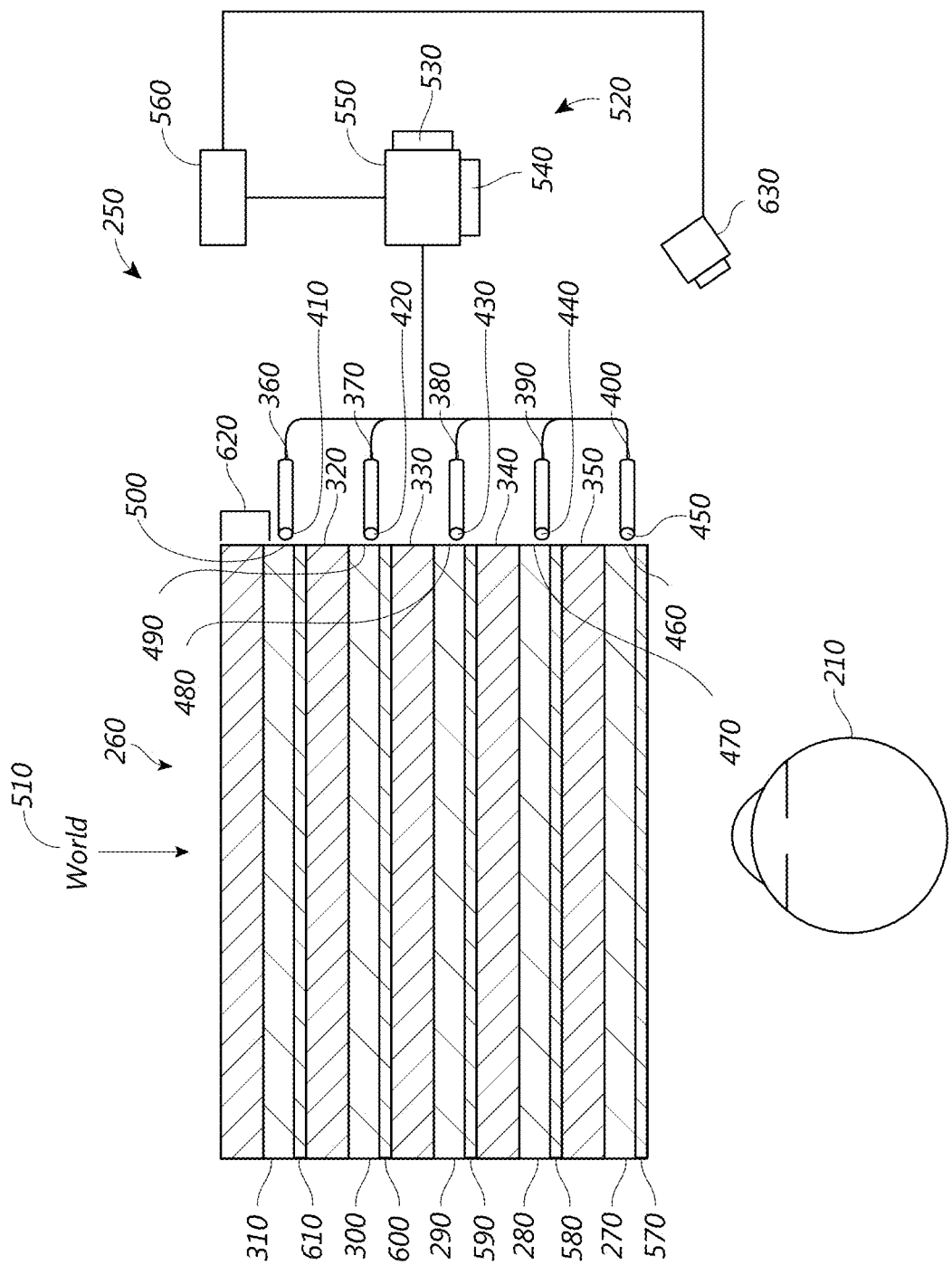
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). It will be appreciated that the major surfaces of a waveguide correspond to the relatively large area surfaces of the waveguide between which the thickness of the waveguide extends. In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
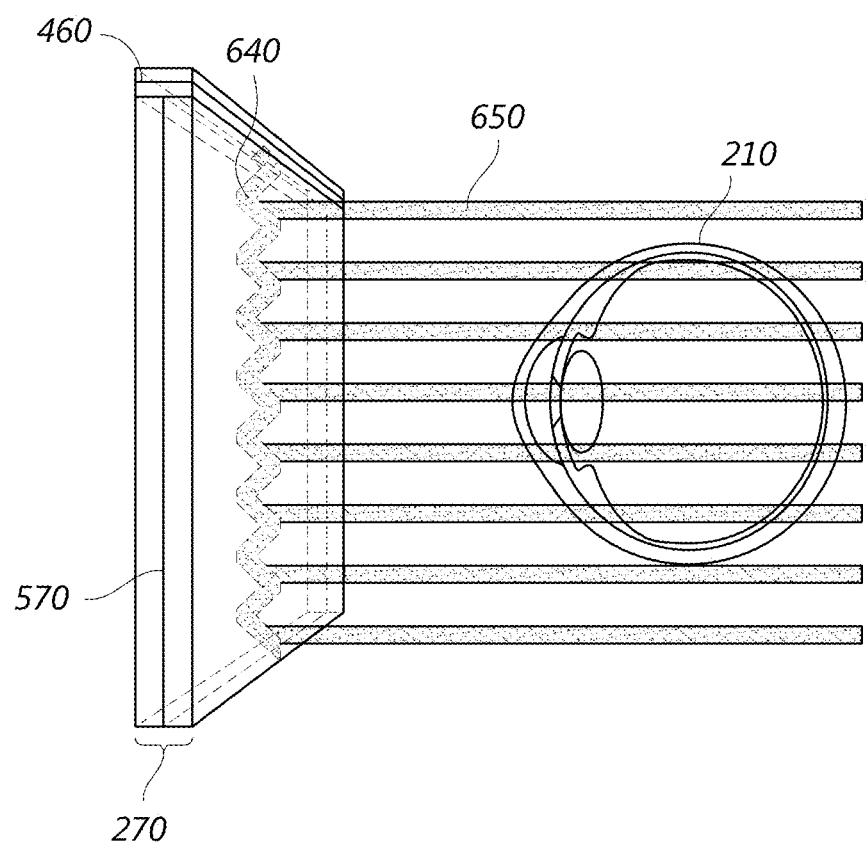
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
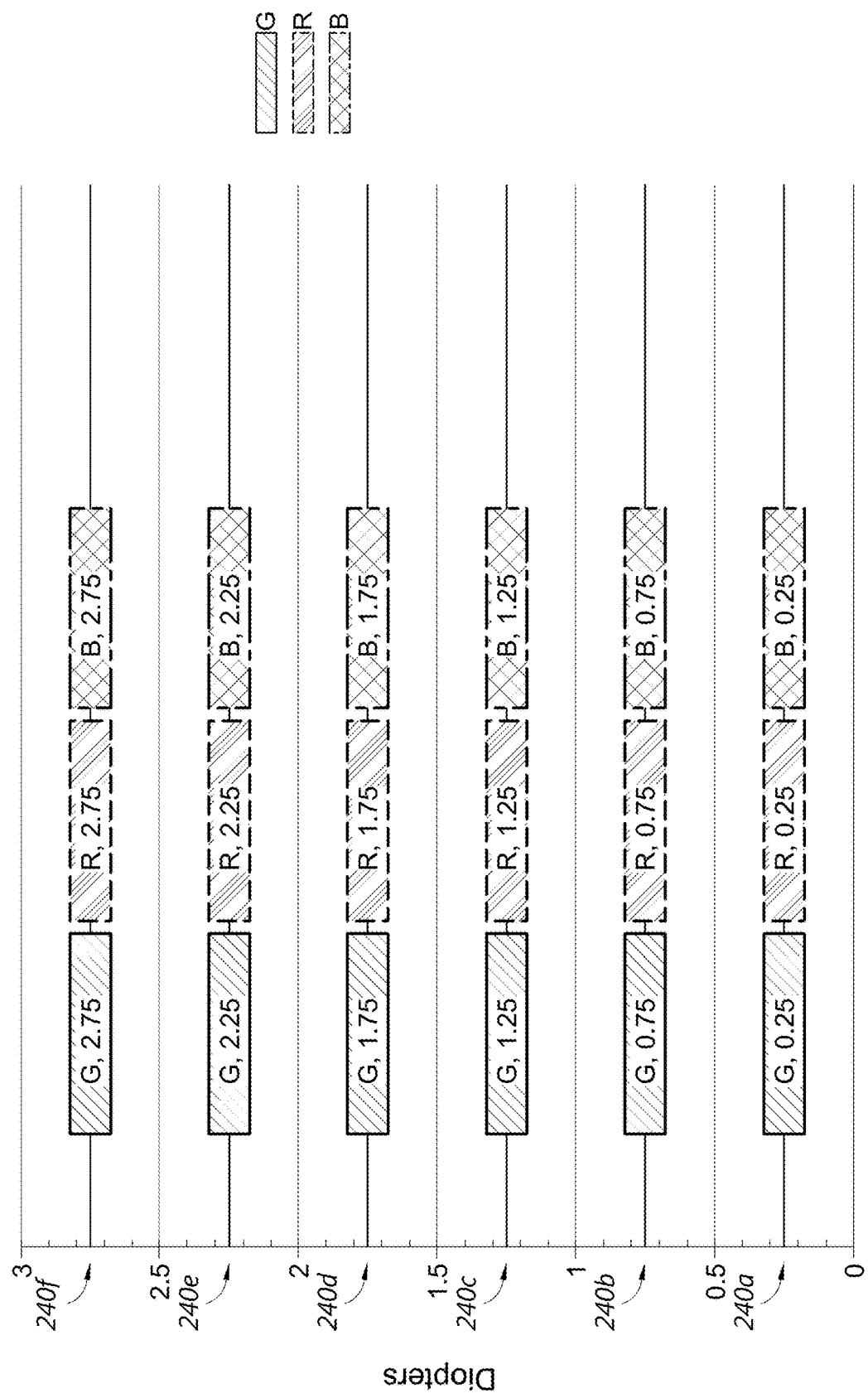
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f,* although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
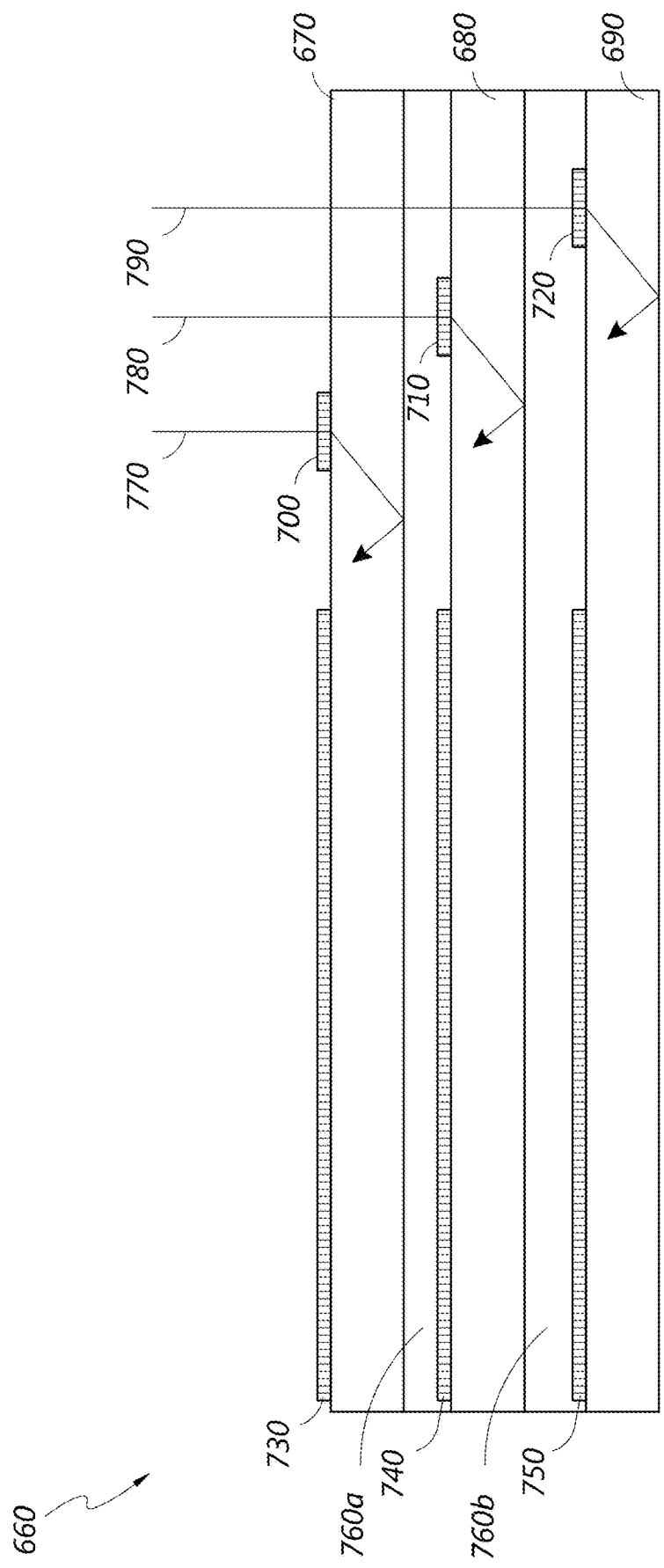
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
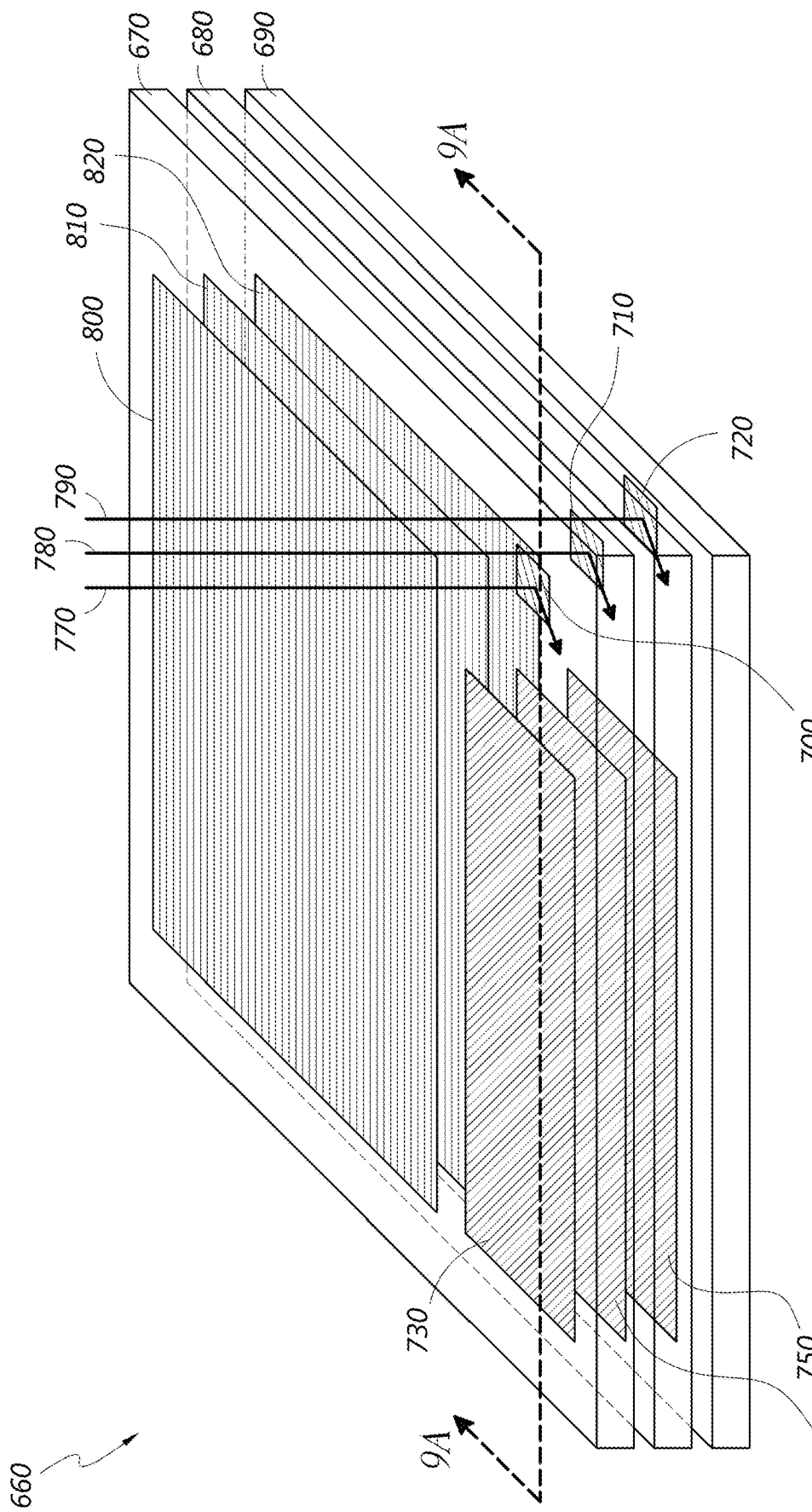
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
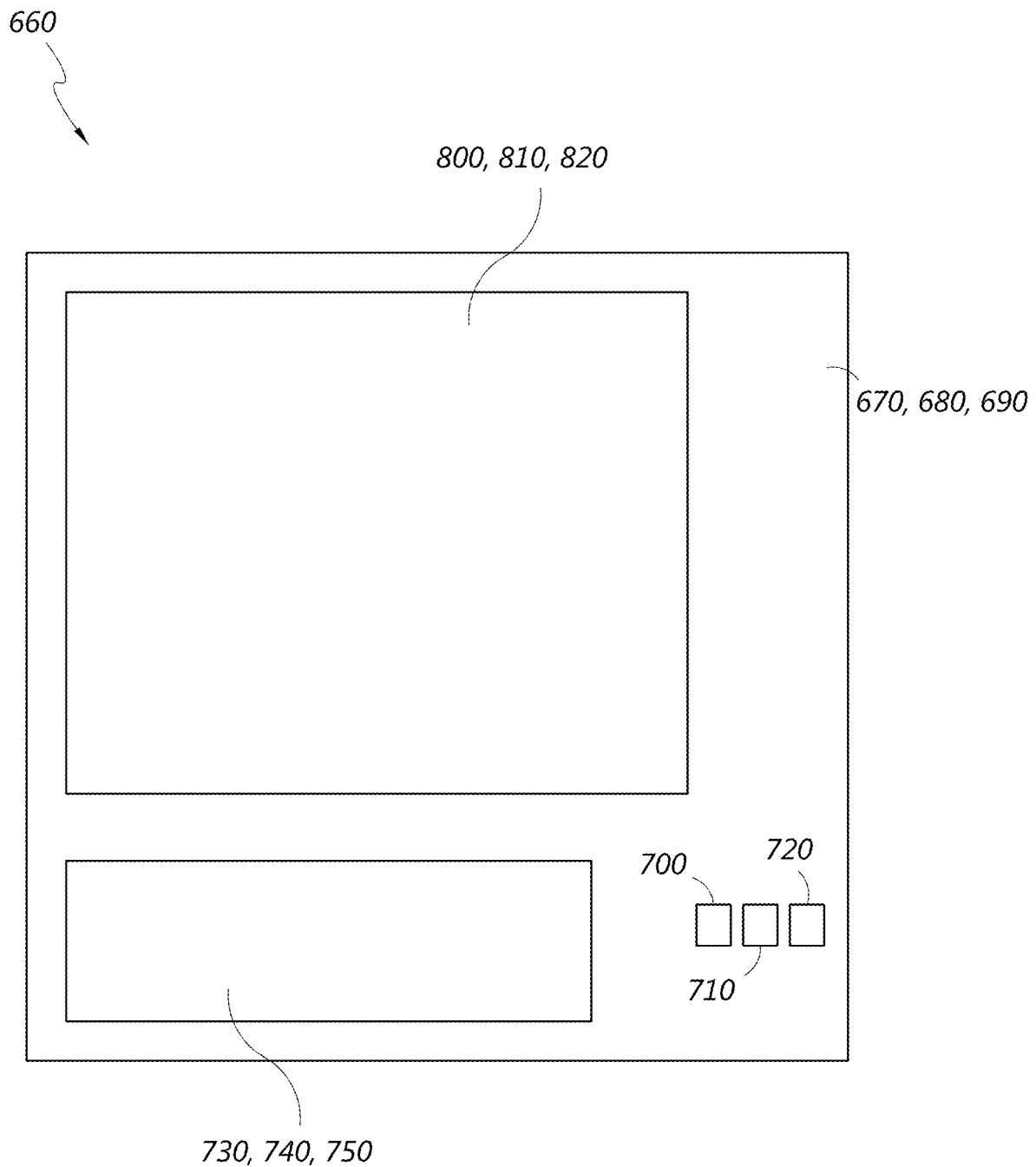
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
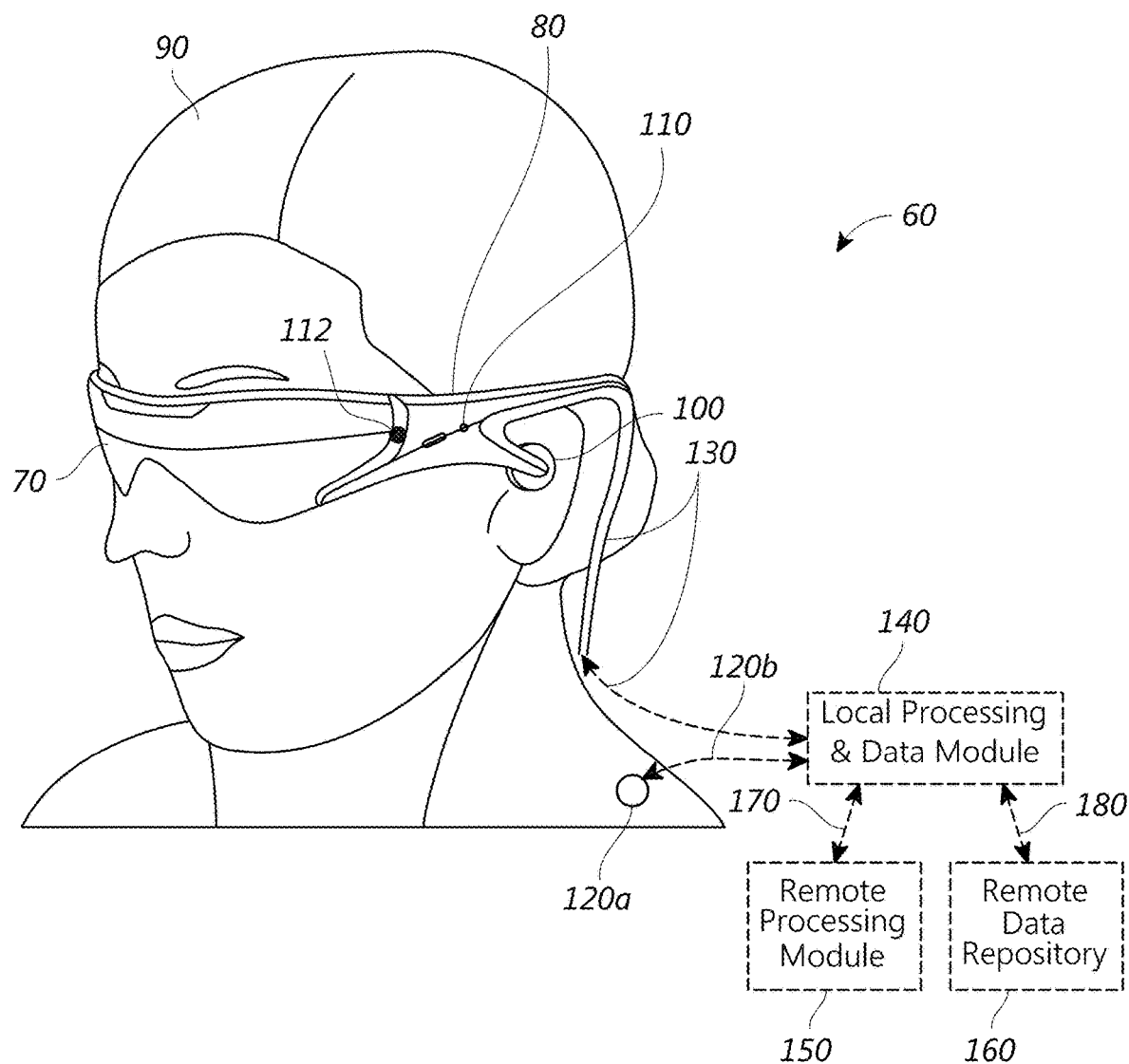
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Clipping Virtual Objects

Figure 10:
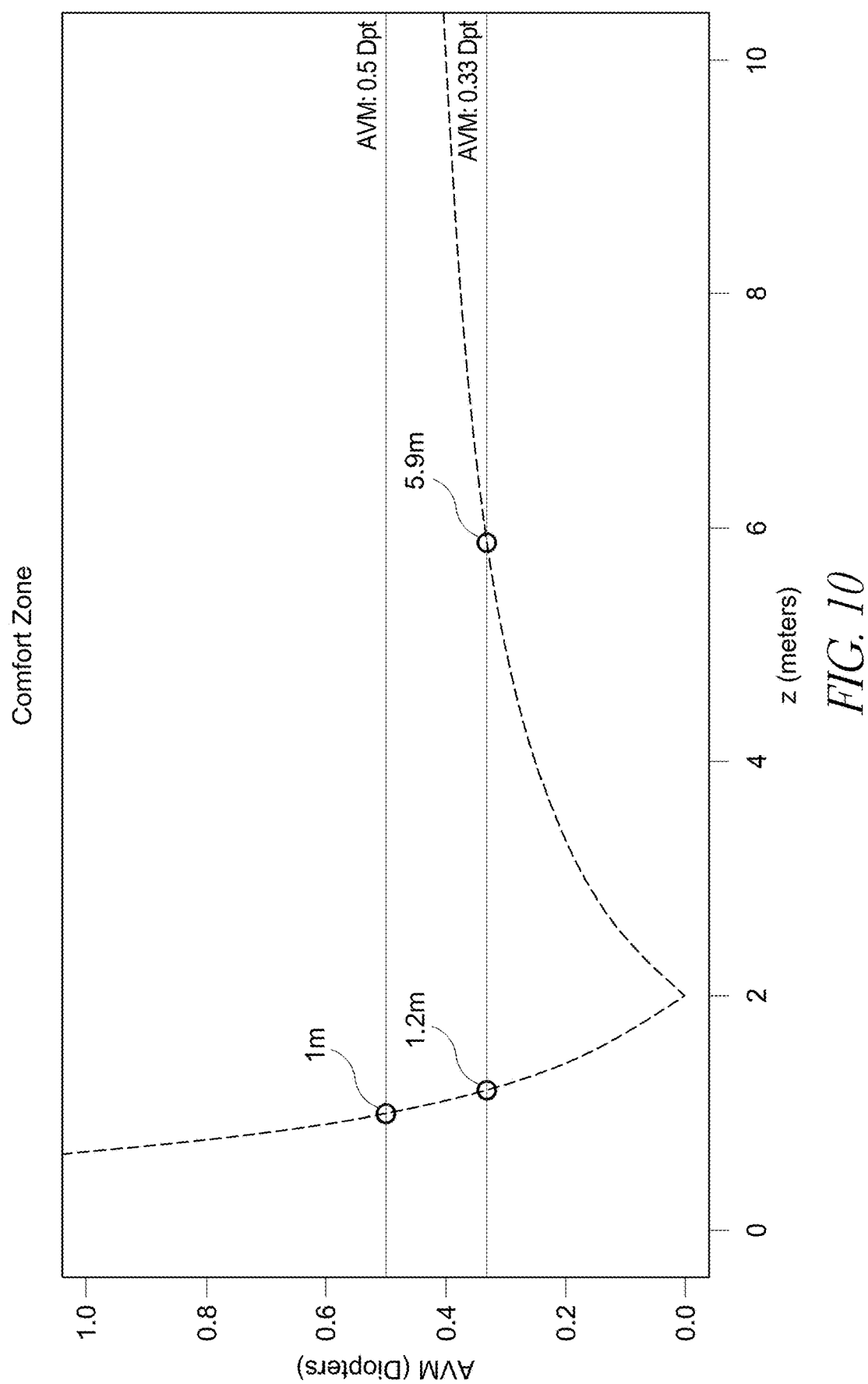
FIG. 10 illustrates an example of a plot of accommodation-vergence mismatch for a single depth plane display system.
Figure 11A:
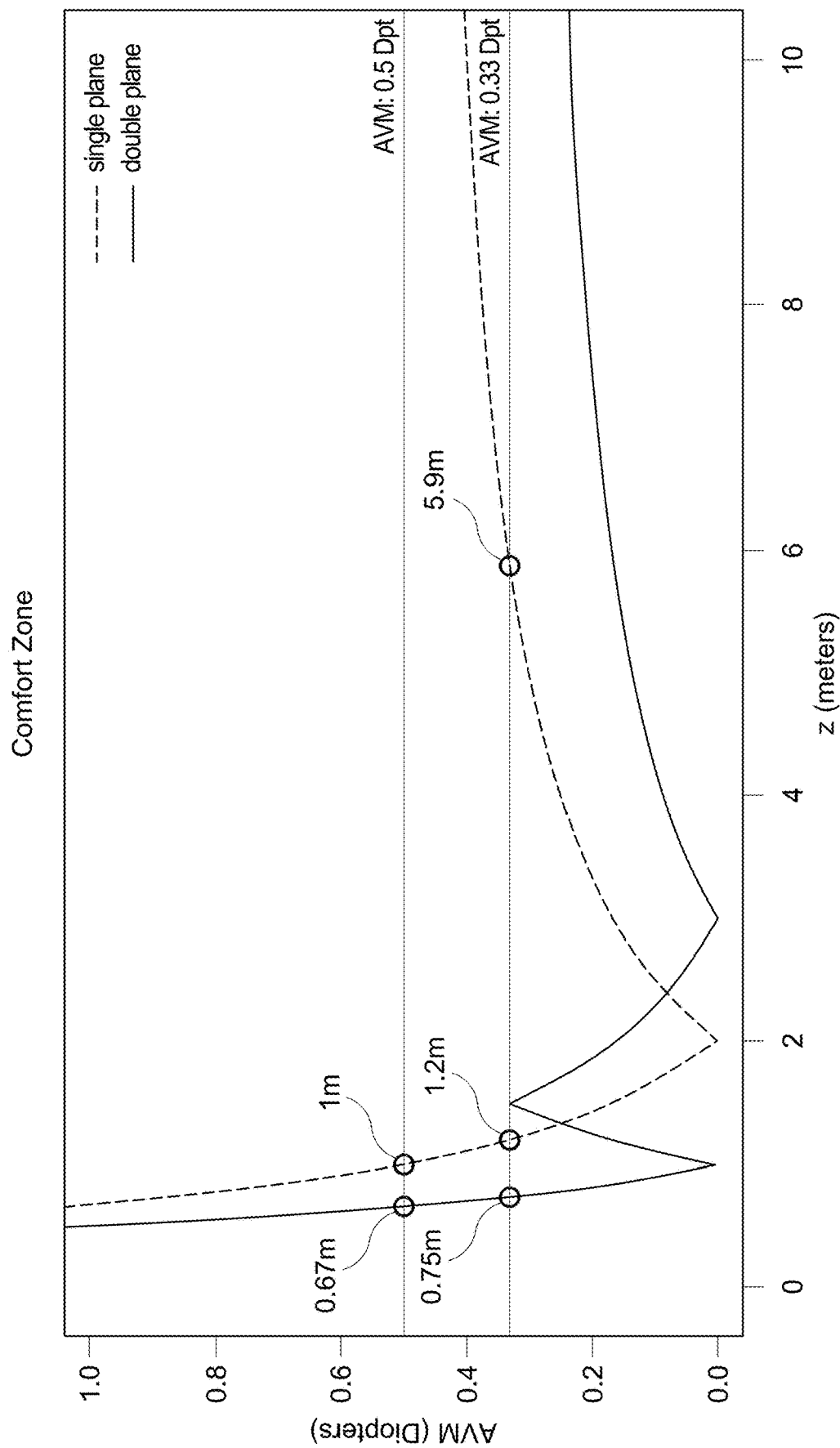
FIG. 11A illustrates an example of a plot of accommodation-vergence mismatch for a two depth plane display system and a one depth plane display system.
Figure 11B:
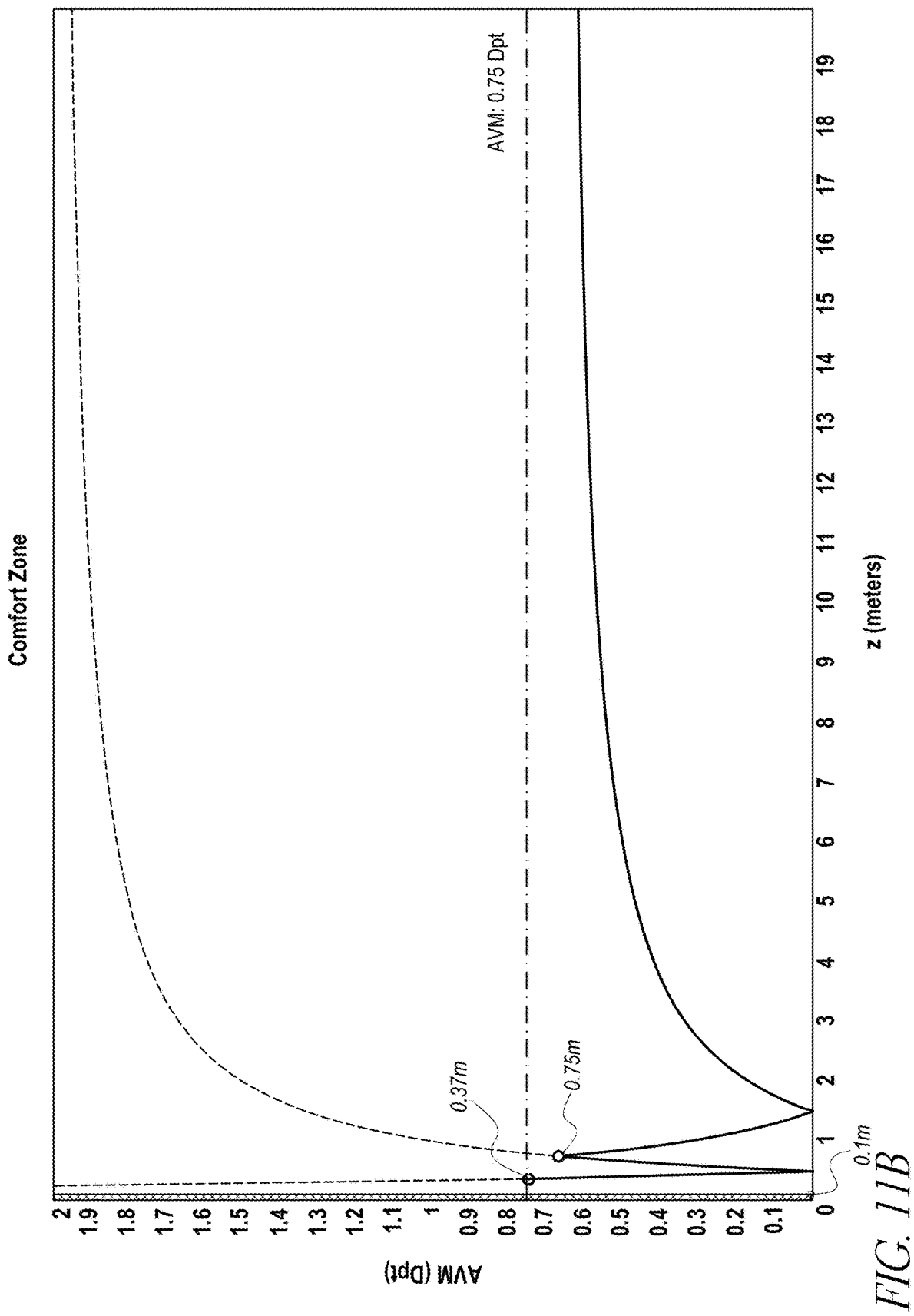
FIG. 11B illustrates another example of a plot of accommodation-vergence mismatch for a two depth plane display system.

As discussed herein, in some embodiments, it may be possible for a display system to display virtual objects with accommodation and vergence cues that are mismatched and for this mismatch to exceed comfortable levels. While the embodiments herein are not limited to any particular cause of mismatch, FIGS. 10-11B are provided as examples of how some mismatches may occur. In addition, in some embodiments, it will be appreciated that the distances at which unacceptable accommodation-vergence mismatches are understood to occur may vary depending on the gaze direction of the viewer. FIGS. 10-11B provide examples of mismatches which occur with the viewer directing their gaze straight ahead.

In some cases, accommodation-vergence mismatches may occur because the range of cues the display system may provide for one of accommodation and vergence exceeds the range of cues for the other of vergence and accommodation. For example, the display system may have a relatively small number of possible accommodative cues and a larger number of possible vergence cues. FIG. 10 illustrates an example of a plot of accommodation-vergence mismatch for a single depth plane display system. Such a display system outputs light with wavefront divergence corresponding to a single depth plane and, as such, may be understood to provide a single accommodative cue. The dotted line shows the accommodation-vergence mismatch at different (virtual) distances from the viewer. The horizontal axis corresponds to distance from the viewer, and a vertical axis corresponds to accommodation-vergence mismatch, which is also referred to herein as AVM. In the illustrated example, the single depth plane is positioned at 2 m, and virtual objects at that distance have an AVM of zero. At distances greater than 2 m (e.g., from z=2 m to z=optical infinity) the accommodation-vergence mismatch remains below 0.5 dpt. At closer distances, the mismatch increases and at a distance from the viewer of less than 1 m, the mismatch may exceed what is believed to be physiologically tolerated without discomfort. As a result, at distances less than 1 m, viewer discomfort may be expected simply from viewing the image content at that distance. Other examples of single depth plane display systems are disclosed in US 2018/0039083 and US 2017/0276948, the entire disclosures of which are incorporated by reference herein.

It will be appreciated that utilizing systems capable of providing content on larger numbers of depth planes can increase the number of possible accommodative cues and thereby decrease the range of distances at which viewer discomfort may be expected. FIG. 11A illustrates an example of a plot of accommodation-vergence mismatch for a two depth plane display system and a one depth plane display system. The solid line shows the two depth plane system and the dotted line shows the single depth plane system. It will be appreciated that the accommodation-vergence mismatch at large distances from the viewer is less for the two depth plane system, and that the two depth plane system allows content to be displayed at closer distances to the viewer while still maintaining an acceptable mismatch value. In some embodiments, the farthest depth plane may be within an acceptable mismatch value of optical infinity. As discussed herein, the acceptable mismatch may be about 0.75 dpt or less, about 0.66 dpt or less, about 0.5 dpt or less, about 0.33 dpt or less, or about 0.25 dpt or less. As illustrated, the acceptable mismatch may be 0.33 dpt. In some embodiments, the farthest depth plane may be set at 0.33 dpt (corresponding to 3 m from the user) and a closer, second depth plane may be set inward from the furthest depth plane by a value equal to two times the acceptable mismatch, e.g., 0.33 dpt×2, or 0.66 dpt. Consequently, the closer, second depth plane may be set at 1 dpt in some embodiments.

With continued reference to FIG. 11A, proceeding along the plot of the solid line from right to left (with decreasing distance from the user's eyes), the accommodation-vergence mismatch rises until the mismatch value of 0.33 dpt is observed. Consequently, given the illustrated placement of the farthest depth plane at 0.33 dpt, image content for virtual objects at distances of 1.2 m to infinity may be displayed on the same depth plane (set at 0.33 dpt or 3 m from the user's eyes) without appreciable discomfort, since all the image content within this range is within the acceptable mismatch. For virtual objects at distances closer than 1.2 m, as illustrated, a second depth plane may be provided. As noted above, the second depth plane may be at 1 dpt.

It will be appreciated that the distance represented by the acceptable mismatch of 0.33 dpt becomes smaller the closer a depth plane is placed to the user. In some other embodiments, it may be desirable to display virtual objects at closer than the minimum distance provided by a separation of 0.33 dpt from the 1 dpt depth plane. As illustrated, at distances of 0.75 m or less, the acceptable mismatch value increases above 0.33 dpt. Consequently, one or more additional depth planes may be provided for displaying image content at closer distances. For example, a third depth plane (not shown) may be formed to display image content at distances closer than 0.75 m. It will be appreciated that each of the depth planes are separated from the nearest neighboring depth plane by twice the acceptable mismatch or less. Thus, it is possible to change the range of distances at which undesirably large accommodation-vergence mismatches (AVMs) occurs by setting depth planes at different distances. For example, in some embodiments, AVMs that exceed a threshold value may be proximate the viewer when the nearest depth plane (or single depth plane) is sufficiently far away from the viewer. In some other embodiments, AVMs that exceed a threshold value may occur at distances away from the viewer, e.g., proximate optical infinity, when the farthest depth plane (or single depth plane) is sufficiently close to the viewer.

With reference now to FIG. 11B, another example is illustrated of a plot of accommodation-vergence mismatch for a two depth plane display system. In this example, the innermost or close depth plane to the viewer is set at 0.5 m (2 dpt) and the outermost or farthest depth plane from the viewer is set at 1.5 meters (0.66 dpt), with an AVM threshold of 0.66 dpt. In some embodiments, the AVM threshold at distances closer than the innermost depth plane is set at a higher value than the AVM threshold at distances farther than the innermost depth plane. For example, the AVM threshold at distances closer than the innermost depth plane may be 0.75 dpt, such that the observed AVM does not exceed a threshold for discomfort until distances of 0.37 m or closer from the viewer.

Figure 11C:
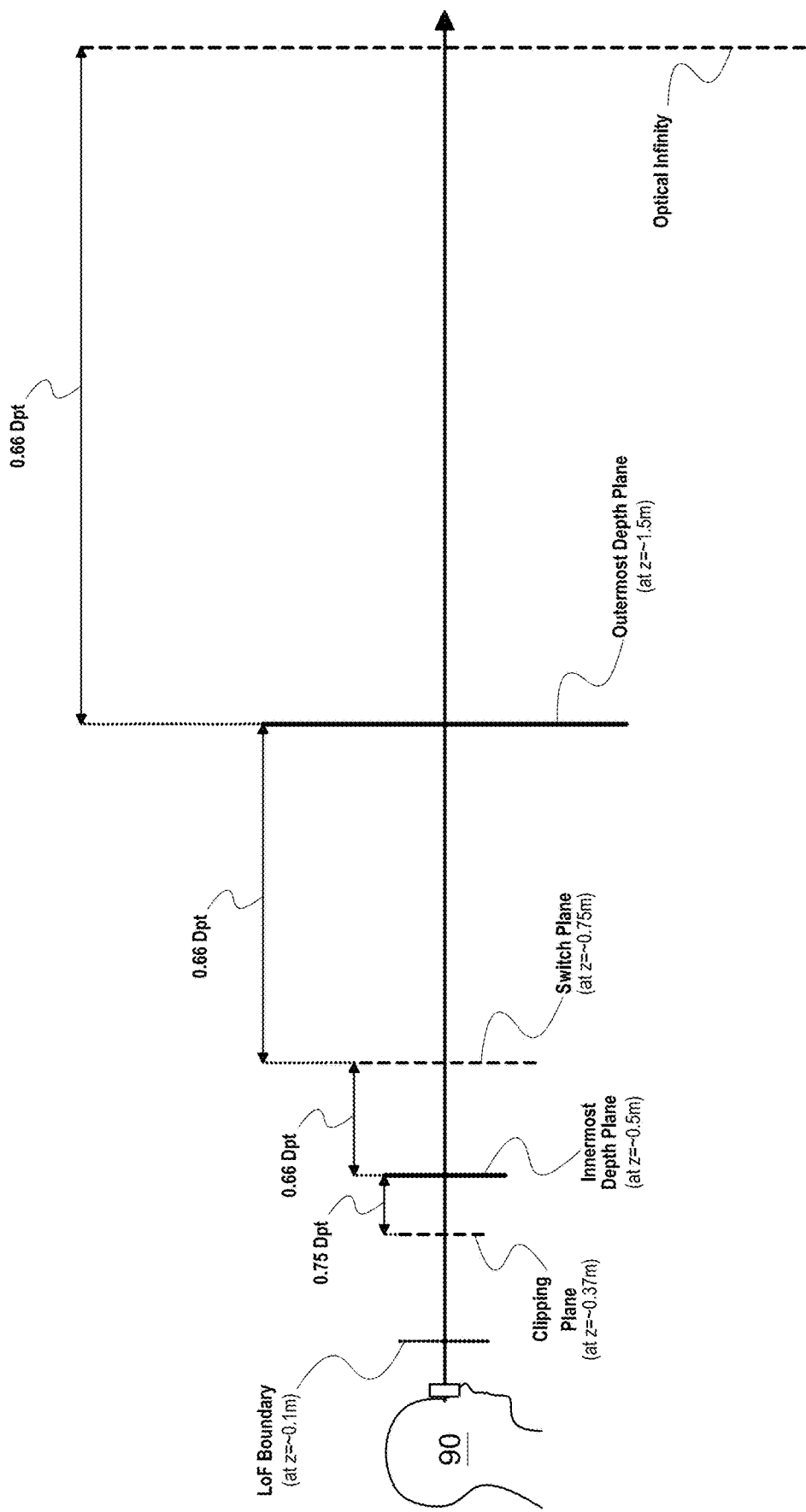
FIG. 11C illustrates another representation of the two depth configuration of FIG. 11B.

FIG. 11C illustrates another representation of the two depth plane configuration of FIG. 11B, with the innermost depth plane set at 0.5 m from the viewer and the outermost depth plane set at 1.5 m from the viewer. As illustrated, given an AVM tolerance of 0.66 dpt, the outermost depth plane is 2×0.66 dpt (1.32 dpt) from optical infinity and the innermost depth plane is 2×0.66 dpt (1.32 dpt) from the outermost depth plane. At distances closer to the viewer than the innermost depth plane, the AVM tolerance may be 0.75 dpt, which corresponds to a distance of 0.37 m from the viewer. Thus, in some embodiments, the AVM discomfort zone may be understood to encompass a volume formed by a boundary that intersects a point that is 0.37 m from the viewer. In addition, the viewer may have a LoF zone with a boundary intersects a point at 0.1 m from the viewer. More generally, in some embodiments, it will be appreciated that the boundary of the AVM discomfort zone may be set based upon the AVM tolerance from the innermost depth plane.

With reference again to FIG. 11B, proceeding from right to left, the accommodation-vergence mismatch rises until the mismatch value of 0.75 dpt is observed. Consequently, given the illustrated placement of the farthest depth plane at 0.33 dpt, image content for virtual objects at distances of 1.2 m to infinity may be displayed on the same depth plane (set at 0.33 dpt or 3 m from the user's eyes) without appreciable discomfort, since all the image content within this range is within the acceptable mismatch. For virtual objects at distances closer than 1.2 m, as illustrated, a second depth plane may be provided. As noted above, the second depth plane may be at 1 dpt.

As is evident from FIGS. 10-11B, the potential for viewer discomfort may increase with decreasing distance to the viewer, or increasing distance from the viewer, depending upon where the closest or the farthest depth plane provided by the display system is situated. In some embodiments, a display system may have a finite number of depth planes, with the depth plane nearest a viewer set at a particular distance from the viewer. The display system may provide a particular accommodation cue for virtual content at this depth plane. Since vergence cues may be provided by changing the images provided to each eye, the display system may be capable of providing a large number of vergence cues at distances closer than the distance of the depth plane closest to the viewer. As a result, while the display system provides a single accommodation cue at close distances, it may provide a large number of vergence cues, which causes the vergence and accommodation distances to increasingly diverge with increasing distance from the depth plane, in the direction of the viewer, or away from the viewer; that is, AVM may increase the closer content is to a viewer, and also may increase the farther (from the depth plane) that content is to the viewer. At some distances close to a viewer the differences between vergence and accommodation distances exceeds a threshold, the AVM threshold, for viewer comfort. In addition, depending upon where the farthest depth plane is, at some distances away from the viewer, the differences between vergence and accommodation distances may also exceed the AVM threshold for viewer comfort. Thus, it will be appreciated that AVM thresholds can be expressed as distances from a viewer, e.g., as distances from a viewer's eyes. As a viewer rotates their head and/or eyes, these distances may be mapped to define surfaces which define volumes around the viewer. For example, distances in a contiguous volume at which AVMs exceed threshold values for viewing comfort may define an AVM discomfort zone. In addition, as discussed herein, viewers may also have an inability to fuse images of objects seen by their left and right eyes at close distances, or at least an inability to fuse images of objects seen by their left and right eyes at close distances without experiencing undue eye strain. The volume defined by these close distances to the viewer may be referred to as a loss-of-fusion zone (LoF zone).

Figure 12A:
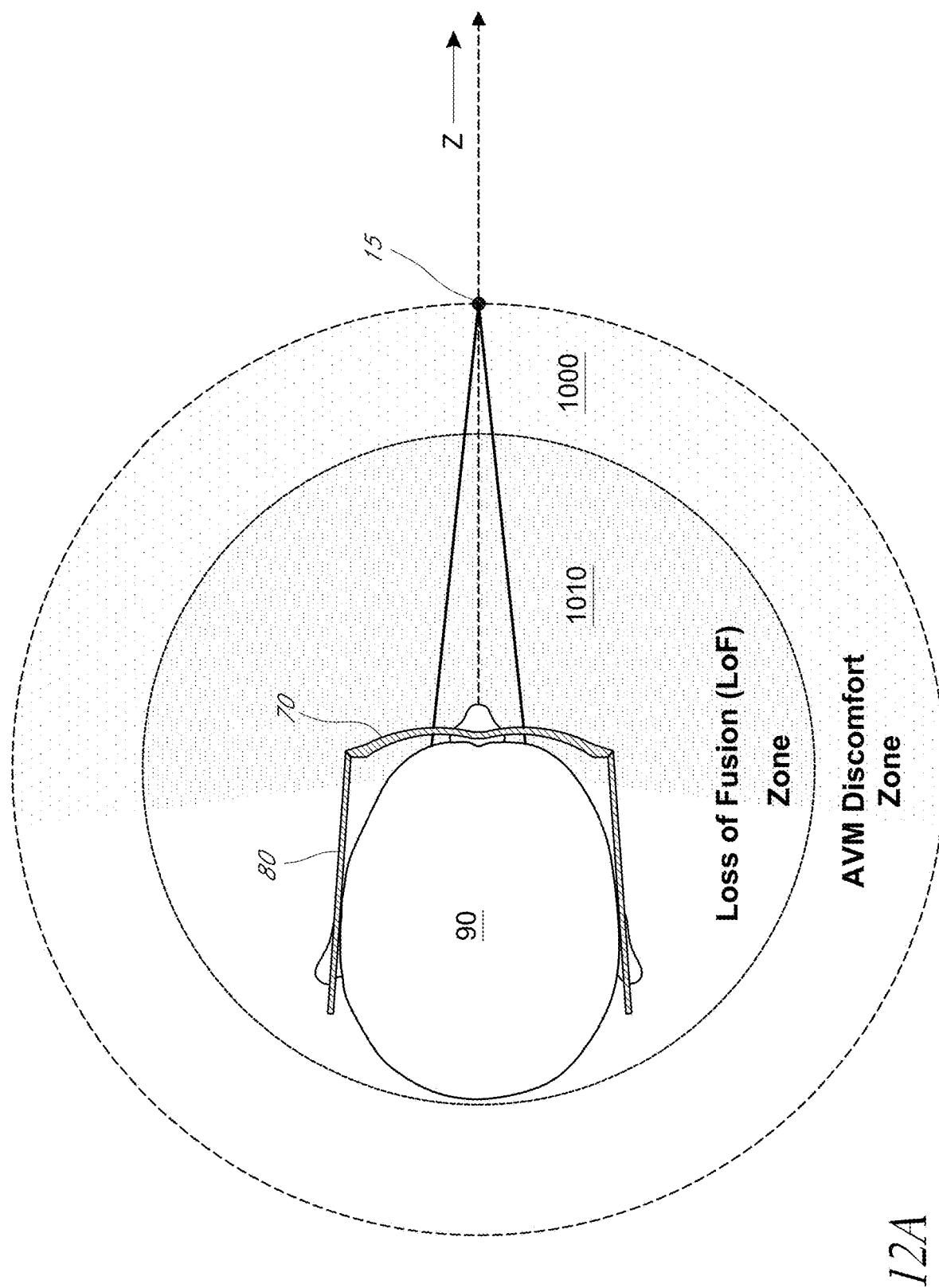
FIG. 12A illustrates an example of a top-down, schematic view of an accommodation-vergence mismatch (AVM) discomfort zone and a loss-of-fusion zone and relative to a viewer.

An example of a representation of an AVM discomfort zone and a LoF zone is shown in FIG. 12A. FIG. 12A illustrates a top-down, schematic view of an accommodation-vergence mismatch (AVM) discomfort zone and a loss-of-fusion (LoF) zone relative to a viewer. It will be appreciated that content in these zones close to the viewer may cause discomfort due to AVMs that exceed comfortable levels, as discussed above regarding FIGS. 10-11C, but such content may nevertheless be desirable for presentation to the viewer for other reasons. For example, such content may be present in a scene to preserve the naturalness of the scene; simply clipping the content may diminish the viewer's sense of immersion and realism. For example, the content may include virtual objects that move close to a viewer's head (e.g., a virtual butterfly flying next to a viewer's head, leaves falling next to the viewer, etc.), virtual "mud" or "dirt" on virtual goggles, virtual "cracks" in the eyepiece or virtual goggles, a virtual firearm or other object associated with the user's arms/hands and which the user could bring close to their face, virtual skis on the user's shoulders, etc. However, all or part of this virtual content may be present at close distances to the viewer, including distances at which AVM's cause undesirable viewer discomfort. In some embodiments, the display of content that is determined to cause an unacceptable accommodation-vergence mismatch (that is, content within the AVM discomfort zone that is being verged on by the viewer's eyes) is modified to guard against such viewer discomfort.

It will be appreciated that, as discussed herein, the determination of AVM relies on a determination of mismatches between accommodation and vergence distances. The mismatches occur where the viewer is verging on and accommodating to a virtual object. As a result, a mismatch is not typically expected to occur for virtual objects that the viewer is not verging on since there may be no vergence or accommodation distance associated with such an object. Stated another away, preferably, any modification of the display of a virtual object only occurs for those objects that both are within an AVM discomfort zone and are being verged on by the viewer's eyes. Without being limited by theory, it is believed that, even where content is within an AVM discomfort zone, the viewer does not experience discomfort unless they are verging on the content within the AVM discomfort zone. In some embodiments, if the viewer is not verging on a point within an AVM discomfort zone, then it is assumed that the AVM threshold for discomfort is not exceeded and modification of content due to accommodation-vergence mismatches is not necessary. In addition or alternatively, in some embodiments, if the viewer is not verging on particular content, it is assumed that the AVM threshold for discomfort does not apply and modification of that content is unnecessary, even if it is within an AVM discomfort zone.

In addition, there may be certain types of content for which modification is not performed, even if it is within the AVM discomfort zone and the viewer is verging on it. For example, "occlusion content" is preferably not modified even if it otherwise meets the criteria for modification. It will be appreciated that occlusion content includes content which occludes or blocks other virtual content or real objects. Examples of such content include virtual walls or other obstructions. Preventing the display of such content may undesirably reduce the viewer's sense of immersion in the scene and/or undesirably allow the viewer to see other content or real objects, which may provide an unfair advantage in a game. In some embodiments, such content is not modified even if it may cause viewing discomfort. For example, content is not modified even if analyzed to determine the cause viewer discomfort. More preferably, the content is determined to be "occlusion content" and is simply not analyzed for modification as disclosed herein.

With continued reference to FIG. 12A, the viewer 90 is shown wearing the display system frame 80, which supports the display 70. The viewer 90's eyes are verging on a point 15 (the fixation point) on the optical z-axis. The point 15 is located at the outer boundary of the AVM discomfort zone 1000. As discussed herein, virtual objects displayed within the AVM discomfort zone 1000 have an AVM that exceeds threshold values for viewing comfort. In some embodiments, the AVM within the AVM discomfort zone 1000 exceeds 0.25 dpt. In some other embodiments, the AVM within the AVM discomfort zone 1000 exceeds 0.33 dpt. In yet other embodiments, the AVM within the AVM discomfort zone 1000 exceeds 0.5 dpt, 0.66 dpt, or 0.75 dpt.

With continued reference to FIG. 12A, the LoF zone 1010 is situated within the AVM discomfort zone 1000. In some embodiments, the AVM discomfort zone 1000 has a circular or spherical outer boundary with a radius of about 15 cm from a midpoint between the eyes of the viewer 90. The distance from the midpoint to the outer boundary of the AVM discomfort zone 1000 may be referred to as the accommodation-vergence mismatch threshold distance (AVM threshold distance). In some embodiments, the LoF zone 1010 has a circular or spherical outer boundary with a radius of about 10 cm from the same midpoint. The distance from the midpoint to the outer boundary of the LoF zone 1010 may be referred to as the loss-of-fusion threshold distance (LoF threshold distance). It will be appreciated that the illustrated shapes of the boundaries of the zones 1000, 1010 are examples and the zones may have outer boundaries that assume other shapes. For example, such boundaries may extend outward conically (e.g., in a manner similar to field of view or field or regard), or may take on the shape of at least one theoretical or empirical horopter. In such embodiments, the outer boundary of the AVM discomfort zone 1000 may vary, in which case the AVM threshold distance may also vary depending on the direction that the viewer's eyes are directed. Similarly, in such embodiments, the outer boundary of the LoF zone 1010 may vary, in which case the LoF threshold distance may also vary depending on the direction that the viewer's eyes are directed. Furthermore, for examples in which the LoF zone 1010 is defined in terms of vergence angle (i.e., such that the LoF zone 1010 includes points in three-dimensional space associated with relatively wide viewer vergence angles), it is to be understood that the geometry of the outer boundary may vary by virtue of the trigonometric relationship between viewing distance and viewer vergence angle. Within the context of FIG. 12A, the vergence angle associated with point 15 may correspond to the angle formed between (i) the line depicted as extending from point 15 to the right eye of viewer 90, and (ii) the line depicted as extending from point 15 to the left eye of viewer 90. Vergence angles associated with any other point in three-dimensional space may similarly correspond to the angle formed at the intersection of rays extending from the respective point to the left and right eyes of viewer 90.

Figure 12B:
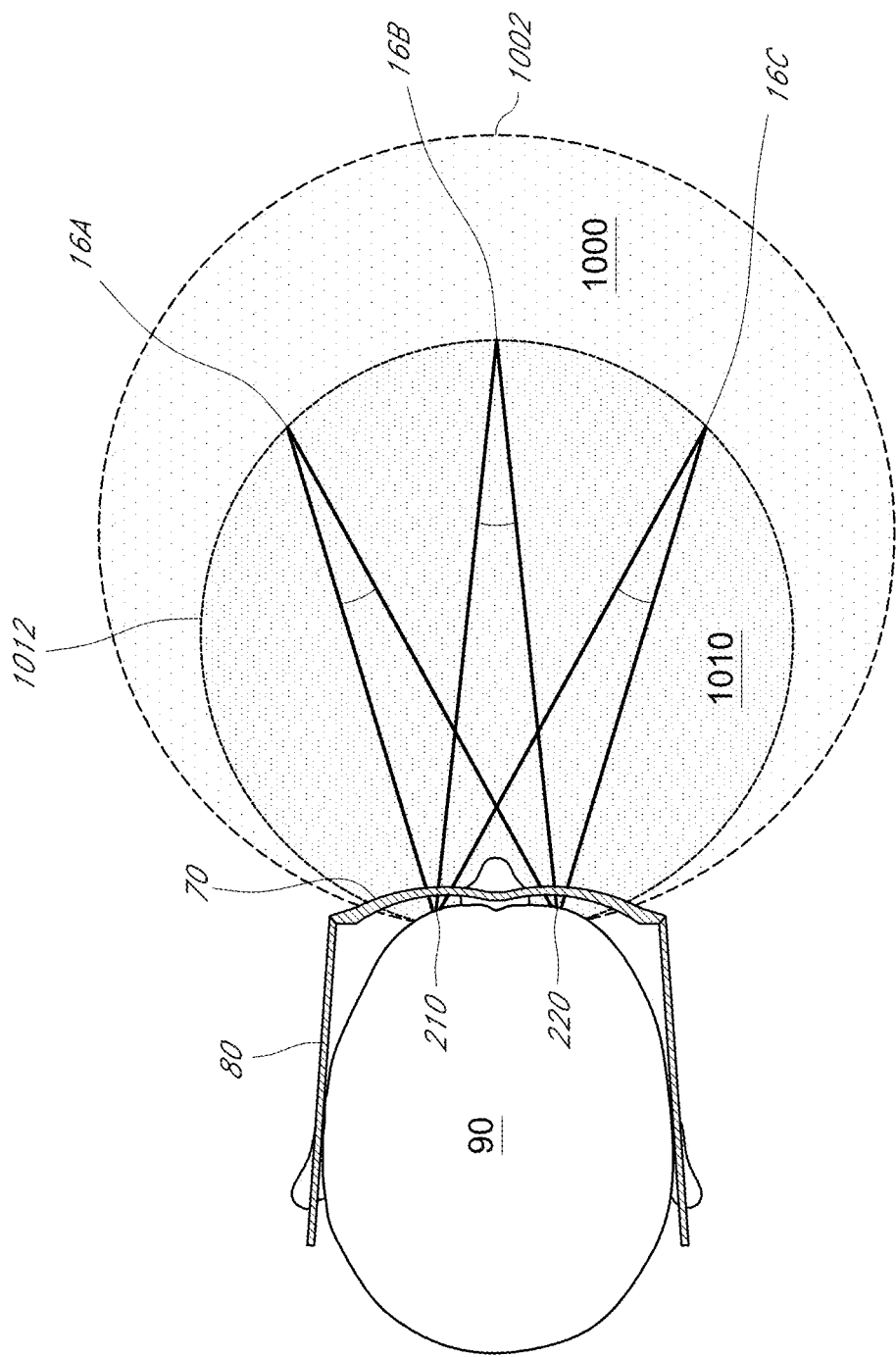
FIG. 12B illustrates another example of a top-down, schematic view of an accommodation-vergence mismatch (AVM) discomfort zone and a loss-of-fusion zone relative to a viewer.

FIG. 12B illustrates another example of a top-down, schematic view of an accommodation-vergence mismatch (AVM) discomfort zone and a loss-of-fusion zone relative to a viewer. As discussed herein, the boundaries of one or both of the AVM discomfort zone 1000 and LoF zone 1010 may generally follow the contours of a theoretical or empirical horopter. For example, the boundary 1012 of the LoF zone 1010 may include a plurality of points, such as 16A, 16B, 16C, that projected onto corresponding locations on the retina of each eye 210, 220. In this example, the angle formed by the intersection of rays extending outward from eye 210 and eye 220 at point 16A may be substantially equal to the angle formed by the intersection of rays extending outward from eye 210 and eye 220 at point 16B, which may in turn be substantially equal to the angle formed by the intersection of rays extending outward from eye 210 and eye 220 at point 16C. That is, every point positioned along the boundary 1012 of the LoF zone 1010 may be associated with substantially the same viewer vergence angle. Points that do not project onto corresponding locations on the retinas of each eye 210, 220 may not be fused and may not be seen as a single point by the viewer 90. For example, points closer to the viewer 90 than the boundary 1012 (i.e., points associated with vergence angles greater than those associated with points 16A, 16B, 16C) may not be seen as a single point by the viewer 90. It will be appreciated, however, that the human visual system has a limited tolerance for points that do not project onto exactly corresponding locations of each retina; that is, there is a range of points in front of and behind the horopter that are still properly fused by the human visual system even if they do not project onto exactly corresponding locations of the retinas of the eyes 210, 220. Such a range of points is sometimes referred to as "Panum's fusional area" or "Panum's area of fusion." Consequently, in some environments, the boundary 1012 may be closer to the viewer than the horopter. For example, the theoretical or empirical horopter may be between the boundaries 1012 and 1002.

Figure 12C:
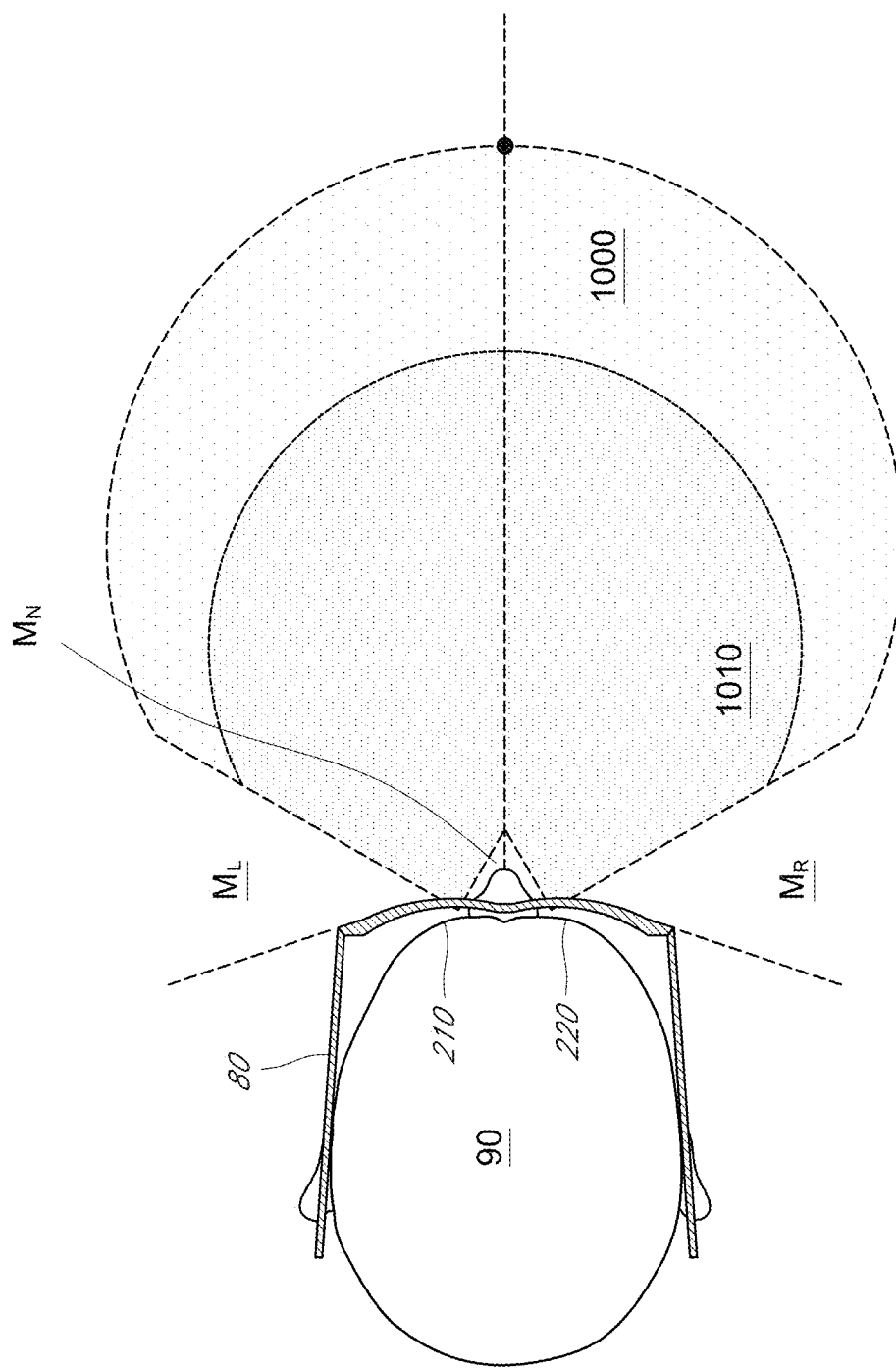
FIG. 12C illustrates an example of a top-down, schematic view of an AVM discomfort zone taking into account the monocular fields of view of a viewer.

As discussed herein, the AVM discomfort zone 1000 may be a volume in which the accommodation-vergence mismatch levels of virtual content exceed the accommodation-vergence mismatch tolerances of the viewer. As such, it will be appreciated that there are portions of the user's field of view in which accommodation-vergence mismatches may not occur due to, e.g., the occurrence of monocular vision. FIG. 12C illustrates an example of a top-down, schematic view of an AVM discomfort zone, taking into account the monocular fields of view of a viewer. The general shape and size of the AVM discomfort zone 1000 shown in FIG. 12C may be similar to the AVM discomfort zone illustrated in FIG. 12B, except that the AVM discomfort zone 1000 does not extend into monocular vision regions $M_L$ and $M_R$. Monocular vision regions $M_L$ and $M_R$ correspond to peripheral portions of the viewer's field of view in which content is seen by only one eye. For example, monocular vision region $M_L$ may be the portion of the field of view or volume in which only the left eye 210 of the viewer 90 is able to see content, while the right eye 220 of the viewer is unable to see content within this portion or volume. On the other hand, monocular revision region $M_R$ may be the portion of the field of view or volume in which only the right eye 220 of the viewer 90 is able to see content, while the left eye 210 of the viewer is unable to see content within this portion or volume. As such, in some embodiments, a display system configured to clip virtual content may be configured to not clip content displayed within the monocular vision regions $M_L$ and $M_R$, e.g., this content may be considered to be outside of the AVM discomfort zone 1000. Similarly, it will be understood that the content displayed only to one eye will not trigger an unacceptable accommodation-vergence mismatch and, as such, will not be clipped by the display system. In some examples, the border between the AVM discomfort zone 1000 and monocular vision region $M_L$ may be oriented between 50 and 60 degrees left of the center of the field of view (FOV) of the viewer 90, and the border between the AVM discomfort zone 1000 and monocular vision region $M_R$ may be oriented between 50 and 60 degrees right of the center of the FOV of the viewer 90.

With continued reference to FIG. 12C, the AVM discomfort zone 1000 may exclude a volume $M_N$ immediately adjacent the nose of the viewer 90. It will be appreciated that content within this volume $M_N$ may be seen by both eyes 210, 220, but is so close to those eyes that they are physically unable to rotate sufficiently to converge onto that content, even with conscious effort by the viewer 90. As such, because there is no vergence on that content, the display system may be configured to assume that no unacceptable accommodation-vergence mismatch would occur within the volume $M_N$.

As discussed herein, the location of an AVM discomfort zone depends upon the AVM threshold distance (which may vary for different viewers) and the location of depth planes provided by the display system. Consequently, in some embodiments, where the farthest depth plane is sufficiently close to a viewer, the display system may provide wavefront divergence corresponding to objects close to the viewer, but may not provide amounts of wavefront divergence that correspond to objects far from the viewer, e.g., objects at optical infinity or proximate optical infinity. Thus, in some embodiments, an AVM discomfort zone may encompass optical infinity. In addition, in some embodiments, if the closest depth plane is sufficiently far from the viewer, another AVM discomfort zone may be present proximate the viewer.

Figure 12D:
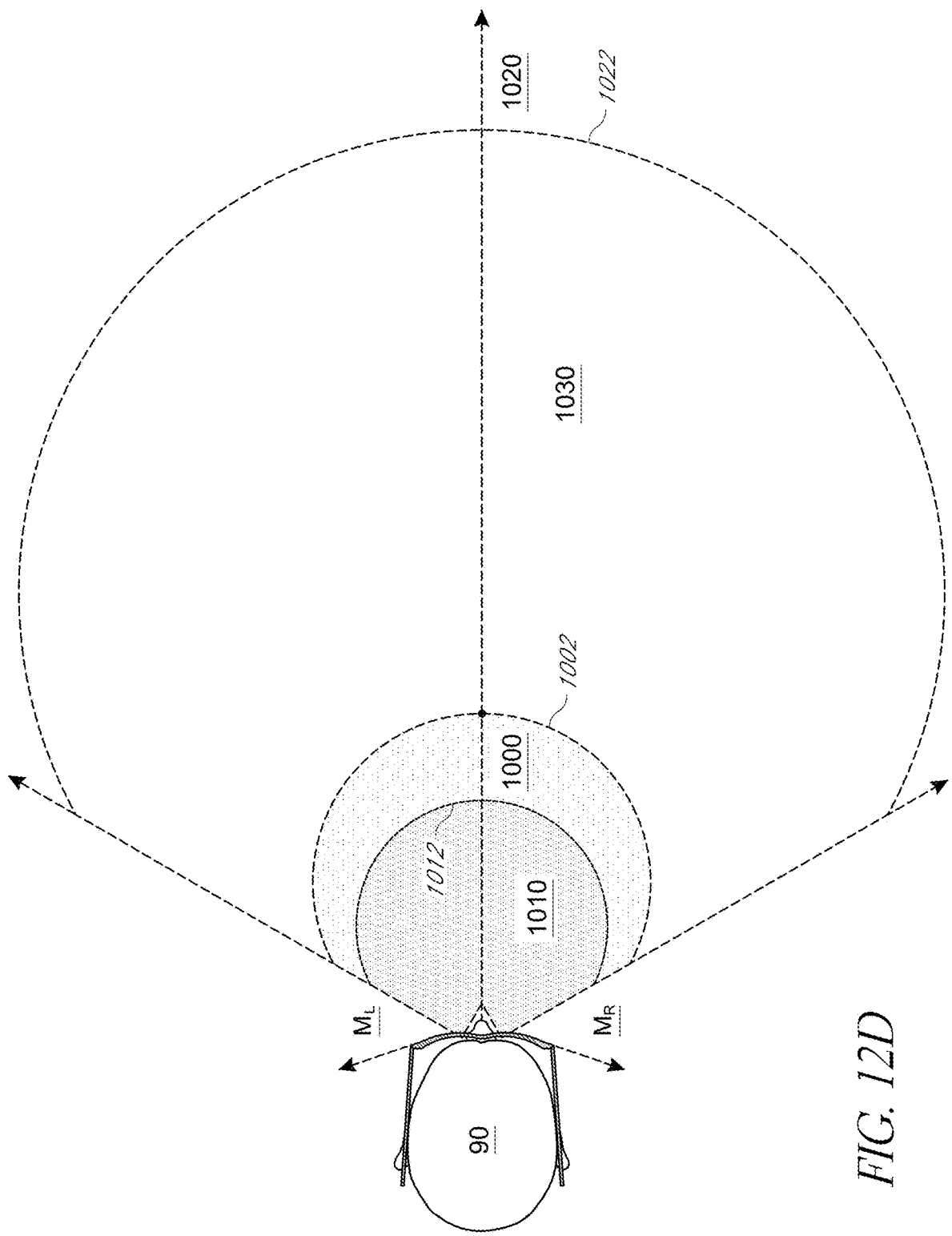
FIG. 12D illustrates an example of a top-down, schematic view of an AVM discomfort zone encompassing optical infinity.

FIG. 12D illustrates an example of a top-down, schematic view of an AVM discomfort zone encompassing optical infinity. In this example, the farthest depth plane provided by the display system is at a distance less than the boundary 1022 of the far AVM discomfort zone 1020. However, this depth plane is sufficiently close to the viewer 90 that at the distance of the boundary 1022, the AVM threshold is exceeded. As a result, content provided at distances greater than the boundary 1022 is within the far AVM discomfort zone 1020. In some embodiments, where a closest depth plane is sufficiently close to the viewer 90 that the AVM threshold is not exceeded for distances between the depth plane and the boundary 1012 of the LoF zone 1010, the display system may include only the far AVM discomfort zone 1020 and the LoF zone 1010.

In some other embodiments, the display system may include both the far AVM discomfort zone 1020 and the near AVM discomfort zone 1000. This may occur, for example, where the closest depth plane provided by the display system is at a distance sufficiently far from the viewer 90 that, before virtual content reaches the LoF zone 1010, the AVM threshold is exceeded. The distance at which the AVM threshold is exceeded near the viewer 90 defines the boundary 1002 of the near AVM discomfort zone 1000. In some embodiments, the volume between the boundaries 1002 and 1022 may be understood to be an AVM comfort zone 1030 in which the AVM threshold is not exceeded. In some other embodiments, where the AVM discomfort zone 1000 is not present, the AVM comfort zone 1030 may be understood to extend between the boundary 1012 of the LoF zone 1010 and the boundary 1022 of the AVM discomfort zone 1020. In some implementations, the boundary 1022 may correspond to an AVM threshold value that is different from the AVM threshold value to which the boundary 1002 corresponds. In at least some of such implementations, the AVM threshold value to which the boundary 1022 corresponds may also differ from an AVM value to which the boundary 1012 corresponds.

It will be appreciated that, in some embodiments, the display system may be configured to provide virtual content on a single depth plane. Depending upon the distance of the single depth plane from the viewer, such a display system may include one or both of a near AVM discomfort zone 1000 and a far AVM discomfort zone 1020.

Figure 12E:
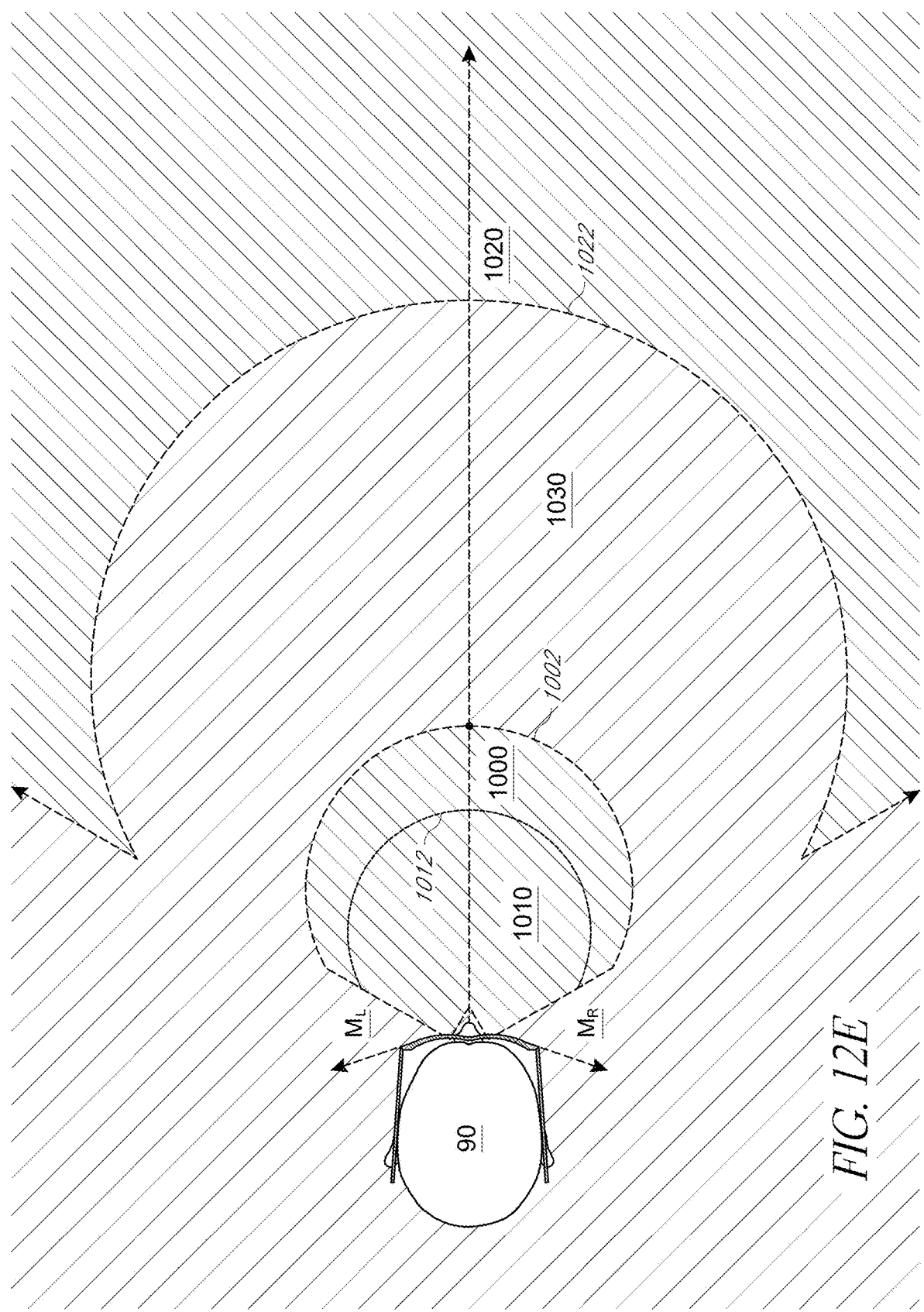
FIG. 12E illustrates an for example of a top-down, schematic view of AVM discomfort zones and a comfort zone.

With continued reference to FIG. 12D, it will be appreciated that the volume of the surrounding world visible to the viewer 90, excluding the monocular vision zones $M_L$ and $M_R$, may be considered to be the viewer's binocular field of view (FOV) (i.e., visible/perceptible to each of the viewer's eyes). The binocular field of view may be understood to be divisible into AVM comfort zone 1030 and AVM discomfort zones 1000 and/or 1020. While the viewer may not be able to combine images seen by each eye at distances corresponding to the LoF zone 1010 without experiencing discomfort or at all, the binocular FOV may also be understood to encompass the LoF zone 1010, as objects located within the LoF zone 1010 are still readily visible/perceptible to each of the viewer's eyes. As apparent from FIGS. 12A-12D, the volume around the viewer may be broadly divided into zones in which the AVM threshold is exceeded and zones in which the AVM threshold is not exceeded; that is, the volume around the viewer may be divided into AVM discomfort zones and an AVM comfort zone (also referred to as simply a comfort zone). FIG. 12E illustrates an example of a top-down, schematic view of AVM discomfort and comfort zones. As illustrated, the AVM discomfort zones are indicated by diagonal hatching extending upwards from left to right. The AVM discomfort zones may be considered to include the zones 1000, 1010, and 1020. In addition, as illustrated, the comfort zone is indicated by diagonal hatching extending upwards from right to left may be considered to include the volumes outside of the zones 1000, 1010, and 1020; in some embodiments, the comfort zone may include the volume between zones 1000 and 1020 and monocular vision regions $M_L$ and $M_R$. Stated another way, virtual objects in the comfort zone do not exceed AVM thresholds, while virtual objects in the AVM discomfort zones do exceed the AVM threshold. Thus, in some embodiments, the display system may be configured to determine whether a virtual object is within the comfort zone and to avoid clipping where the virtual object is within that comfort zone. In some embodiments, determining whether the virtual object has exceeded in AVM threshold or is within an AVM discomfort zone may include determining whether the virtual object is within the comfort zone. If the virtual object is within a zone comfort, the display system may be configured to interpret that result to mean that the AVM threshold is not exceeded or that the virtual object is not within an AVM discomfort zone.

Figure 13A:
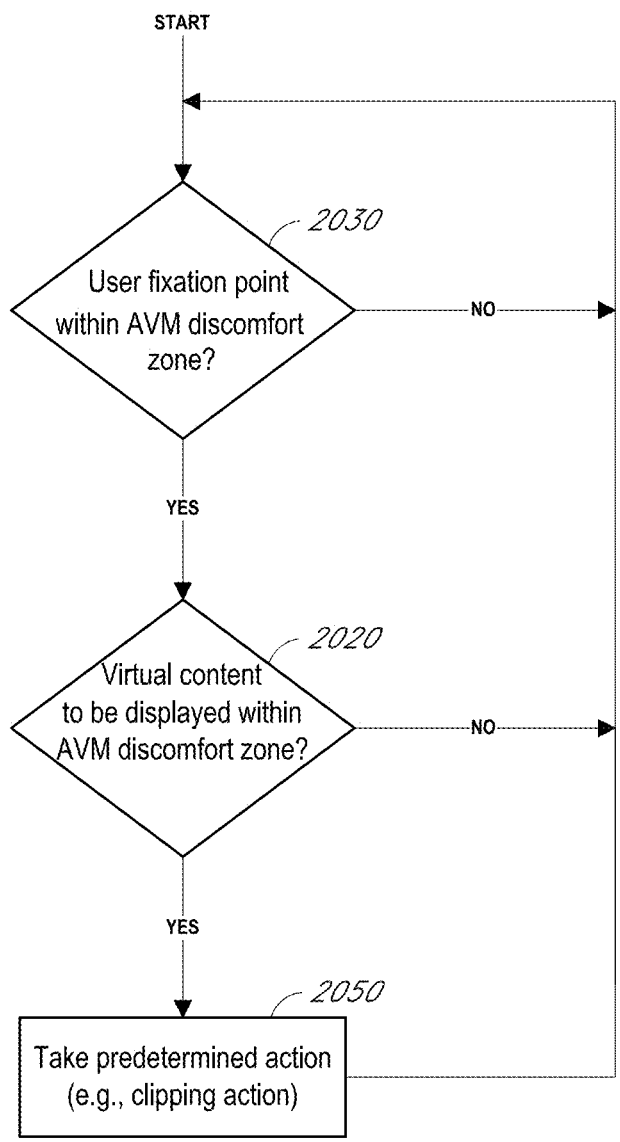
FIG. 13A illustrates a flowchart of an example process for determining whether to clip display of a virtual object.

In some embodiments, the display system may be configured to clip virtual objects based upon the locations of virtual objects relative to the AVM discomfort zones 1000, 1020 and/or the LoF zone 1010. FIG. 13A illustrates a flowchart of an example process for determining whether to clip display of a virtual object. The process of FIG. 13A, or any of the other processes disclosed herein, may be performed by a display system, which may have computer storage media storing software containing instructions for performing the various actions of the process. For example, the display system may be the display system 60 (FIG. 9D), which may include processing hardware and software stored on computer storage media, and optionally may provide information to remote system of one or more computers for processing, for example to offload processing to the local portions of the system, and receive information from the remote system. In some embodiments, the display system may be a virtual or augmented reality display system having one or more processors (e.g. in the local processing and data module 140 and/or the remote processing module 150) having computer storage media (e.g. in the local processing and data module 140, the remote processing module 150, and/or the remote data repository 160) for storing software with instructions for performing the process.

With continued reference to FIG. 13A, the display system may display or is prepared to display one or more virtual objects at one or more locations known to the display system. At block 2030, the display system may determine whether the user is fixating on a point that is within an AVM discomfort zone. If the fixation point is not within an AVM discomfort zone, it may be assumed that the AVM tolerance is not exceeded and no action is taken to clip the virtual objects. However, if the fixation point is within an AVM discomfort zone, then the display system may analyze a particular virtual object, or virtual content, at block 2020 to determine whether that virtual content is within the AVM discomfort zone. If the virtual content is not within the AVM discomfort zone, then no clipping of that virtual content is performed. If the virtual content is within the AVM discomfort zone, in some embodiments, the display system may perform a predetermined action (e.g., a clipping action) at block 2022. The predetermined action is designed to address possible viewer discomfort caused by the virtual content being in an AVM discomfort zone. It will be appreciated that FIG. 13A provides a general overview of some embodiments. For this figure and the other figures discussed herein, additional details regarding the various blocks of this figure may be found in the descriptions of similarly numbered blocks in the other figures described herein.

Figure 13B:
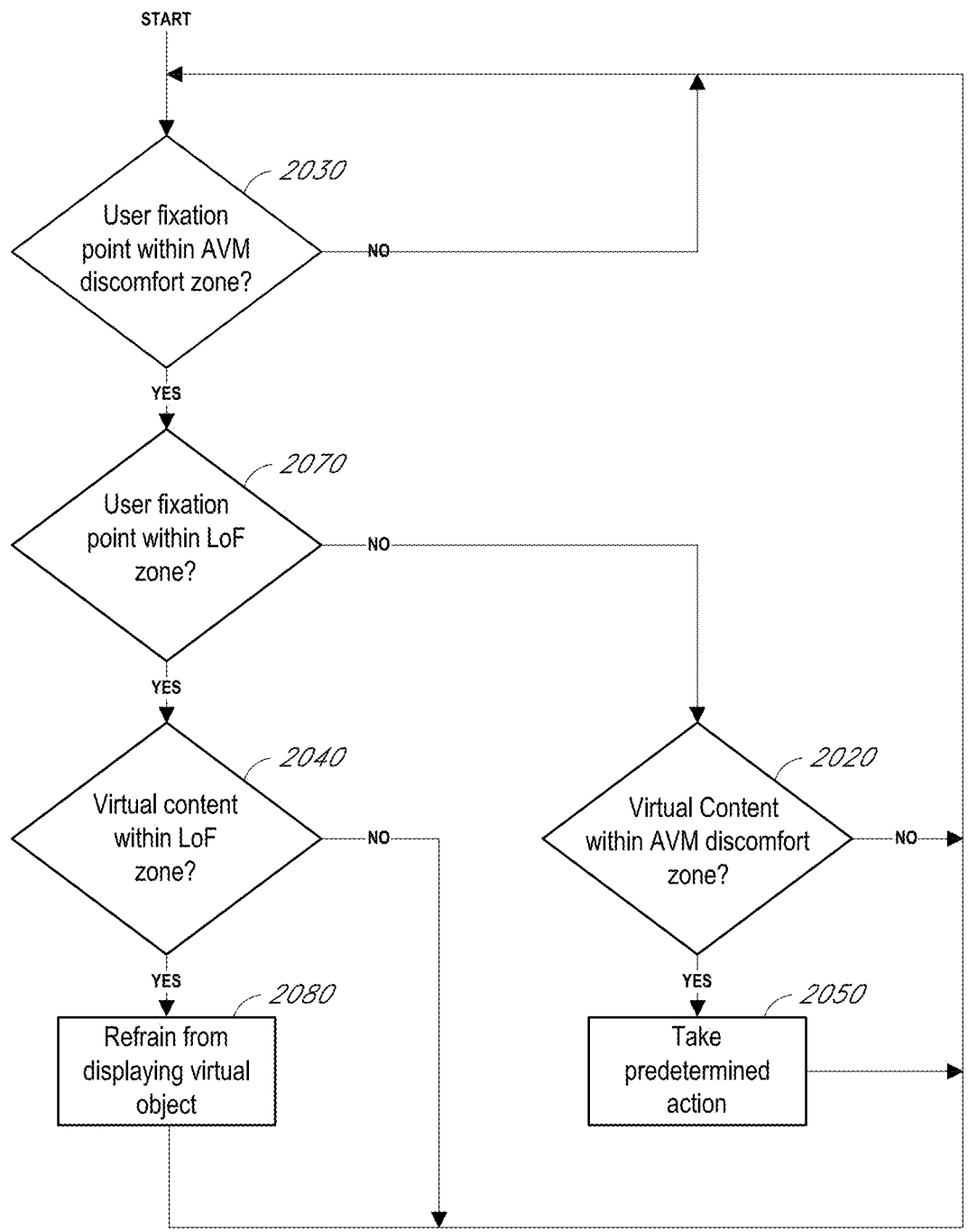
FIG. 13B illustrates a flowchart of another example process for determining whether to clip display of a virtual object.

With reference now to FIG. 13B, the display system may also take into account whether the user is fixating within a LoF zone or whether there is virtual content within the LoF zone. At block 230, the display system determines whether the user is fixating on a point within an AVM discomfort zone. If not, no further action (e.g., no clipping action) may be taken. If yes, the process moves to block 2070. At block 2070, the display system determines whether the user is fixating within the LoF zone. If not, the process progresses to block 2020, at which the display system determines whether virtual content is within an AVM discomfort zone. If not, no clipping action is taken. If yes, then a predetermined action is taken at block 2050 to address the virtual content being within an AVM discomfort zone.

Returning to block 2070, if the user is fixating within the LoF zone, then the process progresses to block 2020. At block 2020, the display system determines whether the displayed or about to be displayed virtual content is within the LoF zone. If yes, then the process progresses to block 2080, were the display system refrains from displaying the virtual object. The process may then start again. As discussed herein, it will be appreciated that the various blocks disclosed herein may be performed in different sequences from that illustrated and discussed in connection with the illustrations. For example, the order of the blocks 2020 and 2030 (in the various figures herein, including FIGS. 13A and 13B) may be reversed. As another example, the order of the blocks 2070 and 2040 may also be reversed.

Figure 13C:
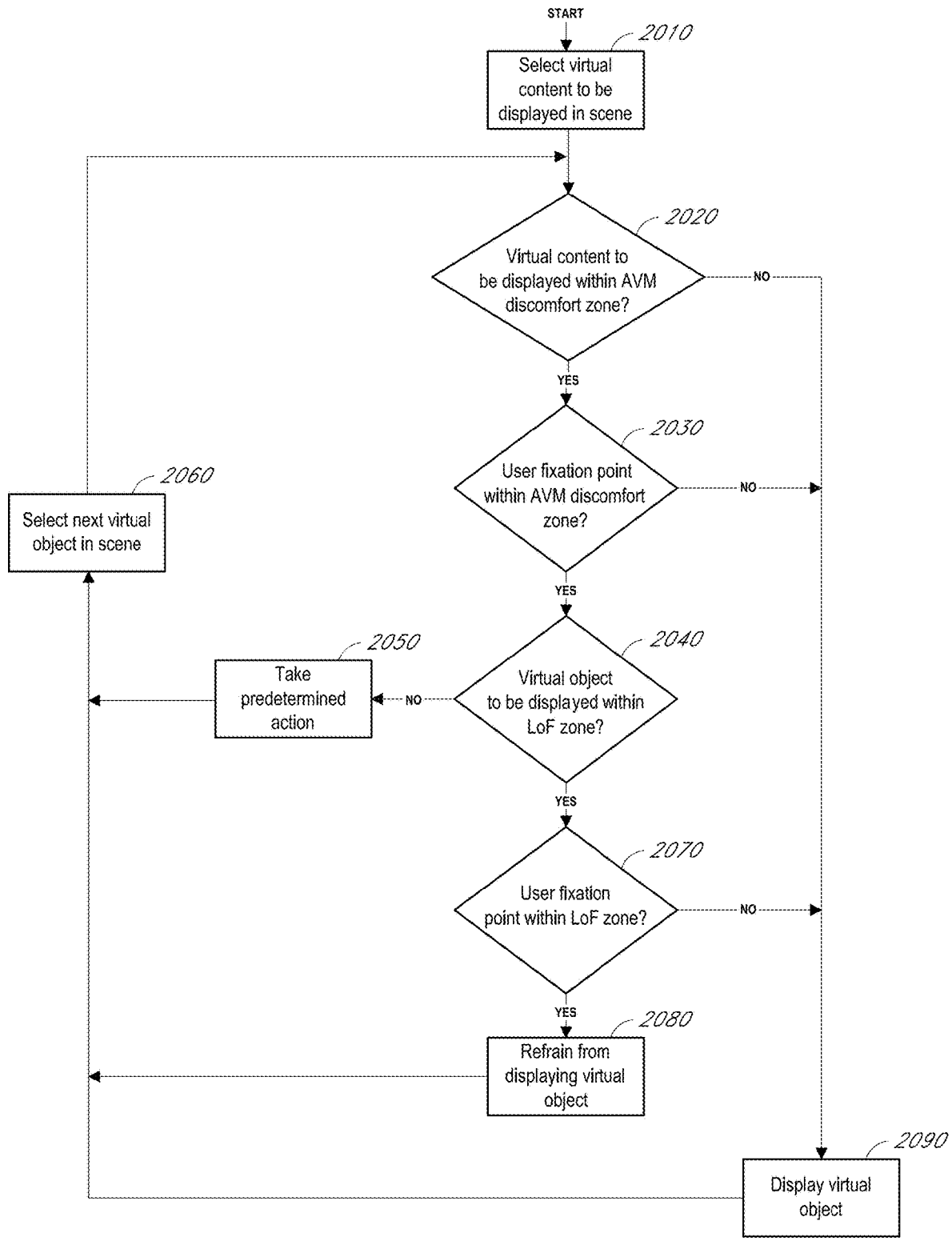
FIG. 13C illustrates a flowchart of yet another example process for determining whether to clip display of a virtual object.

With reference now to FIG. 13C, additional details are provided regarding a process according to some embodiments. In some embodiments, individual ones of the virtual objects are analyzed to determine whether to clip, or or modify the display of, that virtual object. At block 2010, a virtual object that is displayed (or is to be displayed) in the scene is selected for the analysis. In some embodiments, the selection may be made based upon particular criteria. For example, only virtual objects that are within the user's field of view may be selected in some embodiments. In some other embodiments, the selected virtual object may be a virtual object proximate a vergence point of the viewer's eyes.

At block 2020, the display system determines whether the virtual object is located at within an AVM discomfort zone (e.g., within a distance less than an AVM threshold distance from the viewer, the AVM threshold distance being determined based upon the direction in which the viewer's eyes are fixating). The AVM discomfort zones size and shape may be determined based upon the ability of the display system to provide different vergence cues and accommodative cues. In some embodiments, the size and shape of the AVM discomfort zone may be preset values based upon the above abilities of the display system and an expected AVM tolerance for the viewer, e.g., as discussed regarding FIGS. 10-11C. In some other embodiments, the size and shape of the AVM discomfort zone may be set for individual users based upon the viewer's AVM tolerance in addition to the abilities of the display system.

If the virtual object is not located within an AVM discomfort zone (e.g., at less than or greater than the relevant AVM threshold distance to the user, depending upon whether the AVM discomfort zone is a near AVM discomfort zone or a far AVM discomfort zone, respectively), then the process moves to block 2090 and the virtual object is displayed or continues to be displayed. If the virtual object is located within an AVM discomfort zone (e.g., at less than or greater than the relevant AVM threshold distance), then the process moves to block 2030. At block 2030, the display system determines whether the user is verging on a fixation point within an AVM discomfort zone (e.g., at a vergence distance is less than or greater than the relevant AVM threshold distance). For example, the display system determines the vergence point of the user's eyes and the distance of this vergence point from the user. This distance may be referred to as the vergence distance. If the vergence distance is not less than the AVM threshold distance (where a near AVM discomfort zone 1000, FIGS. 12A-12D, is present) or if the vergence distance is not more than the AVM threshold distance (where a far AVM discomfort zone 1020, FIG. 12D, is present), then the process moves to block 2090 and the virtual object is displayed or continues to be displayed. On the other hand, if the vergence distance is less than the AVM threshold distance (where a near AVM discomfort zone 1000, FIGS. 12A-12D, is present) or if the vergence distance is more than the AVM threshold distance (in the case of a far AVM discomfort zone 1020, FIG. 12D, is present), then the process continues to block 2040. In some embodiments, if the vergence distance is less than the AVM threshold distance (where a near AVM discomfort zone 1000, FIGS. 12A-12D, is present) or if the vergence distance is more than the AVM threshold distance (where a far AVM discomfort zone 1020, FIG. 12D, is present), then the process proceeds directly from block 2030 to block 2050. Examples of methods for determining vergence distance may be found in U.S. Application No. 62/618,559, entitled DEPTH PLANE SELECTION AND RENDER CAMERA POSITIONING IN AUGMENTED REALITY DISPLAY SYSTEMS, filed Jan. 17, 2018, the entire disclosure of which is incorporated herein by reference. Additional examples of methods for determining vergence distance may be found in U.S. application Ser. No. 15/469,369 filed on Mar. 24, 2017, published on Sep. 20, 2017 as U.S. Publication No. 2017/0276948, the entirety of which is incorporated herein by reference.

In some embodiments, the AVM discomfort zone may be defined in terms of vergence angles. In some embodiments, different vergence angles may be associated with different distances from the viewer, such that the boundaries of the AVM discomfort zone may be may be associated with particular vergence angles. For example, the inner boundary of the AVM discomfort zone (the boundary closest to the viewer) may be associated with a first discomfort vergence angle and the outer boundary the AVM discomfort zone (the boundary farthest from the viewer) may be associated with a second discomfort vergence angle. Thus, the display system may be configured to determine whether the viewer is merging within an AVM discomfort zone by determining whether the vergence angle of the viewer's eyes is within a range defined by the first and second discomfort vergence angles. It will be appreciated that these vergence angles are also associated with distances from the viewer and, discuss herein, determining whether the viewer is verging within an AVM discomfort zone may include determining whether the vergence distance of the viewer is within a range of distances defined by the distances of the boundaries of the AVM discomfort zone.

In addition, outside of the AVM discomfort zone may be an AVM comfort zone in which the accommodation-vergence mismatch is within comfortable tolerances. This AVM comfort zone may also be defined by vergence angles, with a maximum AVM comfort angle defining an inner boundary (closest to the viewer) and a minimum AVM comfort angle defining an outer boundary (farthest from the viewer) between which the AVM comfort zone is present. Thus, in some embodiments, the display system may be configured to determine whether a viewer is verging within the AVM comfort zone (and, so, is not verging within an AVM discomfort zone) by determining whether the vergence angle of the viewer's eyes is within a predetermined range of AVM comfort angles. As with the AVM discomfort zone, it will be appreciated that these comfort vergence angles are associated with distances from the viewer and, in some embodiments, determining whether the viewer is verging within an AVM comfort zone may include determining whether the vergence distance of the viewer is within a range of distances defined by the distances of the boundaries of the AVM comfort zone.

With continued reference to FIG. 13, at block 2040, the display system determines whether the virtual object is within the LoF zone (e.g., at a distance that is less than the LoF threshold distance from the user). In some embodiments, the LoF zone's size and shape may be a set value that has been determined to be generally applicable to viewers. In some embodiments, the LoF zone's size and shape may be calibrated for a particular viewer, e.g., by displaying test images to determine at which virtual distances a loss of fusion occurs, e.g., by imaging the eyes of the user or by receiving an input from the user that a doubling of the object is observed. As such, in these embodiments, the LoF threshold distance for a given gaze direction of the viewer may be seen as being the near point of convergence (NPC) (i.e., the closest point of binocular, fused, single vision) determined for a particular viewer. It follows that, for at least some embodiments in which the LoF threshold distance is a set value, the LoF threshold distance may represent an average NPC value or an NPC value determined for one or more populations. Although the LoF zone (e.g., LoF zone 1010) is primarily described herein as encompassing portions of three-dimensional space that are less than a threshold distance from the user (the LoF threshold distance), it is to be understood that the LoF zone may represent portions of three-dimensional space within which the angle of user vergence (i.e., angle of convergence) is greater than a threshold LoF vergence angle. As such, in some examples, (at block 2040) the display system determines whether the virtual object is at a location in three-dimensional space relative to the user such that the angle of user vergence would be higher than a threshold vergence angle if the user were to fixate/verge on the virtual object. Furthermore, in these examples, the threshold vergence angle may be a set value or calibrated for a particular viewer in much the same way that the LoF threshold distance is described above as being either a set value or calibrated for a particular viewer.

If the virtual object is at a distance that is less than the LoF threshold distance, within the LoF zone, (or is at a location satisfying a threshold vergence angle in the manner described above), then the process proceeds to block 2070. On the other hand, if the virtual object is outside the LoF zone (e.g., at a distance that is not less than the LoF threshold distance), then the process moves to block 2050. At block 2050, a predetermined action is taken to address the virtual object being at a location at which the AVM exceeds levels that are comfortable for the viewer. As mentioned above, in some embodiments, the process may proceed directly from block 2030 to block 2050 in response to determining that the vergence distance is within an AVM discomfort zone (e.g., at less than or greater than the applicable AVM threshold distance from near and far AVM discomfort zones, respectively). The predetermined actions possible for block 2050 include, for example: immediately ceasing display of the virtual object to the viewer, fading out display of the virtual object to the viewer, causing the virtual object to move outside of the AVM discomfort zone, or otherwise limiting exposure of the viewer to the virtual object within an AVM discomfort zone. As described in further detail below with reference to FIG. 16 (and specifically with reference to block 4060 of FIG. 16), in some embodiments, the predetermined actions possible for block 2050 may also include sending a message to an application for invoking execution of one or more additional predetermined actions. In some implementations, the predetermined actions possible for block 2050 may include executing one or more of operations associated with setting, resetting, evaluating, and/or responding to a timer, as described below with reference to FIGS. 15 and 16. For situations in which the virtual object has yet to be presented, the predetermined actions possible for block 2050 may further include, for example, refraining from moving forward with displaying the virtual object. In some embodiments, exposure is limited by modifying the content displayed to one eye without modifying the content displayed to the other eye. For example, the object may be displayed to one eye, but not to the other eye; or the display may alternate displaying the virtual object to each eye. Preferably, the displaying of the object to each eye is alternated at a rate sufficient for the viewer to "recover" from discomfort caused by the displaying of the virtual object to both eyes. In some embodiments, the alternation occurs at a rate that it is perceptible to the viewer. For example, the displaying and stopping the display of the object may occur at a rate less than the flicker fusion threshold of the human visual system. In some embodiments, the rate of alternation at each eye is less than 60 times per second, including less than about 30 times per second.

In some other embodiments, the content is displayed only to one eye. For example, rather than alternating displaying content between the two eyes of a viewer, the display of content to one of the eyes is simply stopped, e.g., for a "cool-down" period, as discussed further herein. The cool-down period may be sufficiently long to allow the viewer to "recover" from discomfort that may be caused by the content.

In some embodiments, the predetermined actions may include timing a duration over which the viewer is continuously exposed to the virtual object within an AVM discomfort zone. In some embodiments, the permitted exposure duration may be, e.g., 1 second or less, 10 seconds or less, 30 seconds or less, 3 minutes or less, and/or a variable user- or system-selected amount of time. After the permitted exposure duration has elapsed, exposure to the virtual object within an AVM discomfort zone may be stopped or limited. As noted above, stopping or limiting this exposure may include simply ceasing displaying of the virtual object, fading out the virtual object, causing the virtual object to move outside of an AVM discomfort zone, modifying the display of the virtual object to one or both eyes, etc.

In some embodiments, the predetermined actions may be performed in a way that is consistent with the identity of the virtual object and/or the application causing the virtual object to be displayed. For example, in scenes in which the virtual object is a flying entity, moving the virtual object outside of an AVM discomfort zone may include showing the virtual object flying away from or flying towards the user to a distance outside of a near or a far AVM discomfort zone, respectively. Consequently, the predetermined action may vary depending on the application that causes the virtual object to be displayed, and may be determined by the application itself, with the application also dictating the particular action that is taken. In some embodiments, as described further herein, if the predetermined action provided by an application is not determined to be sufficient to address exposure of the viewer to the virtual object within the AVM discomfort zone, then the display system may override the application and take another predetermined action to sufficiently limit the viewer's exposure.

In some embodiments, after stopping the displaying of the virtual object or after the virtual object is moved outside of the AVM discomfort zone, and after a "cool-down" period has elapsed, the virtual object may be re-displayed, allowed to move back inside the AVM discomfort zone, or simply deemed eligible for display. In some embodiments, the cool-down period may be 3 seconds or more, 5 seconds or more, or 10 seconds or more. In some embodiments, the cool-down period may be variable and may be a function of the exposure duration. For example, for content with a longer permitted exposure duration, the cool-down period may be correspondingly longer than for content with a shorter exposure duration. For example, in some embodiments, the cool-down period for in-world content may be shorter than the cool-down period for user-locked content.

After the predetermined action is taken at block 2050, the process may proceed to block 2060. At block 2060, a next virtual object is selected for the clipping analysis and the process then proceeds again to block 2020. It will be appreciated that the next virtual object to be analyzed may be a different virtual object from that most recently analyzed. In some cases, however, the next virtual object may be the same virtual object. For example, it is possible that the next virtual object may be selected based on criteria which is still met by the previously analyzed virtual object, or there may only be one virtual object being displayed.

With reference again to block 2040 of FIG. 13C, if the virtual object is determined to be within the LoF zone (e.g., at a distance that is less than the LoF threshold distance from the user), then the process proceeds to block 2070. At block 2070, the display system determines whether the user is fixating on a point within the LoF zone (e.g., whether the user has a vergence distance that is less than the LoF threshold distance). It will be appreciated that the user vergence distance value utilized for block 2070 may be the same user vergence distance value utilized for block 2030, or the display system may make a new determination of user vergence distance. It follows that, for embodiments in which the LoF zone represents portions of three-dimensional space within which the angle of user vergence (i.e., angle of convergence) is greater than a threshold vergence angle, (at block 2070) the display system determines whether the user vergence angle is greater than a threshold LoF vergence angle.

If the user is fixating on a point outside of the LoF zone (e.g., the vergence distance is not less than the LoF threshold distance, or if the user vergence angle is not greater than the threshold LoF vergence angle), then the process proceeds to block 2090 and the virtual object is displayed or continues to be displayed. If the user's fixation point is within the LoF zone (e.g. if the vergence distance is less than the LoF threshold distance) (or if the user vergence angle is greater than the threshold LoF vergence angle), then the process moves to block 2080 and the display system refrains from displaying the virtual object. It follows that a determination at block 2070 that the user vergence distance is indeed less than the LoF threshold distance effectively indicates that both the virtual object and the user vergence correspond to locations positioned within a LoF zone (e.g., LoF zone 1010 of FIG. 12A described above). Refraining from displaying the virtual object may include completely stopping or preventing display of the virtual object to both eyes, or intermittently stopping or preventing display of the virtual object (e.g., to one eye at a time). For example, the display system may stop displaying the virtual object in one eye, but continue to display the object in the other eye; or the display may alternate stopping and displaying the virtual object to each eye. In some embodiments, stopping and starting (e.g., flickering) the displaying of the object to each eye occurs at a rate less than the flicker fusion threshold (e.g., the rate of stopping and starting the display of the object may be 60 times or less per second). In some implementations, block 2080 may include executing one or more of operations associated with setting, resetting, evaluating, and/or responding to a timer, as described below with reference to FIGS. 15 and 16. In such implementations, the system may only execute operations for refraining to display the virtual object in response to the expiration of one or more timers. After block 2080 or block 2090, the process then proceeds to block 2060 and the further selection of a virtual object to be analyzed for clipping, as discussed herein. In some embodiments, in response to a determination at block 2040 that the virtual object is not less than the LoF threshold distance from the user, the process may to proceed to block 2070 or another block similar thereto before proceeding directly to block 2050.

With continued reference to FIG. 13C, it will be appreciated that the order of the various blocks 2020, 2030, 2040, 2070 may be varied from that illustrated. For example, the order in which the blocks 2020, 2030 are performed may be reversed. In addition, the order in which the blocks 2040, 2070 are performed may also be reversed. Other sequences of steps may also be performed according to alternative embodiments. Moreover, the individual blocks illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives. For example, in some embodiments, the process may be broken up into two or more independently-executable processes. In some implementations, the system may execute a first process including blocks 2010, 2020, 2030, 2050, 2060, and 2090 (e.g., process may proceed directly from block 2030 to either block 2050 or block 2090) and a second process including blocks 2010, 2040, 2050, 2060, 2070, 2080, and 2090 (e.g., process may proceed directly from block 2010 to block 2040, and may proceed directly from block 2040 to either block 2070 or block 2050) independent from one another. In this way, the system may perform AVM- and LoF-based evaluations in parallel. In some embodiments, the system may only perform one of the first and second processes. Furthermore, as will described in further detail below with reference to FIG. 16, breaking up and/or expanding upon one or more of the processes described herein (e.g., the processes of FIGS. 13A-13C, 15, 16, etc.) in this manner may allow for certain processes to be executed at different layers in a software architecture.

Also, in some embodiments, as an alternative to or in addition to determining whether the user's fixation point (e.g., the user's vergence distance) is less than the AVM threshold distance, block 2030 may include a determination regarding whether the user is verging on the virtual object. If the user is not verging on the virtual object, then the process proceeds to block 2090 and the virtual object is displayed. If the user is verging on the virtual object, then the process proceeds to block 2040. In some examples, the process may include a determination regarding whether the user is verging on a point in three-dimensional space located less than a threshold distance away from the virtual object. In these examples, the system may determine the Euclidean distance from the user's point of vergence to the virtual object (or a portion thereof), and compare the determined Euclidean distance to a threshold value to determine whether to proceed to block 2040 or block 2090. In addition, if one of the user's eyes is closed, then the display system may be programmed to not register a vergence distance, such that, at blocks 2030 and 2070, the display system provides the result that the vergence distance is not less than the AVM threshold distance, or that the vergence distance is not less than the LoF threshold distance. In some implementations, the system may actively determine whether one (or both) of the user's eyes is closed, and in response to determining that one (or both) of the user's eyes is indeed closed, may move proceed to block 2090.

For ease of description, the display system is discussed herein as performing various actions or making various determinations. It will be appreciated that performing these various actions or making these various determinations may include performing computations using one or more processors of the display system and/or utilizing external computational resources in performing the various actions or making the various determinations.

Without being limited by theory, it is believed that viewers may have a greater sensitivity to accommodation-vergence mismatches for user-locked content than in-world content. Furthermore, after periods of extended exposure, some users may find certain pieces of user-locked content to be disorienting and/or of annoyance. As a result, an AVM threshold distance for in-world content may be larger than the corresponding AVM threshold distance for user-locked content. These differences may be represented as differences in the sizes of the AVM discomfort zone for user-locked content and in-world content. In addition, as disclosed herein, if the content is occlusion content, then that content may be treated as having no AVM discomfort zone in some embodiments.

Figure 14:
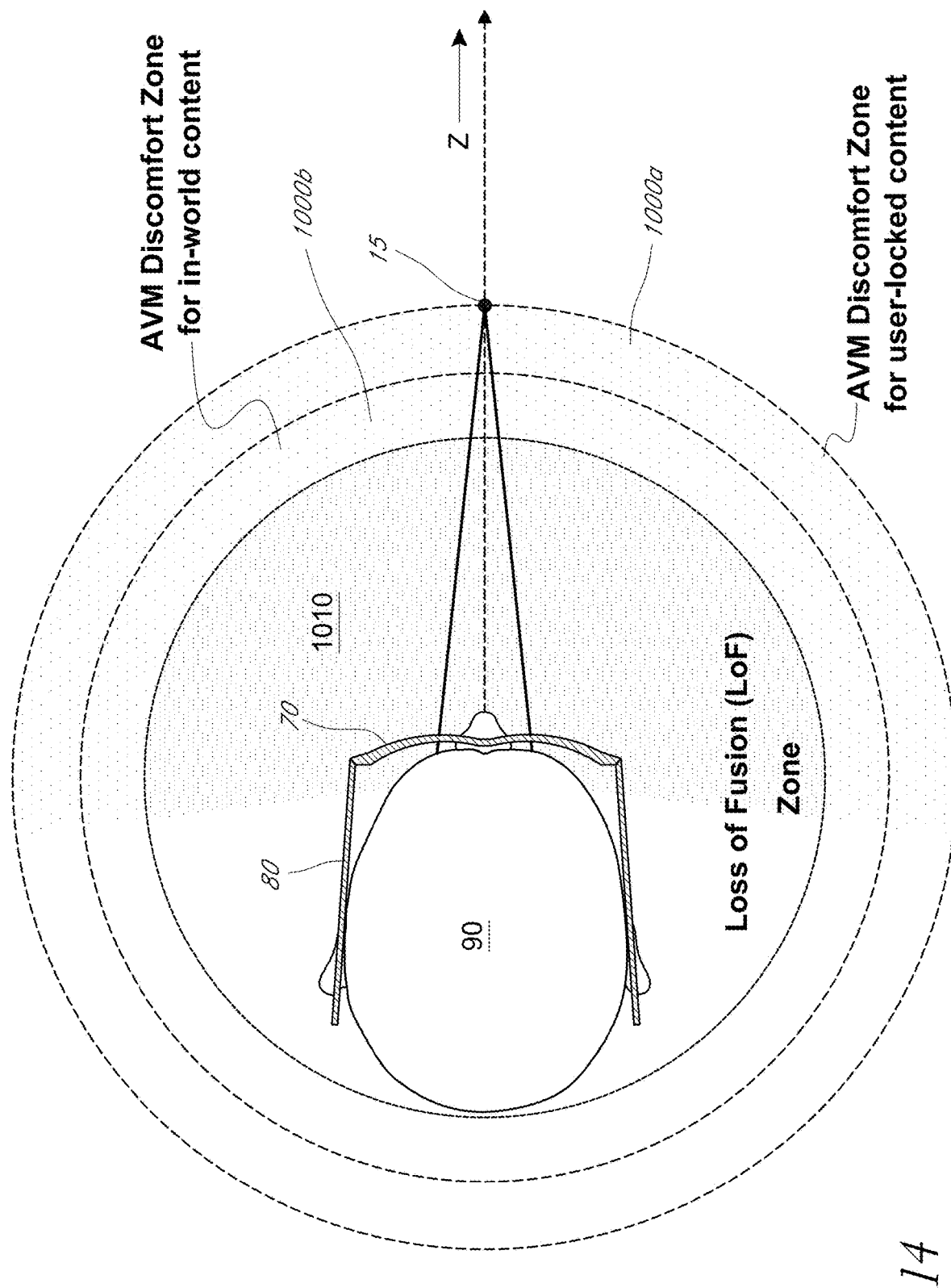
FIG. 14 illustrates an example of a top-down, schematic view of multiple accommodation-vergence mismatch discomfort zones and a loss-of-fusion zone and relative to a viewer.

With reference now to FIG. 14, an example is illustrated of a top-down, schematic view of multiple accommodation-vergence mismatch discomfort zones and a loss-of-fusion zone relative to a viewer. FIG. 14 is similar to FIG. 12A except that two near AVM discomfort zones are illustrated. The AVM discomfort zone 1010a is the AVM discomfort zone for user-locked content, and the AVM discomfort zone 1010b is the AVM discomfort zone for in-world content. The AVM discomfort zone 1010b completely overlaps the AVM discomfort zone 1010a, which extends beyond the AVM discomfort zone 1010b due to the expected greater tolerance of viewers to accommodation-vergence mismatches for in-world content. In some embodiments, different loss-of-fusion (LoF) zones may also be provided for different content types (e.g., user-locked content, in-world content, etc.). As such, one or more of the techniques described herein with reference to FIGS. 14 and 15 (e.g., relating to AVM discomfort zones 1010a and 1010b, etc.) may not only be applied within the context of enforcing AVM-related rules, but may also be applied within the within the context of enforcing LoF-related rules. It will be appreciated that the far AVM discomfort zone 1020 (FIG. 12D) may similarly be bifurcated into two AVM discomfort zones, with a far in-world AVM discomfort zone for in-world content encompassing the entirety of the far AVM discomfort zone 1020, and a far user-locked AVM discomfort zone for user-locked content that encompasses less than the entirety of the far AVM discomfort zone 1020.

In some embodiments, the greater tolerance of viewers to accommodation-vergence mismatches for in-world content relative to the user-locked content may be manifested as a longer permitted exposure duration to in-world content located in the AVM discomfort zone. As a result, in some embodiments, the longer permitted exposure duration may be in addition to the larger AVM discomfort zone for in-world content, or the AVM discomfort zone for both types of content may be assumed to be similar and only the permitted exposure duration varies between the two types of content. As discussed herein, examples of permitted exposure durations include 1 second or less, 10 seconds or less, 30 seconds or less, 3 minutes or less, and/or a variable user or system-selected amount of time. These values may apply to both in-world and user-locked content, although the permitted exposure durations for in-world content are preferably longer than the permitted exposure durations for user-locked content.

Figure 15:
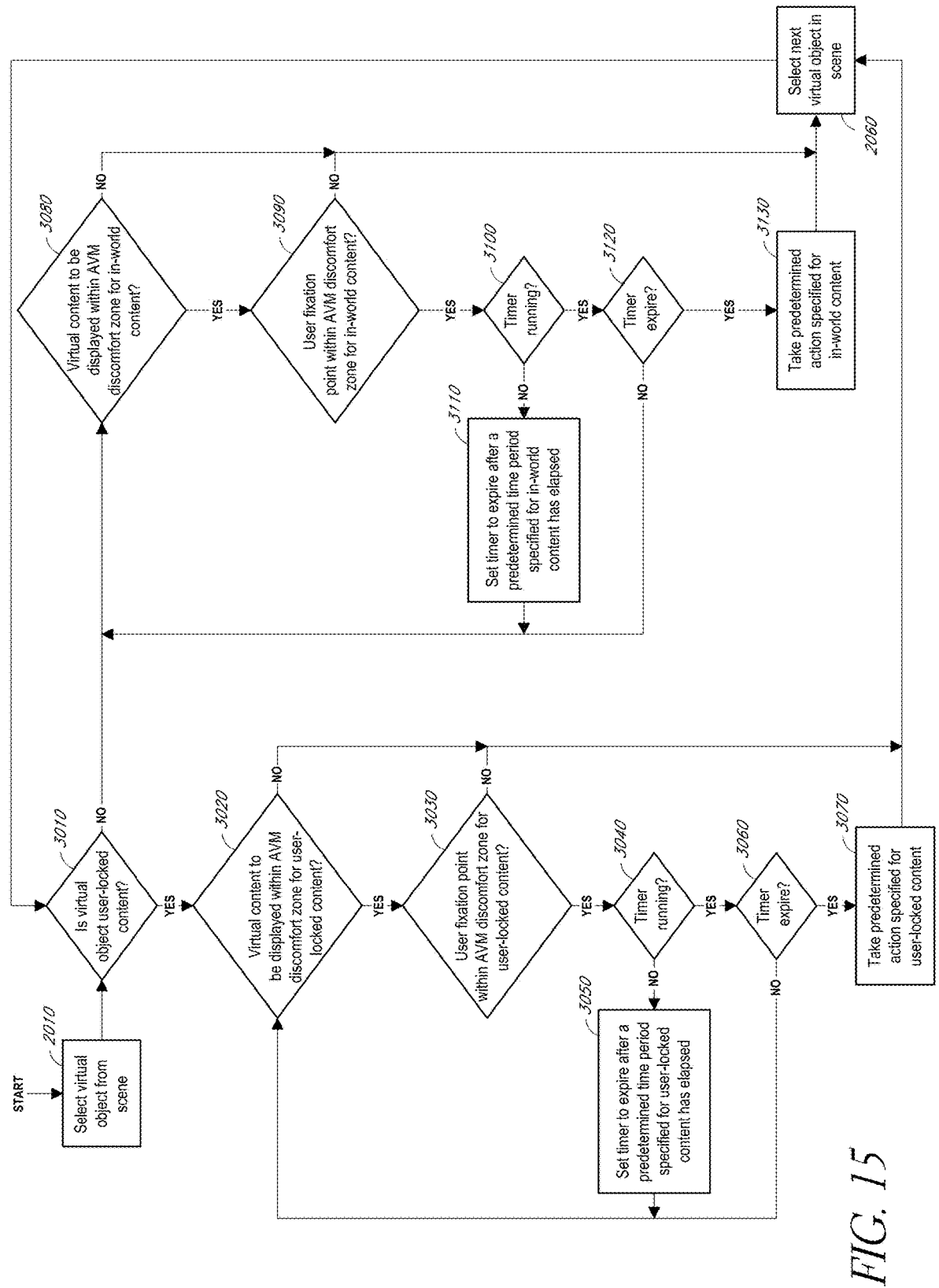
FIG. 15 illustrates a flowchart of an example process for determining whether to clip display of a virtual object based on whether the virtual object is user-locked content or in-world content.

Due to the differences in viewer sensitivity to different types of content, the clipping analysis may also take into account content type. FIG. 15 illustrates a flowchart of an example process for determining whether to clip display of a virtual object based on whether the virtual object is user-locked content or in-world content. The process may be performed by a display system, which may have computer storage media storing software containing instructions for performing the various actions of the process For example, the display system may be the display system 60 (FIG. 9D), which may include processing hardware and software stored on computer storage media, and optionally may provide information to an outside system of one or more computers for process, for example to offload processing to the outside system, and receive information from the outside system. In some embodiments, the display system may be a virtual reality display system having one or more processors having computer storage media for storing software with instructions for performing the process of FIG. 15.

At block 2010, as discussed herein, a virtual object from the scene is selected for clipping analysis. At block 3010, the display system determines whether the virtual object is user-locked content. This determination may be made depending upon whether the virtual object satisfies criteria for user-locked content. Examples of such criteria include the virtual object being locked within the viewer's field of view, such that the viewer is unable to avoid the content by moving his/her head or looking away. Other examples of criteria that may be used in addition or as alternative to the above criteria include determining whether the virtual object is an advertisement, user-interface object, or other type of object presented exclusively as user-locked content. In some implementations, virtual objects may already be specified as either being "in-world" or "user-locked" content. In such implementations, at block 3010, the display system may simply access and analyze information maintained in association with the selected virtual object regarding content type.

If the virtual object is determined to be user-locked content, then the process proceeds to block 3020. If the virtual object is not user-locked content, the process proceeds to block 3080, which will be discussed after a discussion of block 3020 and its subsequent blocks.

With reference again to FIG. 15, at block 3020, the display system determines whether the virtual object is within the AVM discomfort zone (e.g., whether the distance between the virtual object and user is less than or greater than the AVM threshold distance for user-locked content for near and far AVM discomfort zones, respectively). Block 3020 is similar to block 2020 and the discussion regarding block 2020 fully applies to block 3020 except that the AVM discomfort zone shape and size (e.g. the threshold distance) used for the determination is the AVM discomfort zone shape and size (e.g., the threshold distance) for user-locked content (e.g., as used in the determination as to whether virtual object is positioned within AVM Discomfort Zone 1010*a* for user-locked content of FIG. 14 described above). If the distance between the virtual object and user is not less than the AVM threshold distance for user-locked content (where a near AVM discomfort zone 1000, FIGS. 12A-12D, is present) or if distance between the virtual object and user is not more than the AVM threshold distance for user-locked content (where a far AVM discomfort zone 1020, FIG. 12D, is present), then no action to clip the virtual object is taken and the process proceeds to block 2060, at which a next virtual object is selected for the clipping analysis and the process then proceeds again to block 3010. Although not explicitly shown in FIG. 15, in some examples, the process proceeds from block 3020 to a block in which a timer reset is performed before ultimately proceeding to block 2060 and/or block 2010. Exemplary timers of relevance are described in further detail below with reference to blocks 3040-3060. If the distance between the virtual object and user is less than the AVM threshold distance for user-locked content, then the process proceeds to block 3030.

At block 3030, the display system determines whether the user's fixation point is within the AVM discomfort zone for user-locked content (e.g., whether the user's vergence distance is less than the AVM threshold distance for user-locked content, where a near AVM discomfort zone 1000, FIGS. 12A-12D, is present; or whether the distance between the virtual object and user is more than the AVM threshold distance for user-locked content, where a far AVM discomfort zone 1020, FIG. 12D, is present). Block 3030 is similar to block 2030 and the discussion regarding block 2030 (FIG. 13A-13C) fully applies to block 3030 except that the AVM discomfort zone shape and size (e.g., the AVM threshold distance) used for the determination is the AVM discomfort zone shape and size (e.g., the AVM threshold distance) for user-locked content. If the fixation point is outside of the AVM discomfort zone (e.g., if the vergence distance is not less than the AVM threshold distance in the case of a near AVM discomfort zone, or if the vergence distance is not more than the AVM threshold distance in the case of a far AVM discomfort zone) for user-locked content, then no action to clip the virtual object is taken and the process proceeds to block 2060, to repeat the clipping analysis for a next virtual object. Although not explicitly shown in FIG. 15, in some examples, the process proceeds from block 3030 to a block in which a timer reset is performed before ultimately proceeding to block 2060 and/or block 2010. If the fixation point is inside of the AVM discomfort zone (e.g. if vergence distance is less than the AVM threshold distance in the case of a near AVM discomfort zone, or if the vergence distance is more than the AVM threshold distance in the case of a far AVM discomfort zone) for user-locked content, then the process proceeds to block 3040.

At block 3040, the display system determines whether a timer is running to track user exposure time to the virtual object. The timer may be set to expire after the passage of a permitted exposure duration to the user-locked content. It will be appreciated that this exposure time is the amount of time that the user is continuously exposed to the virtual object while the vergence distance is within an AVM discomfort zone (e.g. at less than the AVM threshold distance for a near AVM discomfort zone or at more than the AVM threshold distance for a far AVM discomfort zone) and while the virtual object is within the AVM discomfort zone (e.g., within a distance from the user that is less than the AVM threshold distance for user-locked content for a near AVM discomfort zone or at more than the AVM threshold distance for a far AVM discomfort zone). If the vergence distance changes moves out of the AVM discomfort zone (e.g. moves to more than the AVM threshold distance for a near AVM discomfort zone or to less than the AVM threshold distance for a far AVM discomfort zone) or the object moves outside the AVM discomfort zone, then the timer would reset.

At block 3040, if the timer is not running, then the process proceeds to block 3050. At block 3050, a timer is started and set to run for a duration equal to the permitted exposure duration to the user-locked content. As mentioned above, user-locked content may have a shorter exposure time limit (e.g., one second or less, two seconds or less, etc.) than in-world content (e.g., 10 seconds or less). Because a given permitted exposure duration may be on the order of a second or more, it is possible that the virtual object may move or the user's vergence may change in this time span. Consequently, while the timer is running, the process may return to block 3020 and continuously loop from block 3020 to block 3060 until the timer expires. If the timer is running at block 3040, the process proceeds to block 3060.

At block 3060, the display system may be configured to determine whether the timer has expired, at which point the permitted exposure duration has passed. If the timer has not expired, then the process returns to block 3020. If the timer has expired, then the process proceeds to block 3070.

At block 3070, the display system takes a predetermined action specified for the user-locked content represented by the virtual object. The predetermined actions may be similar to those discussed regarding block 2050 (FIG. 13). For example, the predetermined actions may include stopping the displaying of the virtual object, moving the virtual object outside of the AVM discomfort zone for user-locked content, flickering or alternating the display of the virtual object to one or both eyes, and redisplaying the content after a cool-down period has passed. After the predetermined actions have been taken, the process proceeds to block 2060. Although not explicitly shown in FIG. 15, in some examples, the process proceeds from block 3070 to a block in which a timer reset is performed before ultimately proceeding to block 2060 and/or block 2010. At block 2060, a next virtual object from the scene is selected for clipping analysis and the process repeats.

Returning now to block 3010, if the display system determines that the virtual object is not user-locked content, then the process proceeds to block 3080. In some examples, the display system proceeds to block 3080 in response to determining that the virtual object is in-world content. Such a determination regarding whether the virtual object is in-world content may be made in place of or in addition to a determination regarding whether the virtual object is user-locked content (e.g., block 3010). At block 3080, the display system may determine whether the virtual object is within the AVM discomfort zone (e.g., whether the distance between the virtual object and the user is less than an AVM threshold distance in the case of a near AVM discomfort zone or whether the distance between the virtual object and the user is more than an AVM threshold distance in the case of a far AVM discomfort) for in-world content. Block 3080 is similar to block 2020 and the discussion regarding block 2020 fully applies to block 3080 except that the size and shape of the AVM discomfort zone (e.g., the AVM threshold distance) used for the determination is the cited shape of the AVM discomfort zone (e.g., the AVM threshold distance) for in-world content (e.g., determination as to whether virtual object is positioned within AVM Discomfort Zone for in-world content 1010b of FIG. 14 described above). If the virtual object is outside of the AVM discomfort zone (e.g., if the distance between the virtual object and user is not less than the AVM threshold distance where a near AVM discomfort zone is present, or if the distance between the virtual object and the user is not more than the AVM threshold distance where a far AVM discomfort zone is present) for in-world content, then no action to clip the virtual object is taken and the process proceeds to block 2060. As discussed herein, at block 2060, a next virtual object is selected for the clipping analysis and the process then proceeds again to block 3010. Although not explicitly shown in FIG. 15, in some examples, the process proceeds from block 3080 to a block in which a timer reset is performed before ultimately proceeding to block 2060 and/or block 2010. Exemplary timers of relevance are described in further detail below with reference to blocks 3100-3120. If the virtual object to be displayed is within the AVM discomfort zone (e.g., if the distance between the virtual object and user is less than the AVM threshold distance for in-world content where a near AVM discomfort zone is present, or if the distance between the virtual object and the user is more than the AVM threshold distance where a far AVM discomfort zone Ms. present), then the process proceeds to block 3090.

In some embodiments, at block 3080 and before determining whether the virtual object is within the AVM discomfort zone (e.g., whether the distance between the virtual object and the user is less than an AVM threshold distance in the case of a near AVM discomfort zone or whether the distance between the virtual object in the user is more than an AVM threshold distance in the case of a far AVM discomfort zone) for in-world content, the display system may confirm whether the virtual object is in-world content. For example, the system may determine whether the virtual object meets criteria for in-world content. Examples of criteria include determining whether the virtual object is anchored to the ambient environment, or anchored to the user. For example, the movement of an object may be tracked relative to the user to determine whether it is anchored to the user (and thus does not move relative to the user) or is not anchored to the user. If the virtual object is not anchored user, then it may be determined to not be user-locked content and, thus, to be in-world content. In some embodiments, the virtual object may have an identifier assigned to it to identify its content type.

With continued reference to FIG. 15, the illustrated process may next proceed through one or more of blocks 3090, 3100, 3110, 3120, 3130, and 2060. It will be appreciated that blocks 3090, 3100, 3110, 3120, 3130, and 2060 are similar to blocks 3030, 2040, 3050, 3060, 3070, and 2060, respectively. The discussions herein regarding blocks 3030, 2040, 3050, 3060, 3070, and 2060, apply fully to blocks 3090, 3100, 3110, 3120, 3130, and 2060, respectively, with the following exceptions: the AVM discomfort zone's size and shape for block 3090 is the AVM discomfort zone size or shape for in-world content (e.g., the AVM threshold distance of block 3090 is the AVM threshold distance for in-world content); the predetermined time period (the permitted exposure duration) of block 3110 is that predetermined time period or permitted exposure duration for in-world content; and the predetermined action of block 3130 includes actions specified for in-world content. In some embodiments, the possible predetermined actions of blocks 3070 and 3130 are similar.

Nevertheless, for clarity, blocks 3090, 3100, 3110, 3120, 3130, and 2060 are discussed briefly below. At block 3090, the display system determines whether the user's fixation point is within the AVM discomfort zone for in-world content (e.g., whether the vergence distance is less than the AVM threshold distance for in-world content where a near AVM discomfort zone is present, or whether the vergence distance is more than the AVM threshold distance for in-content where a far AVM discomfort zone is present). If the fixation point is outside of the AVM discomfort zone for in-world content (e.g., if the vergence distance is not less than the AVM threshold distance for in-world content where a near AVM discomfort zone is present, or whether the vergence distance is not more than the AVM threshold distance for in-content where a far AVM discomfort zone is present), then no action to clip the virtual object is taken and the process proceeds to block 2060 (to repeat the clipping analysis for a next virtual object). Although not explicitly shown in FIG. 15, in some examples, the process proceeds from block 3090 to a block in which a timer reset is performed before ultimately proceeding to block 2060 and/or block 2010. If the vergence distance is within an AVM discomfort zone for in-world content (e.g., if the vergence distance is less than the AVM threshold distance for in-world content where a near AVM discomfort zone is present, or if the vergence distance is more than the AVM threshold distance for in-world content where a far AVM discomfort zone is present), then the process proceeds to block 3100.

At block 3100, the display system determines whether a timer, for tracking user exposure time to the virtual object, is running. The timer may be set to expire after the passage of a permitted exposure duration to the in-world content. If the timer is not running, then the process proceeds to block 3110. At block 3110, the timer is started and set to run for a duration equal to the permitted exposure duration to the in-world content. While the timer is running, the process may return to block 3080 and continuously loop from block 3080 to block 3120 until the timer expires. If the timer is running at block 3100, the process proceeds to block 3120.

At block 3120, the display system may be configured to determine whether the timer has expired, that is, whether the permitted exposure duration has passed. If the timer has not expired, then the process returns to block 3080. If the timer has expired, then the process proceeds to block 3130.

At block 3130, the display system takes a predetermined action specified for the in-world content represented by the virtual object. The predetermined actions may be similar to those discussed regarding block 2050 (FIG. 13). Examples of such predetermined actions include ceasing displaying of the virtual object, fading out the virtual object, causing the virtual object to move outside of the AVM discomfort zone, modifying or alternating the display of the virtual object to one or both eyes, etc.

After the predetermined actions have been taken, the process proceeds to block 2060. Although not explicitly shown in FIG. 15, in some examples, the process proceeds from block 3130 to a block in which a timer reset is performed before ultimately proceeding to block 2060 and/or block 2010. At block 2060, a next virtual object from the scene is selected for clipping analysis and the process repeats. It should be appreciated that the specific blocks illustrated in FIG. 15 provide a particular method for determining whether and how to modify the presentation of a virtual object on the basis of content type according to some embodiments of the present invention. Other sequences of steps may also be performed according to alternative embodiments. Moreover, the individual blocks illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 16:
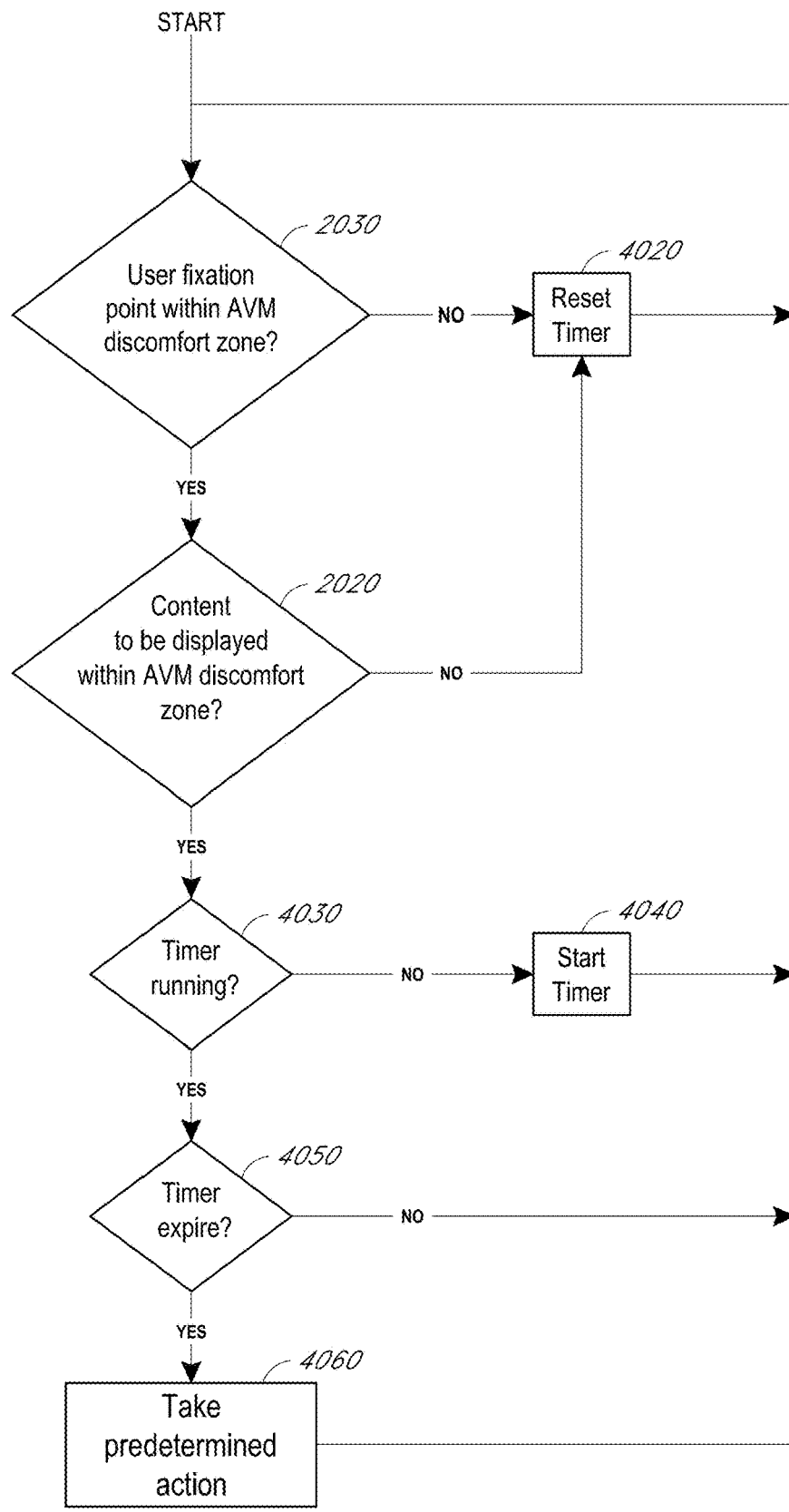
FIG. 16 illustrates a flowchart of an example process for determining whether to clip display of a virtual object in cases where a separate application specifies its own clipping function.

With reference now to FIG. 16, a flowchart as illustrated of an example process 4000 for determining whether to clip display of a virtual object in cases where a separate application (e.g., a video game, streaming media player, or other application that is running on the display system) specifies its own clipping function. In such cases, the display system may contain software that sends instructions to the application to execute a clipping function. This clipping function may vary depending on the application, and may serve to limit user exposure to content provided by the application for output through the display system. However, independent of the particular application and clipping function, the display system may be configured to carry out the process 4000. That is, process 4000 and such a clipping function may be executed at different layers of a software architecture associated with the display system or another computing device in communication with the display system. Furthermore, in some implementations, independent of the particular application and clipping function, the display system may be configured to carry out one or more LoF-based evaluations, such as one or more of those described above with reference to blocks 2010, 2040, 2060, 2070, 2080, and 2090 of FIG. 13. In this way, LoF-based content-limiting rules may be enforced globally (e.g., the display system may execute one or more operations described above with reference to block 2060 of FIG. 13 to modify a presentation of application-generated content), while AVM-based content-limiting rules may at least in part be enforced locally at the application (e.g., the function specified by the application may include one or more operations described above with reference to block 2050 of FIG. 13 to modify content that the application generates and provides for output through the display system). However, in some embodiments, AVM-based content-limiting rules may at least in part be enforced globally if the display system determines that the application has failed to adequately enforce such rules locally.

At block 2030, the display system determines whether the user's fixation point is within an AVM discomfort zone (e.g., whether the user's vergence distance is less than the AVM threshold distance where a near AVM discomfort zone is present, or whether the user's vergence distance is more than the AVM threshold distance were a far AVM discomfort zone is present). If the fixation point is outside an AVM discomfort zone (e.g., if the vergence distance is not less than the AVM threshold distance for a near AVM discomfort zone, or if the vergence distance is not more than the AVM threshold distance for a far AVM discomfort zone), no further action to clip the virtual object is needed and the process proceeds to block 4020. It will be appreciated that the display system may include a timer for determining whether a permitted exposure duration has elapsed. Because the permitted exposure duration relates to the time period in which the user is verging on a point within an AVM discomfort zone (e.g., verging at a distance less than the AVM threshold distance where a near AVM discomfort zone is present, or is more than the AVM threshold distance where a far AVM discomfort zone is present), at block 4020, this timer may be reset since the user is not verging on content within the AVM threshold distance. The process may then cycle back to block 2030.

Referring again to block 2030, if user's fixation point is within an AVM discomfort zone (e.g., if the user's vergence distance is less than the AVM threshold distance where a near AVM discomfort zone is present, or is more than the AVM threshold distance where a far AVM discomfort zone is present), then the process proceeds to block 4030. Optionally, in some embodiments, before proceeding to block 4030, the process may proceed from block 2030 to block 4025, at which the display system determines whether the content to be displayed is within the AVM discomfort zone. If not, the process proceeds to block 4020. If the content to be displayed is within the AVM discomfort zone, the process then proceeds to block 4030.

At block 4030, the display system determines whether a timer is running, the timer being for tracking user exposure time to the virtual object when the virtual object is within an AVM discomfort zone (e.g., when the virtual object is at less than the AVM threshold distance where a near AVM discomfort zone is present, or when the virtual object is at more than the AVM threshold distance where a far AVM discomfort zone is present). If the timer is not running, then the process proceeds to block 4040. At block 4040, the timer is started and set to run for the permitted exposure duration for that virtual object. While the timer is running, the process may return to block 2030 and continuously loop from block 2030 to block 4050 until the timer expires.

At block 4050, the display system may be configured to determine whether the timer has expired, that is, whether the permitted exposure duration has passed. If the timer has not expired, then the process returns to block 2030. If the timer has expired, then the process proceeds to block 4060. In some embodiments, blocks 4020, 4030, 4040, and 4050 may serve to effectively enable the display system to filter small movements of the user's eyes for example during rapid movements (e.g., saccades, microsaccades) and update the fixation point upon determining that the eyes are fixating on a location in three-dimensional space. In this way, the display system may be configured to ignore movements of the eye that fixate on a point for less than a threshold duration and/or ignore involuntary eye movements (e.g., blinks), and thus only proceed to block 4060 in response to determining that the user is fixated on a point in three-dimensional space located within an AVM discomfort zone (e.g., at less than the AVM threshold distance away from the user where a near AVM discomfort zone is present, or at more than the AVM threshold distance where a far AVM discomfort zone is present. In some implementations, some or all of blocks 4020, 4030, 4040, and 4050 may be excluded from process 4000.

At block 4060, the display system is configured to send a message to the application currently being run on the display system to invoke execution of a clipping function. As discussed herein, examples of possible clipping functions include ceasing display of the virtual object, fading out the virtual object, causing the virtual object to move outside of the AVM discomfort zone, etc. Indeed, as mentioned above, at least a portion of the operations associated with block 4060 may represent examples of predetermined actions, such as those described above with reference to blocks 2050, 3070, and/or 3130. In some embodiments, the abovementioned message is communicated to the application through an application programmable interface (API). In some examples, such a message communicated through an API may be that of a function call. The function called through the API and subsequently executed by the application may correspond to one or more operations described above with reference to FIGS. 13 and 15. In some embodiments, the function executed by the application may include one or more operations to determine whether any virtual objects are within a field of view of the user. In this way, the display system may only refrain from displaying virtual objects determined to be located within the user's field of view and within an AVM discomfort zone (e.g., at less than the AVM threshold distance away from the user where a near AVM discomfort zone is present, or at more than the AVM threshold distance away from the user where a far AVM discomfort zone is present). In some other embodiments, the function executed by the application may include one or more operations to indiscriminately refrain from displaying all virtual objects determined to be located within an AVM discomfort zone (e.g., at less than the AVM threshold distance away from the user where a near AVM discomfort zone is present, or at more than the AVM threshold distance away from the user where a far AVM discomfort zone is present). In some implementations, the message may include timestamped information indicating the user's vergence distance. It follows that, in at least some of these implementations, the application may further leverage such information to identify virtual objects that are to be display and virtual objects that are not to be displayed. As mentioned above, in some embodiments, the display system may monitor activities of the application to determine whether the application has responded to an issued message for invoking execution of a clipping function sufficiently, and may take additional action if it is determined that the application's response to an issued message is insufficient. That is, one or more operations for clipping or otherwise modifying content may be executed globally or at a hierarchically-higher layer in the software architecture of the display system (i.e., so as to bypass the application) if the function specified by the application fails to adequately clip or otherwise modify content following block 4060.

It should be appreciated that the specific blocks illustrated in FIG. 16 provide a particular method for determining whether and how to modify the presentation of a virtual object in cases where a separate application specifies its own clipping function according to some embodiments of the present invention. Other sequences of steps may also be performed according to alternative embodiments. Moreover, the individual blocks illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

In addition, with reference again to FIGS. 12A-18, it will be appreciated that the various values utilized for comparison or to otherwise make a decision may vary. For example, the values for AVM threshold distance and permitted exposure duration may vary depending upon an application or program providing the content or establishing the rules for content modification within a scene. In some embodiments, the display system, e.g. due to a program or application with its own categorization of content or its own content parameters, may be configured to identify different types of user content, each having an associated distance establishing the size of an AVM discomfort zone and/or permitted exposure durations. For example, the display system may recognize a plurality of in-world content types, each with a different identifier and a respective AVM discomfort zone size and/or permitted exposure duration. In addition or alternatively, the display system may recognize a plurality of user-locked content types, each with a different identifier and a respective AVM discomfort zone size and/or permitted exposure duration. In some embodiments, there may only be one type each of in-world content and user-locked content, but AVM discomfort zone sizes and/or permitted exposure durations may nevertheless vary and have different values set by different applications. Thus, in the various processes and flowcharts disclosed herein, the AVM discomfort zone sizes and shapes, the AVM threshold distances, and/or time periods for exposure to content may vary depending upon the virtual object being analyzed and the program or application defining the content type and associated AVM zone size and shape and exposure duration. For example, depending upon the application, the display system may have, stored in memory, different AVM threshold distances and permitted exposure durations for different types of content. Consequently, the values for AVM sizes shape, AVM threshold distances, and permitted exposure durations for different types of content may vary dynamically and be updated based upon the virtual object selected for analysis in a scene.

In addition, as discussed herein, if the AVM exceeds a threshold, the display system may be configured to present content to only one eye of the viewer (e.g., switch from presenting the content to both eyes to presenting the content to only one eye; that is, from binocular presentation of the virtual content to monocular presentation of the virtual content). For example, with reference again to FIGS. 13A-13C and 15-16, taking a predetermined action at blocks 2050, 3070, 3130, 4060 or refraining from displaying a virtual object at block 2080 may include presenting virtual content to only one eye. In some embodiments, as discussed herein, the evaluation of whether to present a virtual object to one eye is performed on a virtual object-by-virtual object basis. For example, where multiple virtual objects are presented to the viewer, each virtual object is evaluated for whether it is to be perceived to be at a location that exceeds the AVM threshold and, as a result, whether to present the virtual object to only one eye. It follows that, in situations where a first set of one or more virtual objects in a scene are determined to be perceived to be at locations that exceed the AVM threshold (e.g., outside of an AVM comfort zone) while a second set of one or more virtual objects in the scene are determined to be perceived to be at locations that do not exceed the AVM threshold (e.g., within an AVM comfort zone), the display system may, in some embodiments, be configured to present the first set of one or more objects to the user monocularly and present the second set of one or more objects to the user binocularly. In the following discussion, monocular content may be used to refer to virtual content or virtual objects that were formally presented to both eyes and then presented to one eye in response to exceeding an AVM threshold.

In some embodiments, to determine whether a virtual object is within an AVM discomfort zone, the perceived location of virtual objects may be tracked or estimated, and the display system may be configured to determine whether the virtual object has crossed a boundary between different zones of the monocular field of view of the viewer. For example, the display system may estimate, at a first moment in time, the perceived location of a virtual object and, later, the perceived location of the virtual object at a second moment in time. Assuming that the virtual object is initially in a comfort zone, if the virtual object has crossed the boundary between zones, the display system may interpret this to mean that the virtual object has crossed into an AVM discomfort zone.

In some other embodiments, to determine whether a virtual object is within an AVM discomfort zone, the display system may be configured to determine whether the virtual object is at a location that falls outside of a comfort zone and whether the vergence point of the viewer has crossed a distance threshold relative to the virtual object (e.g., whether the vergence point of the user is sufficiently close to the virtual object that may be said that the viewer is "looking at" the virtual object). If the virtual object is at a location that falls outside of a comfort zone and if the vergence point of the viewer has crossed the threshold distance relative to the virtual object, the display system may interpret this to mean that the virtual object is currently located within an AVM discomfort zone and that the viewer is viewing that virtual object, such that corrective action should be taken by the display system.

As discussed herein, different types of content (e.g., user-locked content or in-world content) may have different associated AVM discomfort zones. As a result, different types of content may have different boundaries for its associated AVM discomfort zone. In some embodiments, the display system may be configured to determine the content type of the virtual object and to determine the boundary of the associated AVM discomfort zone. Examples of such different boundaries include the boundaries of the AVM discomfort zones for in-world and user-locked content, as described above with reference to FIGS. 14 and 15. Assuming that the virtual object is initially in a comfort zone, if the virtual object has crossed the boundary between zones, the display system may interpret this to mean that the virtual object has crossed into an AVM discomfort zone. In addition, the display system may be configured to determine whether a vergence point of the user has crossed a distance threshold relative to the virtual object. If yes, the display system may interpret this to mean that the viewer is looking at the virtual object in the AVM discomfort zone.

As a result of the various schemes above for determining whether the virtual object is in an AVM discomfort zone and requires action, the display system may conclude that a predetermined action should be executed to mitigate the presence of the virtual object in the AVM discomfort zone. It will be appreciated that the predetermined action may be any of the predetermined actions discussed herein. For example, the display system may be configured to cease presentation of the virtual object in one of the viewer's eyes; that is, the display system may be configured to transition from a binocular presentation mode (in which the virtual object is presented to both eyes of the viewer) to a monocular presentation mode (in which the virtual object is presented to only one of the viewer's eyes).

In cases where a virtual object is presented to both eyes, subsequently ceasing the presentation of a virtual object to an eye such that the virtual object is only presented to the opposite eye may cause a reduction in the perceived brightness of the presented image and, thus, a reduction in the perceived brightness of the virtual object. Without being limited by theory, this is believed to be due to binocular summation of the images; that is, the perceived brightness of the image is believed to be determined by a summation of the images in the left and right eyes by the human visual system. Ceasing presentation of an image to an eye effectively eliminates the image from that eye, such that the sum is less and, thereby causing a reduction in the perceived brightness.

In some embodiments, the display system may be configured to mitigate reductions in the perceived brightness by increasing the luminance of the image of the monocular presentation of the virtual object to the viewer. In some embodiments, when presenting a virtual object to only one eye, the display system may be configured to increase the luminance of the presented image of the virtual object to a level sufficient that the viewer perceives the image of the virtual object presented to one eye as having substantially the same brightness as the virtual object presented to both eyes. In some embodiments, the perceived brightness of the virtual object presented to one eye is within 30%, within 20%, or within 10% of the perceived brightness of the virtual object when presented to both eyes.

In some embodiments, the display system may be configured to default to or be biased to favor the presentation of monocular content to a particular eye. For example, as a default, the monocular content may be presented to the user's dominant eye. In such embodiments, the display system may have stored or be able to access in a memory, an indication of which of the viewer's eyes is the dominant eye. It will be appreciated that this parameter may be a user-selectable parameter that is inputted by the user. In some other embodiments, the display system may determine which of the user's eyes is their dominant eye based on one or more tests/evaluations performed by the system, e.g., during a calibration routine and/or performed by the system in real-time during operation of the system. Without being limited by theory, the human visual system is believed to favor processing information from the dominant eye in some scenarios and visual information from the nondominant eye may be suppressed in some instances. Advantageously, presentation of monocular content to the dominant eye is believed to provide the viewer with visual information that is perceived with higher acuity and may mitigate suppression of that information. Additional details regarding visual processing, including eye dominance, suppression, and binocular rivalry, are described in US 2017/0365101, the entire disclosure of which is incorporated herein by reference.

In some embodiments, the display system may be configured to cause static monocular content to move or otherwise change visual properties. Without being limited by theory, it is believed that a static virtual object may cease to be perceived by the viewer or may intermittently seem to disappear and reappear even if the display system presents that monocular content continuously. This may be due to binocular rivalry in which the visual system ignores the static content in favor of dynamic content presented to the other eye, or other phenomena such as motion-induced blindness (MIB) and motion-induced interocular suppression. In some embodiments, the display system may be configured to guard against such a disappearance of displayed monocular content by determining whether the monocular content is static. If the monocular content is determined to be static, the display system may be configured to cause movement of that otherwise static virtual content (e.g., cause the monocular content to appear to oscillate in position, adjust the position of one or more virtual light sources in the virtual scene so as to yield movement in virtual shadows cast by monocular content, etc.), to change other properties (e.g., cause the monocular content to oscillate in perceived brightness and/or size), or to otherwise present the user with monocular stimuli (e.g., temporally-varying stimuli). In some embodiments, the display system may be configured to invoke one or more predefined animation sequences in monocular content so as to prevent involuntary perceptual suppression of such monocular content by the user. In some embodiments, the display system may be configured to treat user-locked content as static content. In at least some of such implementations, the display system may be configured to "unlock" user-locked content from the user when presenting such content to the user monocularly, such that the position of the content relative to the user's FOV may change as the user moves their head. In some examples, the display system may be configured to adjust the behavior of user-locked content when presenting such content to the user monocularly, so that such content may only be loosely tethered to user. Additional details regarding binocular rivalry, motion-induced blindness (MIB), and motion-induced interocular suppression are described in US 2017/0365,101, the entirety of which is incorporated herein by reference.

When providing monocular content, the display system may make a decision as to which eye is presented with that monocular content. In some embodiments, the display system may be configured to present monocular content to the eye on the side of the field of view in which a virtual object, represented by that monocular content, is located. For example, the virtual object on the right-hand side of the user's field of view may be presented as monocular content to the right eye, while virtual content on the left-hand side of the field of view may be presented as monocular content to the left eye. In some embodiments, the display system may be configured to determine if a virtual object is on the right or left side of the field of view and, where the virtual object is to be presented as monocular content, present the monocular content to the eye corresponding to the side of the field of view on which the virtual object is located.

In some embodiments, the display system may be configured to determine the direction of the user's gaze to determine the eye which will be presented with the monocular content. For example, where the user's gaze is directed to the left side of the field of view, monocular content may be presented on the left eye; and where the user's gaze is directed to the right side of the field of view, the monocular content may be presented to the right eye.

In some embodiments, the display system may have different virtual objects for presentation on different sides of the user's field of view, e.g., one virtual object on the left side and a second a virtual object on the right side of the field of view. In such instances, the display system may be configured to determine whether the virtual objects are within an AVM discomfort zone. If they are within an AVM discomfort zone, the display system may be further configured to make a decision as to whether to present both virtual objects monocularly to the same eye. In some embodiments, the display system may present both virtual objects monocularly to the same eye as a default. In some other embodiments, for first and second virtual objects to be presented on different sides of the field of view (FOV), the display system may be configured to determine whether one or more of the following conditions are met. For example, the display system may be configured to evaluate the presence of any one of, or all of, the conditions below. If any of these conditions are met, then the display system may be configured to present the first and second virtual objects monocularly to the same eye:

The first and second virtual objects are closer to each other in virtual space than a predetermined threshold separation value.

The first and second virtual objects are duplicates or different instances of a same virtual object or asset from a library of virtual objects/assets (e.g., two identical or nearly identical cardboard box assets on the floor of a virtual scene), or are at least similar in appearance (e.g., similar in size, shape, and color). Without being limited by theory, it is believed that the human visual system will attempt to fuse similar-looking virtual objects together, as if they were the same object being presented to different eyes. Presenting both the first and the second virtual objects to the same eye avoids such an attempt to fuse the objects.

In some embodiments, the first or the second virtual objects are similar in appearance but are to be presented at different depths. For example, the first virtual object may be inside an AVM discomfort zone, while the second virtual object may be outside of an AVM discomfort zone, or vice versa. Nevertheless, the display system may be configured to present the first and second virtual objects monocularly to the same eye, to guard against an attempt by the human visual system to fuse the first and the second virtual objects.

In some other embodiments, under some circumstances, the display system may be configured to present the first virtual object to its corresponding eye (the eye on the same side of the field of view as the first virtual object) and the second virtual object to its corresponding eye (the eye on the same side of the field of view as the second virtual object). Thus, for two virtual objects to be presented on different sides of the field of view (FOV), the display system may be configured to determine whether one or more of the following conditions are met. The display system may be configured to determine the presence of only one of the conditions below, or the presence of multiple ones of the conditions below. If any of these conditions are met, then the display system may be configured to present the first virtual object monocularly to the corresponding one of the user's eye and present the second virtual object monocularly to the corresponding one of user's other eye:

The two virtual objects are farther apart than a threshold separation value.

One or both of the virtual objects is outside of the user's binocular FOV (e.g., at least one on the virtual objects is within $M_L$ or $M_R$, FIG. 12D). For example, if the first virtual object is positioned within the monocular FOV ($M_L$) of the user's left eye, and the second virtual object is positioned within the monocular FOV ($M_R$) of the user's right eye, then the display system may be configured to simultaneously (i) present the first virtual object monocularly to the user's left eye, and (ii) present the second virtual object monocularly to the user's right eye After switching to monocular presentation of a virtual object, it will be appreciated that the viewer may happen to close the eye receiving monocular content while the monocular content is being presented to that eye. Typically, if virtual content is provided to both eyes, closing one eye would not result in the disappearance of that content. However, monocular content provided to one eye may be susceptible to disappearing if that eye is closed. To avoid the disappearance of this monocular content, the display system may be configured to shift the presentation of the monocular content to the viewer's other eye upon detecting that an eye is closed or is closing. It will be appreciated that one or more cameras such as the camera assembly 630 (FIG. 6) may be utilized to image the eyes to determine whether the eyes are closing, closed, or open.

For example, if the system, while presenting content monocularly to the user's left eye (and not presenting content to the user's right eye), determines that the user has closed or is closing their left eye, then the system may start presenting the content to the user's right eye. In some embodiments, the display system may continue to present content to the left eye and thus present the content simultaneously to both eyes. However, the presentation of the content effectively only reaches the open eye and, as a result, the AVM threshold is not exceeded even when the content is directed to both eyes. In such embodiments, the display system may eventually stop presenting content to the user's closed eye when it is determined that that eye has been closed for at least a threshold amount of time, after which the system presents content only to the user's other, open eye.

In some embodiments, the display system may present content to one eye and may stop presenting content to that eye (e.g. the user's left eye) when it is determined that the user has closed or is closing that eye. Instead, the display system may be configured to shift the presentation of monocular content only to the user's other eye (e.g., the right eye).

It will be appreciated that, in any of the embodiments in which the presentation of monocular content is shifted from a first eye to the other eye in response to the closing of the first eye, the display system may immediately return to presenting content monocularly to the first eye (and stop presenting monocular content to the other eye) upon the system determining that the user has opened or is opening the first eye.

The switch from binocular to monocular presentation of virtual content may be visible to a viewer. To mask this switch, in some embodiments, the display system may be configured to determine whether a switch to monocular presentation is appropriate, as discussed above, and then wait for a masking event to occur before making the switch to monocular presentation. Thus, the switch to monocular presentation may occur during the masking event. Examples of masking events include a blink, saccade, or other ocular event that decreases the perceptibility to the viewer of a switch to monocular presentation. For example, the display system may determine that a virtual object has crossed into an AVM discomfort zone, and then wait for a masking event to occur before making a switch to monocular presentation. Similarly, the display system may determine that the virtual object has crossed out of the AVM discomfort zone and may switch from monocular to binocular presentation of the virtual object upon an occurrence of a masking event. Additional details regarding masking events are disclosed in US 2017/0276948, the entire disclosure of which is incorporated by reference herein.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display system for displaying a virtual object, the display system comprising:
one or more processors; and
one or more computer storage media storing instructions that, when executed by the one or more processors, cause the one or more processors to perform operations comprising:
determining whether the virtual object is located within a loss-of-fusion zone;
determining whether a vergence point of the user's eyes is within the loss-of-fusion zone;
refraining from displaying the virtual object within the loss-of-fusion zone if the virtual object is determined to be located within the loss-of-fusion zone and the vergence point is determined to be located within the loss-of-fusion zone;
determining whether the virtual object is located within an accommodation-vergence mismatch discomfort zone;
determining whether the vergence point of the user is within the accommodation-vergence mismatch discomfort zone; and
limiting displaying of the virtual object to the user if:
the virtual object is located at within the accommodation-vergence mismatch discomfort zone; and
the vergence point of the user is within the accommodation-vergence mismatch discomfort zone.

2. The display system of claim 1, wherein determining whether the virtual object is located within a loss-of-fusion zone comprises determining whether the virtual object is located at less than a loss-of-fusion threshold distance from a user of the display system.

3. The display system of claim 1, wherein determining whether a vergence point of the user's eyes is within the loss-of-fusion zone comprises determining whether the vergence point is at a distance, from the user less than a loss-of-fusion threshold distance.

4. The display system of claim 1, wherein determining whether a vergence point of the user's eyes is within the loss-of-fusion zone comprises determining whether the user is verging at a point corresponding to a vergence angle less than a loss-of-fusion threshold vergence angle, wherein the vergence angle is defined by a first line extending from the point to a first eye of the user and a second line extending from the point to a second eye of the user.

5. The display system of claim 1, wherein determining whether the virtual object is located within the accommodation-vergence mismatch discomfort zone comprises determining whether the virtual object is located, from the user, at less than an accommodation-vergence mismatch threshold distance of a near accommodation-vergence mismatch discomfort zone.

6. The display system of claim 1, wherein determining whether the virtual object is located within the accommodation-vergence mismatch discomfort zone comprises determining whether the virtual object is located, from the user, at more than an accommodation-vergence mismatch threshold distance of a far accommodation-vergence mismatch discomfort zone.

7. The display system of claim 1, wherein determining whether the vergence point of the user is within the accommodation-vergence mismatch discomfort zone comprises determining whether a vergence distance of the user is less than the accommodation-vergence mismatch threshold distance of a near accommodation-vergence mismatch discomfort zone, wherein the vergence distance is a distance of the vergence point from the user.

8. The display system of claim 1, wherein determining whether the vergence point of the user is within the accommodation-vergence mismatch discomfort zone comprises determining whether a vergence distance of the user is more than the accommodation-vergence mismatch threshold distance of a far accommodation-vergence mismatch discomfort zone, wherein the vergence distance is a distance of the vergence point from the user.

9. The display system of claim 1, wherein determining whether the vergence point of the user is within the accommodation-vergence mismatch discomfort zone comprises:
determining whether the user is verging on the virtual object.

10. The display system of claim 1, further comprising redisplaying the virtual object after ceasing to display the virtual content for a cool-down period, where redisplaying the virtual content comprises displaying virtual content at a location outside of the loss-of-fusion zone.

11. The display system of claim 1, further comprising optics configured to output light forming the virtual object with varying amounts of wavefront divergence.

12. The display system of claim 11, wherein the optics comprises a stack of waveguides, wherein different ones of the waveguides output light with different amounts of wavefront divergence.

13. The display system of claim 11, further comprising a projection system for directing light comprising image information into the optics for output to the viewer.

14. The display system of claim 11, wherein the projection system comprises a light source and a spatial light modulator configured to modulate light from the light source.

15. The display system of claim 1, wherein limiting displaying comprises:
determining an exposure time of the user to the virtual object, wherein the exposure time is a duration of exposure of the user to the virtual content while the virtual content is continuously located within the accommodation-vergence mismatch discomfort zone; and
refraining from displaying the virtual object within the accommodation-vergence mismatch discomfort zone after an exposure time threshold is exceeded.

16. The display system of claim 15, wherein refraining from displaying the virtual object within the accommodation-vergence mismatch discomfort zone comprises stopping display of the virtual object to one eye of the viewer, while continuing to display the virtual object to an other eye of the viewer.

17. The display system of claim 15, wherein refraining from displaying the virtual object within the accommodation-vergence mismatch threshold distance comprises intermittently stopping display of the virtual object to each eye of the viewer by alternating displaying the virtual object between the eyes of the viewer.

18. The display system of claim 15, wherein the operations further comprise:
determining whether the virtual object is user-locked content or in-world content; and
setting the exposure time threshold based upon whether the virtual object is user-locked content or in-world content, wherein an associated exposure time threshold for in-world content exceeds an associated exposure time threshold for user-locked content.

19. The display system of claim 1, further comprising sensors to determine an orientation of the eyes of the viewer, wherein the display system is configured to determine the vergence point based upon information from the sensors.

20. The display system of claim 19, wherein the sensors comprise inwardly-facing cameras configured to image the eyes of the viewer.

* * * * *

UNITED STATES PATENT AND TRADEMARK OFFICE
CERTIFICATE OF CORRECTION

PATENT NO. : 10,878,620 B2
APPLICATION NO. : 16/353989
DATED : December 29, 2020
INVENTOR(S) : Schwab et al.

It is certified that error appears in the above-identified patent and that said Letters Patent is hereby corrected as shown below:

In the Specification

In Column 44, Line 34, delete "or or" and insert --or--.

In Column 46, Lines 22-23, delete "loss of fusion" and insert --loss-of-fusion--.

In Column 52, Line 39, delete "(FIG." and insert --(FIGS.--.

In Column 63, Line 44, delete "eye" and insert --eye.--.

In the Claims

In Column 67, Line 38, Claim 3, delete "user" and insert --user,--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*